(12) United States Patent
Vehr et al.

(10) Patent No.: US 10,807,437 B2
(45) Date of Patent: Oct. 20, 2020

(54) EVAPORATOR FREEZE PREVENTION SYSTEMS AND METHODS

(71) Applicant: Emerson Climate Technologies, Inc., Sidney, OH (US)

(72) Inventors: Shawn W. Vehr, Troy, OH (US); Joseph James Rozsnaki, Troy, OH (US); Devon Dobie, Wapakoneta, OH (US); Matthew Presar, Wapakoneta, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 4 days.

(21) Appl. No.: 16/123,425

(22) Filed: Sep. 6, 2018

(65) Prior Publication Data

US 2019/0092117 A1     Mar. 28, 2019

Related U.S. Application Data

(60) Provisional application No. 62/563,368, filed on Sep. 26, 2017, provisional application No. 62/563,390,
(Continued)

(51) Int. Cl.
*B60H 1/00* (2006.01)
*F25B 5/02* (2006.01)
(Continued)

(52) U.S. Cl.
CPC ......... *B60H 1/004* (2013.01); *B60H 1/00021* (2013.01); *B60H 1/00064* (2013.01);
(Continued)

(58) Field of Classification Search
CPC  B60H 1/00021; B60H 1/00378; B60H 1/004; B60H 1/00428; B60H 1/3208;
(Continued)

(56) References Cited

U.S. PATENT DOCUMENTS 7,396,075 B2    7/2008  Ohkuma et al.
7,454,922 B2   11/2008  Zeigler et al.
(Continued)

FOREIGN PATENT DOCUMENTS

JP        2006021711 A       1/2006

OTHER PUBLICATIONS

International Search Report regarding International Application No. PCT/US2018/052916, dated Feb. 26, 2019.
(Continued)

*Primary Examiner* — Marc E Norman
(74) *Attorney, Agent, or Firm* — Harness, Dickey & Pierce, P.L.C.

(57) ABSTRACT

An air conditioning system of a vehicle having an internal combustion engine includes a condenser configured to receive refrigerant output by an electric compressor and transfer heat from the refrigerant within the condenser to air passing the condenser. A first evaporator is configured to receive refrigerant from the condenser when a first control valve is open and transfer heat from air passing the first evaporator to the refrigerant within the first evaporator. A first blower is configured to blow air across the first evaporator to a first section of a cabin of the vehicle. A second evaporator is configured to receive refrigerant from the condenser when a second control valve is open and transfer heat from air passing the second evaporator to the refrigerant within the second evaporator. A second blower is configured to blow air across the second evaporator to a second section of the cabin of the vehicle.

20 Claims, 35 Drawing Sheets

Related U.S. Application Data filed on Sep. 26, 2017, provisional application No. 62/563,407, filed on Sep. 26, 2017, provisional application No. 62/563,425, filed on Sep. 26, 2017, provisional application No. 62/563,437, filed on Sep. 26, 2017.

(51) Int. Cl.
  *F25B 49/02* (2006.01)
  *B60H 1/32* (2006.01)
  *F25B 27/00* (2006.01)

(52) U.S. Cl.
  CPC ..... *B60H 1/00378* (2013.01); *B60H 1/00428* (2013.01); *B60H 1/321* (2013.01); *B60H 1/3207* (2013.01); *B60H 1/3208* (2013.01); *B60H 1/3222* (2013.01); *F25B 5/02* (2013.01); *F25B 49/02* (2013.01); *B60H 1/00807* (2013.01); *B60H 2001/325* (2013.01); *B60H 2001/3238* (2013.01); *B60H 2001/3261* (2013.01); *B60H 2001/3272* (2013.01); *B60H 2001/3283* (2013.01); *B60H 2001/3292* (2013.01); *F25B 27/00* (2013.01); *F25B 49/027* (2013.01); *F25B 2600/021* (2013.01); *F25B 2600/0251* (2013.01); *F25B 2600/0271* (2013.01); *F25B 2600/11* (2013.01); *F25B 2600/2519* (2013.01); *F25B 2700/02* (2013.01); *F25B 2700/195* (2013.01); *F25B 2700/1931* (2013.01); *F25B 2700/1933* (2013.01); *F25B 2700/2104* (2013.01); *F25B 2700/2117* (2013.01); *F25B 2700/21151* (2013.01); *F25B 2700/21152* (2013.01); *F25B 2700/21163* (2013.01)

(58) Field of Classification Search
  CPC ............... B60H 1/321; B60H 1/3222; B60H 2001/3238; B60H 2001/3248; B60H 2001/325; B60H 2001/3261; B60H 2001/3272; B60H 2001/3283; B60H 2001/3292; F25B 5/02; F25B 49/02; F25B 49/027; F25B 2700/1931; F25B 2700/1933; F25B 2700/195; F25B 2700/2117
  See application file for complete search history.

(56) References Cited

U.S. PATENT DOCUMENTS

| | | | |
|---|---|---|---|
| 8,015,833 B2 | 9/2011 | Cikanek et al. | |
| 9,260,103 B2 | 2/2016 | Porras et al. | |
| 9,487,063 B2 | 11/2016 | Zeigler et al. | |
| 2003/0097848 A1* | 5/2003 | Egami | B60H 1/3222 62/133 |
| 2005/0247446 A1 | 11/2005 | Gawthrop | |
| 2006/0102333 A1 | 5/2006 | Zeigler et al. | |
| 2007/0131408 A1 | 6/2007 | Zeigler et al. | |
| 2009/0133419 A1 | 5/2009 | Matsuno et al. | |
| 2009/0133859 A1 | 5/2009 | Suzuki et al. | |
| 2011/0209490 A1* | 9/2011 | Mijanovic | B60H 1/00885 62/190 |
| 2012/0031132 A1 | 2/2012 | Ikemiya et al. | |
| 2012/0049664 A1 | 3/2012 | Yokoyama et al. | |
| 2012/0216999 A1 | 8/2012 | Yamamoto | |
| 2014/0182832 A1 | 7/2014 | Styles et al. | |
| 2014/0290297 A1 | 10/2014 | Yoshimura et al. | |
| 2015/0217625 A1 | 8/2015 | Kang et al. | |
| 2016/0039263 A1 | 2/2016 | Mori et al. | |
| 2016/0318371 A1 | 11/2016 | Yoshimi et al. | |
| 2016/0332503 A1 | 11/2016 | Hirano et al. | |
| 2016/0332504 A1 | 11/2016 | Blatchley et al. | |
| 2016/0339767 A1 | 11/2016 | Enomoto et al. | |
| 2016/0361975 A1 | 12/2016 | Blatchley et al. | |
| 2017/0015176 A1 | 1/2017 | Ulrey et al. | |
| 2017/0096048 A1 | 4/2017 | Larson et al. | |
| 2017/0167757 A1 | 6/2017 | Connell et al. | |
| 2017/0259646 A1 | 9/2017 | Navarro | |
| 2019/0061470 A1 | 2/2019 | Koberstein et al. | |
| 2019/0092131 A1 | 3/2019 | Vehr et al. | |
| 2019/0092132 A1 | 3/2019 | Vehr et al. | |
| 2019/0092133 A1 | 3/2019 | Vehr et al. | |
| 2019/0092134 A1 | 3/2019 | Vehr et al. | |
| 2020/0088090 A1 | 3/2020 | Sugihara et al. | |

OTHER PUBLICATIONS

Written Opinion of the International Searching Authoitry regarding International Application No. PCT/US2018/052916, dated Feb. 26, 2019.
Applicant-Initiated Interview Summary regarding Application No. 0315-000972-US dated Mar. 13, 2020.
Non-Final Office Action regarding U.S. Appl. No. 16/123,500 dated Feb. 12, 2020.
Notice of Allowance regarding U.S. Appl. No. 16/123,359 dated Feb. 13, 2020.
U.S. Appl. No. 16/123,359, filed Sep. 6, 2018, Shawn W. Vehr.
U.S. Appl. No. 16/123,500, filed Sep. 6, 2018, Shawn W. Vehr.
U.S. Appl. No. 16/123,541, filed Sep. 6, 2018, Shawn W. Vehr.
U.S. Appl. No. 16/123,588, filed Sep. 6, 2018, Shawn W. Vehr.
Non-Final Office Action regarding U.S. Appl. No. 16/123,541 dated Apr. 2, 2020.
Non-Final Office Action regarding U.S. Appl. No. 16/123,588 dated Apr. 2, 2020.
Notice of Allowance regarding U.S. Appl. No. 16/123,588 dated Jul. 8, 2020.

* cited by examiner

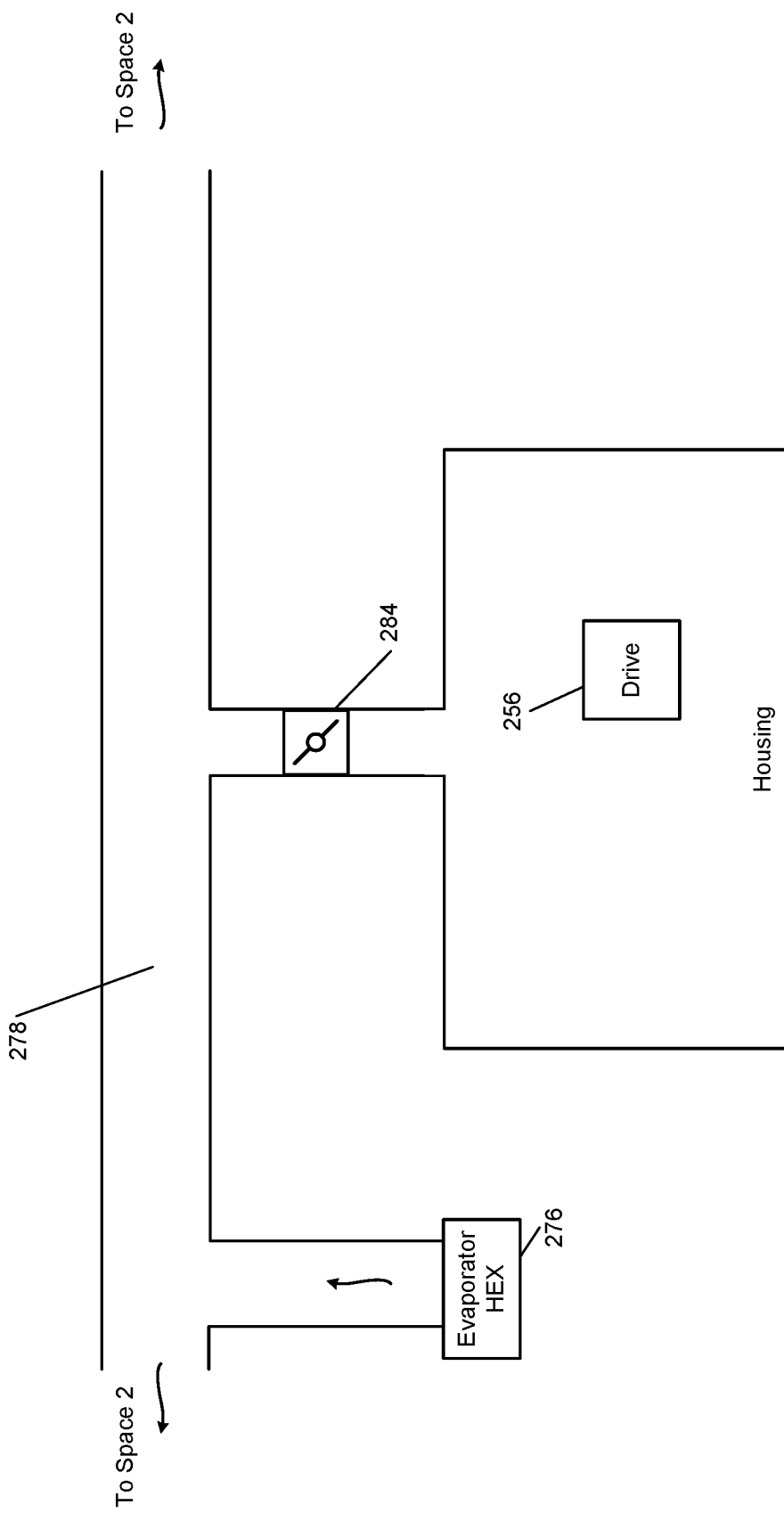

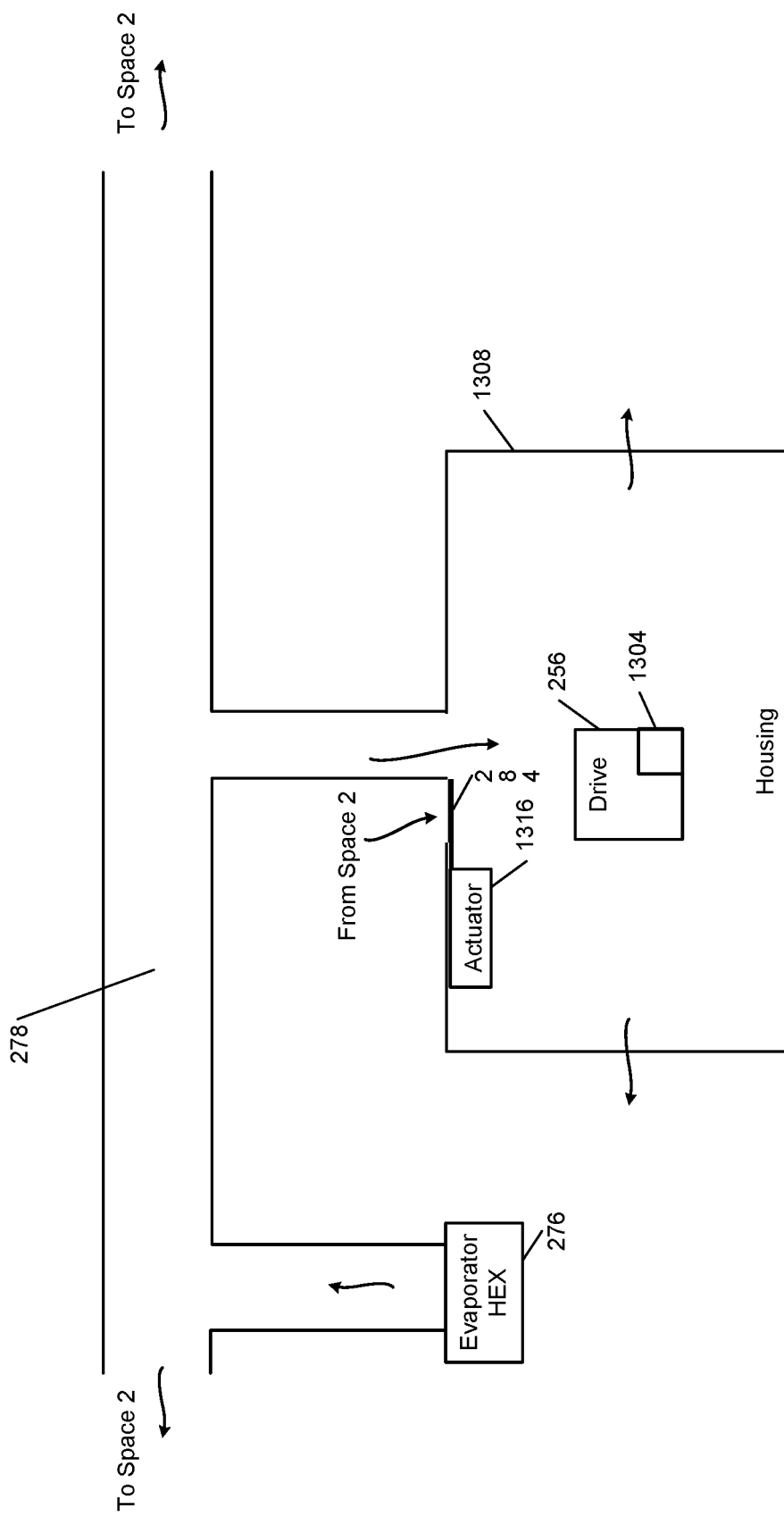

EVAPORATOR FREEZE PREVENTION SYSTEMS AND METHODS

CROSS-REFERENCE TO RELATED APPLICATIONS

This application claims the benefit of U.S. Provisional Application No. 62/563,368, filed on Sep. 26, 2017, U.S. Provisional Application No. 62/563,390, filed on Sep. 26, 2017, U.S. Provisional Application No. 62/563,407, filed on Sep. 26, 2017, U.S. Provisional Application No. 62/563,425, filed on Sep. 26, 2017, and U.S. Provisional Application No. 62/563,437, filed on Sep. 26, 2017. The entire disclosures of the applications referenced above are incorporated herein by reference.

FIELD

The present disclosure relates to vehicles and, more particularly, to air conditioning systems of vehicles.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Compressors may be used in a wide variety of industrial and residential applications to circulate refrigerant to provide a desired heating or cooling effect. For example, a compressor may be used to provide heating and/or cooling in a refrigeration system, a heat pump system, a heating, ventilation, and air conditioning (HVAC) system, or a chiller system. These types of systems can be fixed, such as at a building or residence, or can be mobile, such as in a vehicle. Vehicles include land based vehicles (e.g., trucks, cars, trains, etc.), water based vehicles (e.g., boats), air based vehicles (e.g., airplanes), and vehicles that operate over a combination of more than one of land, water, and air.

A vehicle typically includes an HVAC system that heats and cools a driving area of the vehicle where a driver sits. Some vehicles, such as semi-trucks, also include a living area where a driver can sit, sleep, rest, etc. Some vehicles may include a partition (e.g., curtain or wall) that can be opened to join the driving area and the living area. The partition can also be closed to separate the driving and living areas, for example, for sleeping.

Typically, compressors of HVAC systems of vehicles are engine driven. Thus, the engine is on to provide cooling. As such, in addition to running during movement of the vehicle, the engine of the vehicle stays running to provide cooling while the driver is sleeping and at other times when the vehicle is not moving.

SUMMARY

In a feature, an air conditioning system of a vehicle having an internal combustion engine is described. A condenser is configured to receive refrigerant output by an electric compressor and transfer heat from the refrigerant within the condenser to air passing the condenser. A first evaporator is configured to receive refrigerant from the condenser when a first control valve is open and transfer heat from air passing the first evaporator to the refrigerant within the first evaporator. A first blower is configured to blow air across the first evaporator to a first section of a cabin of the vehicle. A second evaporator is configured to receive refrigerant from the condenser when the second control valve is open and transfer heat from air passing the second evaporator to the refrigerant within the second evaporator. A second blower is configured to blow air across the second evaporator to a second section of the cabin of the vehicle. A control module is configured to, when the internal combustion engine of the vehicle is on and the first blower is blowing air across the first evaporator, control a speed of the electric compressor based on a temperature of the first evaporator.

In further features, the control module is configured to: decrease the speed of the electric compressor as the temperature of the first evaporator decreases toward a minimum temperature defining a lower limit of a predetermined temperature range; and increase the speed of the electric compressor as the temperature of the first evaporator increases toward a maximum temperature defining an upper limit of the predetermined temperature range.

In further features, the minimum temperature is greater than the freezing point temperature of water.

In further features, the control module is configured to: operate the electric compressor at a first predetermined speed when the temperature of the first evaporator is equal to the minimum temperature of the predetermined temperature range; and operate the electric compressor at a second predetermined speed that is greater than the first predetermined speed when the temperature of the first evaporator is equal to the maximum temperature of the predetermined temperature range.

In further features, the control module is configured to operate the electric compressor at a third predetermined speed that is less than first predetermined speed when the temperature of the first evaporator is less than the minimum temperature.

In further features, the control module is configured to shut down the electric compressor when the temperature of the first evaporator remains less than the minimum temperature continuously for a predetermined period while the electric compressor is operating at the third predetermined speed.

In further features, the control module is configured to control the speed of the electric compressor further based on a compressor suction pressure.

In further features, the control module is configured to: decrease the speed of the electric compressor as the compressor suction pressure decreases toward a minimum pressure defining a lower limit of a predetermined pressure range; and increase the speed of the electric compressor as the compressor suction pressure increases toward a maximum pressure defining an upper limit of the predetermined pressure range.

In further features, the control module is configured to: operate the electric compressor at a first predetermined speed when the compressor suction pressure is equal to the minimum pressure of the predetermined pressure range; and operate the electric compressor at a second predetermined speed that is greater than the first predetermined speed when the compressor suction pressure is equal to the maximum pressure of the predetermined pressure range.

In further features, the control module is configured to operate the electric compressor at a third predetermined speed that is less than first predetermined speed when the compressor suction pressure is less than the minimum pressure.

In further features, the control module is configured to shut down the electric compressor when the compressor suction pressure remains less than the minimum pressure continuously for a predetermined period while the electric compressor is operating at the third predetermined speed.

In further features, the control module is configured to determine the minimum and maximum pressures of the predetermined pressure range based on the compressor suction pressure when the temperature of the first evaporator decreases to a predetermined temperature.

In a feature, air conditioning control method for a vehicle having an internal combustion engine includes: determining whether the internal combustion engine of the vehicle is on; determining whether a first blower of the vehicle is blowing air across a first evaporator, where the first evaporator is configured to receive refrigerant from a condenser when a first control valve is open and to transfer heat from air passing the first evaporator to the refrigerant within the first evaporator, where the first blower is configured to blow air across the first evaporator to a first section of a cabin of the vehicle, and where the condenser is configured to receive refrigerant output by an electric compressor and to transfer heat from the refrigerant within the condenser to air passing the condenser; and, when the internal combustion engine of the vehicle is on and the first blower is blowing air across the first evaporator, controlling a speed of an electric compressor based on a temperature of the first evaporator, where a second evaporator is configured to receive refrigerant from the condenser when a second control valve is open and to transfer heat from air passing the second evaporator to the refrigerant within the second evaporator, and where a second blower is configured to blow air across the second evaporator to a second section of the cabin of the vehicle.

In further features, controlling the speed of the electric compressor based on the temperature of the first evaporator includes: decreasing the speed of the electric compressor as the temperature of the first evaporator decreases toward a minimum temperature defining a lower limit of a predetermined temperature range; and increasing the speed of the electric compressor as the temperature of the first evaporator increases toward a maximum temperature defining an upper limit of the predetermined temperature range.

In further features, the minimum temperature is greater than the freezing point temperature of water.

In further features, controlling the speed of the electric compressor based on the temperature of the first evaporator includes: operating the electric compressor at a first predetermined speed when the temperature of the first evaporator is equal to the minimum temperature of the predetermined temperature range; and operating the electric compressor at a second predetermined speed that is greater than the first predetermined speed when the temperature of the first evaporator is equal to the maximum temperature of the predetermined temperature range.

In further features, controlling the speed of the electric compressor based on the temperature of the first evaporator includes operating the electric compressor at a third predetermined speed that is less than first predetermined speed when the temperature of the first evaporator is less than the minimum temperature.

In further features, controlling the speed of the electric compressor based on the temperature of the first evaporator includes shutting down the electric compressor when the temperature of the first evaporator remains less than the minimum temperature continuously for a predetermined period while the electric compressor is operating at the third predetermined speed.

In further features, controlling the speed of the electric compressor based on the temperature of the first evaporator includes controlling the speed of the electric compressor based on the temperature of the first evaporator and a compressor suction pressure.

In further features, controlling the speed of the electric compressor based on the temperature of the first evaporator and the compressor suction pressure includes: decreasing the speed of the electric compressor as the compressor suction pressure decreases toward a minimum pressure defining a lower limit of a predetermined pressure range; and increasing the speed of the electric compressor as the compressor suction pressure increases toward a maximum pressure defining an upper limit of the predetermined pressure range.

In further features, controlling the speed of the electric compressor based on the temperature of the first evaporator and the compressor suction pressure includes: operating the electric compressor at a first predetermined speed when the compressor suction pressure is equal to the minimum pressure of the predetermined pressure range; and operating the electric compressor at a second predetermined speed that is greater than the first predetermined speed when the compressor suction pressure is equal to the maximum pressure of the predetermined pressure range.

In further features, controlling the speed of the electric compressor based on the temperature of the first evaporator and the compressor suction pressure includes operating the electric compressor at a third predetermined speed that is less than first predetermined speed when the compressor suction pressure is less than the minimum pressure.

In further features, controlling the speed of the electric compressor based on the temperature of the first evaporator and the compressor suction pressure includes shutting down the electric compressor when the compressor suction pressure remains less than the minimum pressure continuously for a predetermined period while the electric compressor is operating at the third predetermined speed.

In further features, the air conditioning control method further includes determining the minimum and maximum pressures of the predetermined pressure range based on the compressor suction pressure when the temperature of the first evaporator decreases to a predetermined temperature.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 16, 17, and 18 include example graphs of condenser fan speed commands as functions of power consumption, discharge pressure, and compressor speed, respectively, for when the engine is on.

FIG. 26A includes an example implementation of a damper door and HVAC ducts that can be used to cool the drive.

FIGS. 26B, 26C, 26D, and 26E include example implementations of drive fans that can be used to cool the drive.

In the drawings, reference numbers may be reused to identify similar and/or identical elements.

DETAILED DESCRIPTION

Some vehicles, such as semi trucks, have a passenger cabin that has two sections: a first section where a driver drives the vehicle; and a second section that the driver can, for example, sleep. Some vehicles include heating, ventilation, and air conditioning (HVAC) systems that have ducts that allow heating and cooling of both of the first and second sections.

A vehicle including an HVAC system may include a refrigerant compressor (for cooling) that is mechanically driven by the engine. The speed, and therefore the output, of the refrigerant compressor is related to the rotational speed of the engine. Because cooling is not possible when the engine is off, a driver may keep the engine running to provide cooling, even when the vehicle is parked and not being driven. For example, the engine may be kept running to provide cooling while the vehicle is parked and the driver is sleeping in the second section of the passenger cabin.

Keeping the engine running to provide cooling while the vehicle is parked and the driver is sleeping is an inefficient use of the engine. Additionally, by keeping the engine running, the refrigerant compressor also stays running and may cool the passenger cabin more than desired.

The present application involves an electric refrigerant compressor (for cooling) that is not driven by the engine. An inverter drive applies power to the electric refrigerant compressor from a battery pack based on a (variable) compressor speed command. A control module selectively varies the compressor speed command, for example, to prevent freezing at an evaporator (e.g., based on at least one of evaporator temperature and suction pressure), to maximize efficiency while the engine is running (e.g., based on at least one of discharge pressure and power consumption), and/or to maximize battery life while the engine is not running (e.g., based on blower speed and/or a cabin air temperature). Additionally or alternatively, the control module may selectively vary condenser fan speed and/or evaporator fan speed, for example, to maximize efficiency while the engine is running and/or to maximize battery life while the engine is not running.

Additionally or alternatively, the control module may selectively open an actuator (e.g., a damper door) to provide cooling to the inverter drive when a temperature of the inverter drive becomes greater than a predetermined temperature. Cooling the inverter drive improves efficiency of the inverter drive and may enable components having lower operating temperature ratings to be used in the inverter drive. Components having lower operating temperature ratings may be less costly than the same components having higher operating temperature ratings. By using an electric refrigerant compressor, the engine can be shut down yet the passenger cabin can still be cooled.

Figure 1A:
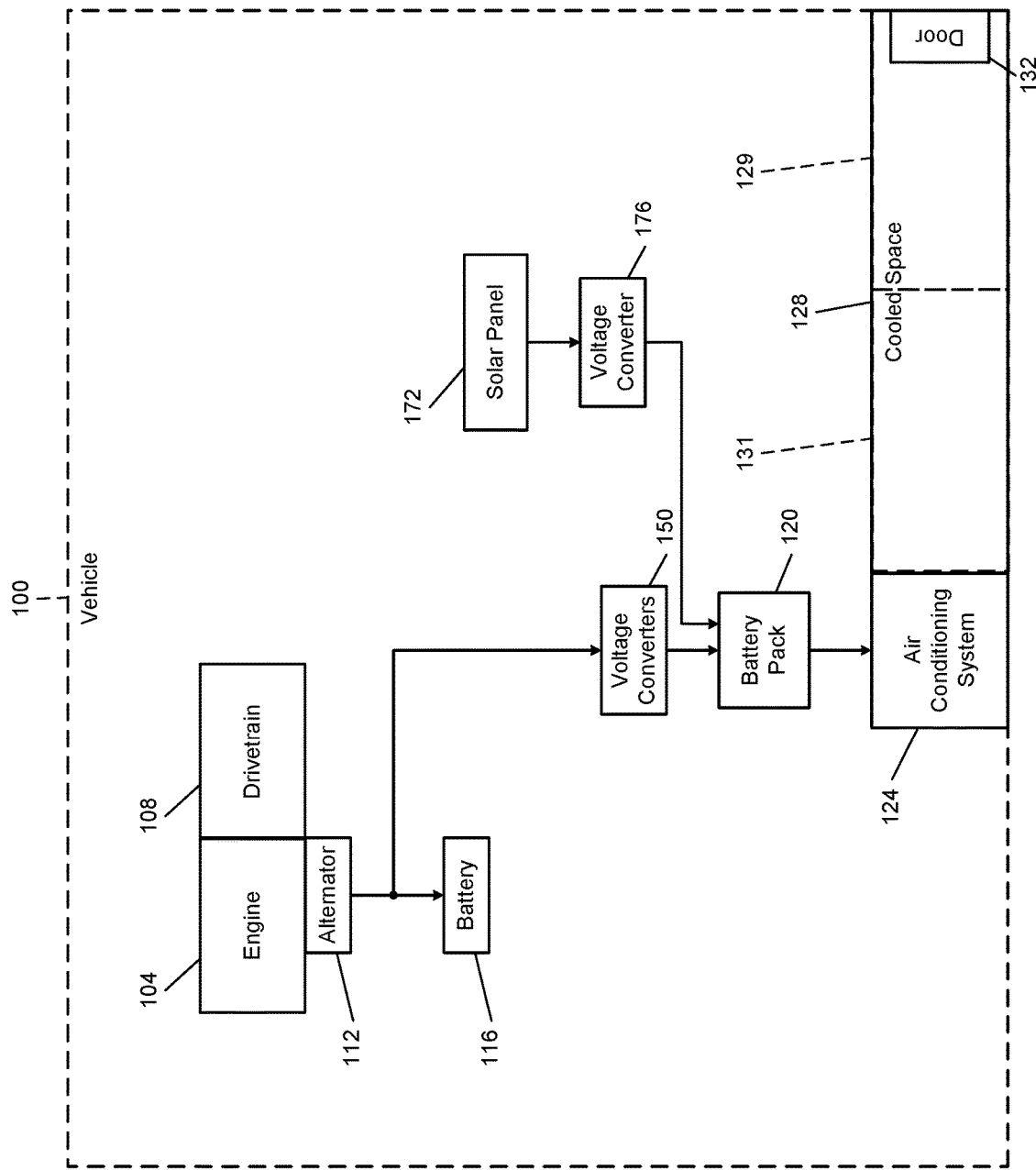
FIGS. 1A and 1B are functional block diagrams of example vehicle systems.
Figure 1B:
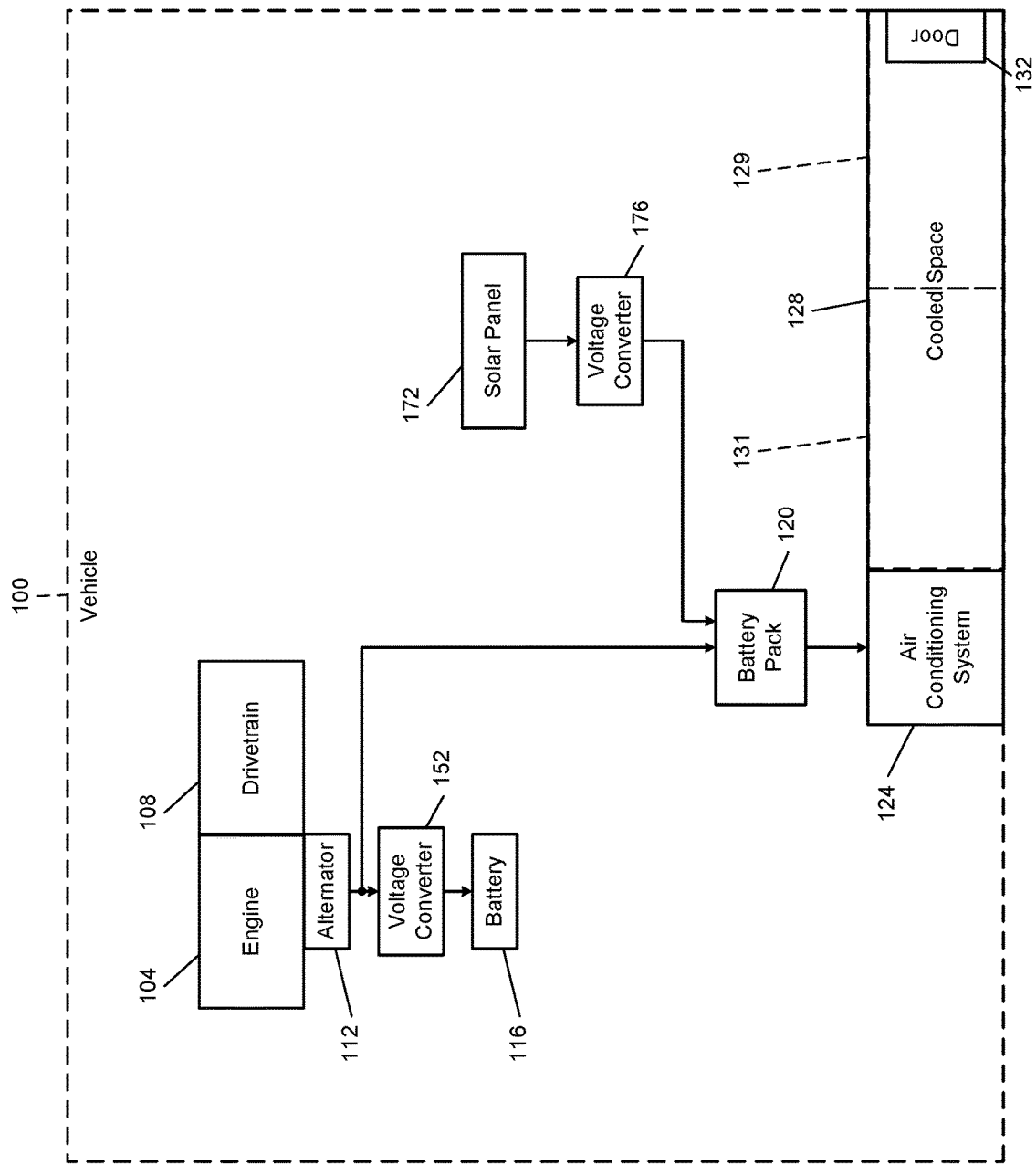

FIGS. 1A and 1B are functional block diagrams of example systems of a vehicle 100. The vehicle 100 includes an internal combustion engine 104 that combusts air and fuel within cylinders to generate propulsion torque for the vehicle 100. The engine 104 may combust, for example, gasoline, diesel fuel, natural gas, and/or one or more other types of fuel. The engine 104 outputs torque to a drivetrain 108. The drivetrain 108 transfers torque to two or more wheels of the vehicle. While the example of a semi truck is provided, the present application is also applicable to other types of land based vehicles (e.g., trucks, cars, trains, busses, recreational vehicles (RVs), motor homes, etc.), water based vehicles (e.g., boats), air based vehicles (e.g., airplanes), and vehicles that operate over a combination of more than one of land, water, and air. Also, while the example of a wheeled vehicle is provided, the present application is not limited to vehicles having wheels.

An electrical source 112 is driven by the engine 104 and converts mechanical energy of the engine 104 into electrical energy to charge a battery 116. The electrical source 112 may include an alternator, a generator, and/or another type of device that converts mechanical energy of the engine 104 into electrical energy. While the example of a single electrical source is provided, multiple or zero electrical sources driven by the engine 104 may be included. The electrical source 112 may be, for example, a 12 Volt (V) alternator (e.g., in the example of FIG. 1A) and/or a 48 V alternator (e.g., in the example of FIG. 1B).

The vehicle 100 also includes a battery pack 120. For example only, the battery pack 120 may be a 48 V direct current (DC) battery pack, although another suitable battery pack may be used. The battery pack 120 may include two or more individual batteries connected together or may include one battery. For example, in the case of a 48 V battery pack, the battery pack 120 may include four 12 V batteries connected in series. The batteries may be connected such that a lower voltage, such as 12 V, 24 V, and/or 36 V can also be obtained from one, two, or three of the batteries.

In various implementations, the battery pack 120 may include four individual 12 V batteries connected in series. The batteries may be arranged in two banks (A and B), each bank having two individual 12 V batteries (batteries 1 and 2) connected in series, to provide two 24 V reference potentials.

The battery pack 120 supplies power to an HVAC system including an air conditioning system 124. The air conditioning system 124 selectively cools a cooled space 128. The cooled space 128 is a space within the vehicle 100 that can be cooled based on a setpoint temperature. A driver of the vehicle drives the vehicle while located (e.g., seated at a driver's seat) within the cooled space 128. In various implementations, the cooled space 128 may be divided (e.g., physically) into multiple cooled spaces that may be cooled based on respective setpoint temperatures. For example, a driving portion 129 of the cooled space 128 may be cooled based on a first setpoint temperature and a living portion 131 of the cooled space 128 may be cooled based on a second setpoint temperature. The living portion 131 may be behind the driving portion 129 relative to a forward direction of travel of the vehicle. The first setpoint temperature and the second setpoint temperature may be set according to user input (e.g., initiated by the driver or another user) for the first setpoint temperature and the second setpoint temperature, respectively.

A user may vary the first setpoint temperature via one or more user input devices, such as one or more user input devices located within the driving portion 129 of the cooled space 128. A user may vary the second setpoint temperature via one or more user input devices, such as one or more user input devices located within the living portion 131 of the cooled space 128. The vehicle 100 may be for example, but not limited to, a semi-truck that can be used to haul trailers (e.g., tractor trailers). The present application is more generally applicable to vehicles having two evaporator heat exchangers. As discussed further below, a control module may control the air conditioning system 124 based on temperature(s) within the cooled space(s), set point temperature(s), and other parameters.

The vehicle 100 includes one or more doors, such as door 132, that provide access to the cooled space 128 (e.g., the driving portion 129), for example, for entry into the vehicle and exit from the vehicle. While the example of only one door is shown, the vehicle 100 may include more than one door.

As shown in the examples of FIG. 1A, the vehicle 100 may include one or more voltage converters 150 that convert the output of the electrical source 112 into one or more outputs for charging the battery pack 120. In the example of the electrical source 112 generating a 12 V DC output, the one or more voltage converters 150 may boost (i.e., increase) the output of the electrical source 112, for example, to one or more other voltages (e.g., 24 V DC, 48 V DC) and charge the battery pack 120 via the boosted output. Since the electrical source 112 is driven by rotation of the engine 104, the electrical source 112 may be used to charge the battery pack 120 when the engine 104 is running.

In the example of the electrical source 112 generating a 48 V DC output, as shown in FIG. 1B, the output of the electrical source 112 may charge the battery pack 120. The vehicle 100, however, may include a voltage converter 152 that converts the output of the electrical source 112 into an output for charging the battery 116, For example, the voltage converter 152 may buck (i.e., decrease) the output of the electrical source 112, for example, to a lower voltage (e.g., 12 V DC) and charge the battery pack 120 via the bucked output. In various implementations, the vehicle 100 may also include a battery charger that selectively charges the battery 116 using received power (e.g., from the electrical source 112 or a voltage converter).

The vehicle 100 may also include one or more battery chargers that selectively charge the battery pack 120 using received power (e.g., from the electrical source 112 or a voltage converter). For example, the vehicle 100 may include four model SEC-2440 battery charger, manufactured by Samlex America Inc., of Burnaby, BC, Canada. The battery charger may be arranged, for example, in two groups of two 24 V, 40 A battery chargers connected to provide a 48 V, 80 A output for battery charging. While the example of battery chargers having a 24 V, 40 A output is provided, battery chargers having another output may be used, such as one 12 V charger connected to each battery. The battery chargers may also monitor the individual batteries of the battery pack 120 and control application of power to the respective batteries to prevent overcharging. In various implementations, a drive (discussed further below) may charge the battery pack 120 and separate battery chargers may be omitted.

While the electrical source 112 is shown as providing power for charging both the battery 116 and the battery pack 120, a second electrical source may be used to convert power of the engine 104 into electrical power for charging the battery pack 120. In this case, the electrical source 112 may be used to charge the battery 116, and the second electrical source may be used to charge the battery pack 120.

In various implementations, the battery pack 120 may be charged via one or more other power sources. For example, the battery pack 120 may be charged using power from a utility received via a receptacle of the vehicle. The receptacle may be configured to receive AC or DC power. For example, the receptacle may receive AC power from a utility via a power cord (e.g., an extension cord) connected between the receptacle and a wall outlet or charger of a building. The receptacle may be, for example, a single phase 110/120 or 208/240 V AC receptacle or a 3-phase 208/240 V AC receptacle. In various implementations, the vehicle 100 may include both a 110/120 V AC receptacle and a 208/240 V AC receptacle. While the example of the receptacle receiving AC power is provided, the receptacle may alternatively receive DC power from via a power cord. Power received from a utility via a receptacle will be referred to as shore power. In this example, the vehicle 100 may include one or more battery chargers that charge the battery pack 120 using shore power. These one or more battery chargers may be the same or different than those referenced above.

The vehicle 100 may optionally include a solar panel 172. The solar panel 172 converts solar energy into electrical energy. While the example of one solar panel is provided, multiple solar panels may be used. A voltage converter 176 converts power output by the solar panel 172 and charges the battery pack 120.

As discussed further below, the air conditioning system 124 includes an electric variable speed compressor that is not mechanically driven by any rotating component of the vehicle 100, such as the engine 104 or a component of the drivetrain 108. The variable speed compressor is instead driven via electrical power applied to an electric motor of the variable speed compressor. A control module controls operation of the variable speed compressor to maximize comfort within the cooled space 128, maximize efficiency of the air conditioning system 124, minimize discharging of the battery pack 120, and maximize life of components of the air conditioning system 124.

Figure 2:
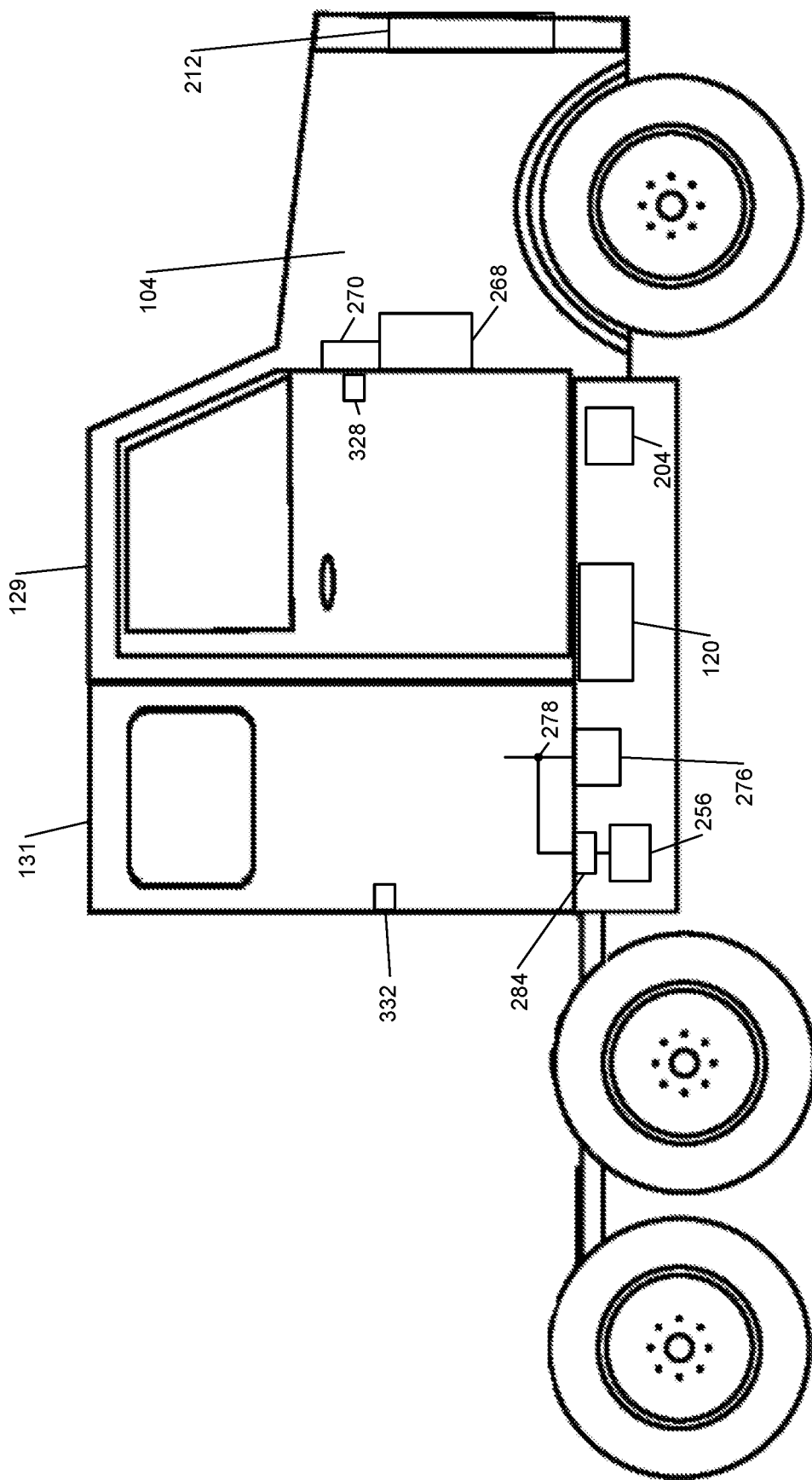
FIG. 2 includes an example illustration of an example vehicle including components of an air conditioning system.
Figure 3:
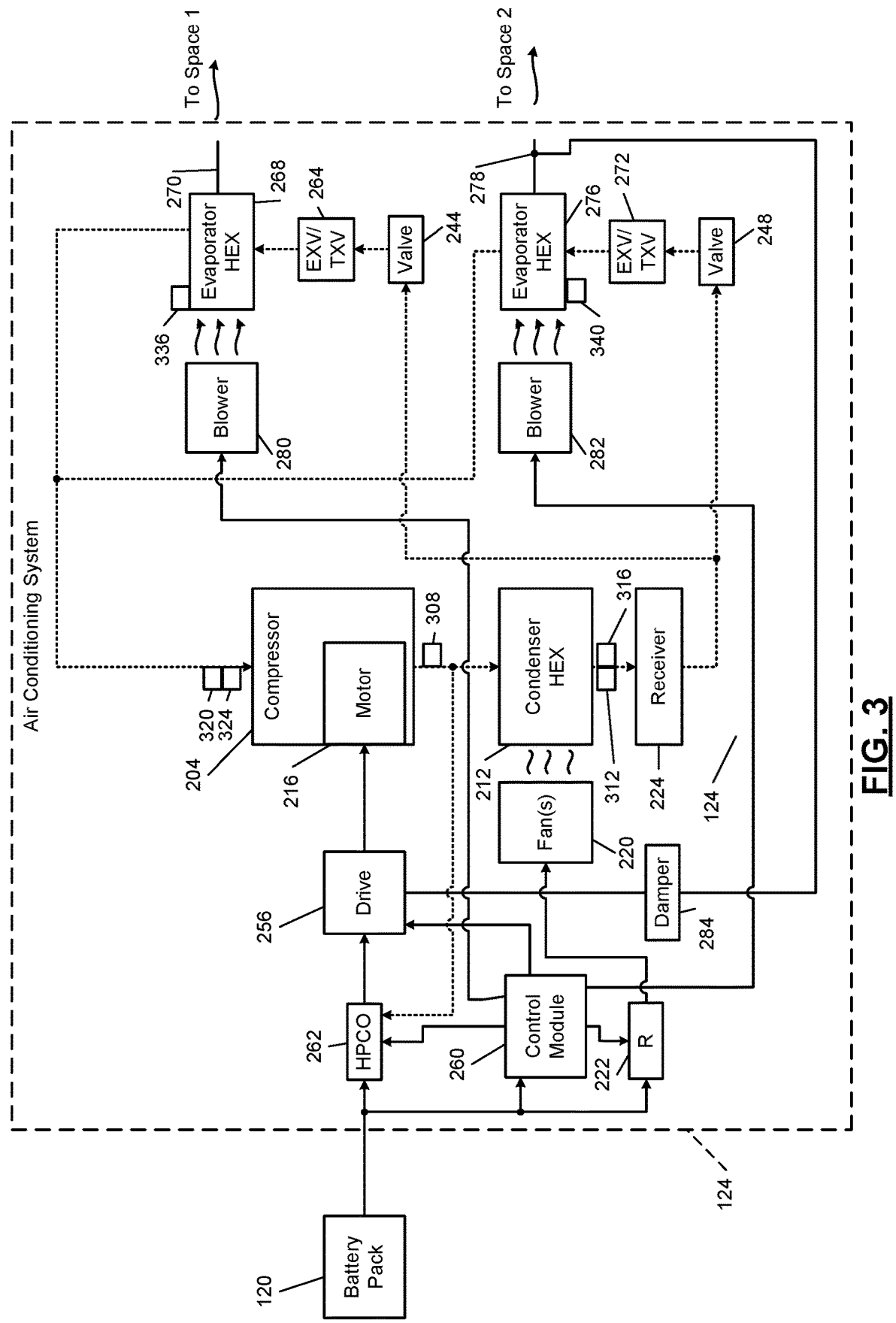
FIG. 3 includes a functional block diagram of an example implementation of the air conditioning system.

FIG. 2 includes an example illustration of an example truck including components of the air conditioning system 124. FIG. 3 includes a functional block diagram of an example implementation of the air conditioning system 124. In the example of FIG. 3, dotted lines indicate refrigerant flow, and solid lines indicate electrical connections and physical connections.

Referring now to FIGS. 2 and 3, a compressor 204 receives refrigerant vapor via a suction line of the compressor 204. In various implementations, the compressor 204 may receive refrigerant vapor from an accumulator that collects liquid refrigerant to minimize liquid refrigerant flow to the compressor 204.

The compressor 204 compresses the refrigerant and provides pressurized refrigerant in vapor form to a condenser heat exchanger (HEX) 212. The compressor 204 includes an electric motor 216 that drives a pump to compress the refrigerant. For example only, the compressor 204 may include a scroll compressor, a reciprocating compressor, or another type of refrigerant compressor. The electric motor 216 may include, for example, an induction motor, a permanent magnet motor (brushed or brushless), or another suitable type of electric motor. In various implementations, the electric motor 216 may be a brushless permanent magnet (BPM) motor. BPM motors may be more efficient than other types of electric motors. The compressor 204 is a variable speed compressor.

All or a portion of the pressurized refrigerant is converted into liquid form within the condenser HEX 212. The condenser HEX 212 transfers heat away from the refrigerant, thereby cooling the refrigerant. When the refrigerant vapor is cooled to a temperature that is less than a saturation temperature of the refrigerant, the refrigerant transitions into liquid (or liquefied) form.

One or more condenser fans 220 may be implemented to increase airflow over, around, and/or through the condenser HEX 212 and increase the rate of heat transfer away from the refrigerant. As shown in FIG. 2, the condenser HEX 212 may be implemented near a front of the vehicle 100 such that air flows through the condenser HEX 212 when the vehicle 100 is traveling in the forward direction. The condenser HEX 212, however, may be located in another suitable location.

Refrigerant from the condenser HEX 212 is delivered to a receiver 224. The receiver 224 may be implemented to store excess refrigerant. In various implementations, the receiver 224 may be omitted. A filter drier may be implemented to remove moisture and debris from the refrigerant. In various implementations, the filter drier may be omitted.

In various implementations, the air conditioning system 124 may include an enhanced vapor injection (EVI) system. The EVI system may expand a portion of the refrigerant from the receiver 224 to vapor form, superheat the vapor refrigerant, and provide the superheated vapor refrigerant to the compressor 204, such as at a midpoint within a compression chamber of the compressor 204. EVI may be performed, for example, to increase capacity and increase efficiency of the air conditioning system 124.

Refrigerant from the receiver 224 flows to a first evaporator control valve 244 and a second evaporator control valve 248. The first evaporator control valve 244 may be, for example, a solenoid valve or another suitable type of valve. The second evaporator control valve 248 may be, for example, a solenoid valve or another suitable type of valve.

Before flowing to the first evaporator control valve 244 and the second evaporator control valve 248, the refrigerant may flow through a drive HEX. The drive HEX draws heat away from a drive 256 (e.g., an inverter drive) and transfers heat to refrigerant flowing through the drive HEX. While the example of the drive being liquid (refrigerant) cooled is provided, liquid cooling may be omitted, and the drive 256 may be air cooled. Air cooling may be active (e.g., via one or more devices) and/or passive (e.g., by conduction and convection). An example of active cooling of the drive 256 is discussed further below.

The drive 256 controls application of power to the electric motor 216 from the battery pack 120. For example, the drive 256 may control application of power to the electric motor 216 based on a compressor speed command from a control module 260. Based on the speed command, the drive 256 may generate three-phase AC power (e.g., 208/240 V AC) from the power output of the battery pack 120 and apply the three-phase AC power to the electric motor 216. The drive 256 may set one or more characteristics of the three-phase AC power based on the compressor speed command, such as frequency, voltage, and/or current. For example only, the drive 256 may be a variable frequency drive (VFD). The drive 256 may, for example, determine a pulse width modulation (PWM) duty cycle to apply to switches of the drive 256 to generate AC power having the characteristics. In various implementations, one or more electromagnetic interference (EMI) filters may be implemented between the battery pack 120 and the drive 256.

The control module 260 may set the compressor speed command to a plurality of different possible speeds for variable speed operation of the electric motor 216 and the compressor 204. The control module 260 and the drive 256 may communicate, for example, using RS485 Modbus or another suitable type of communication including, but not limited to, controller area network (CAN) bus or analog signaling (e.g., 0-10V signals).

A high pressure cut off (HPCO) 262 may be implemented to disconnect the drive 256 from power and disable the electric motor 216 when a pressure of refrigerant output by the compressor 204 exceeds a predetermined pressure. The control module 260 may also control operation of the compressor 204 based on a comparison of the pressure of refrigerant output by the compressor 204. For example, the control module 260 may shut down or reduce the speed of the compressor 204 when the pressure of refrigerant output by the compressor 204 is less than a second predetermined pressure that is less than or equal to the predetermined pressure used by the HPCO 262.

When the first evaporator control valve 244 is open, refrigerant may be expanded to vapor form by a first expansion valve 264 and provided to a first evaporator HEX 268. The first expansion valve 264 may include a TXV (thermal expansion valve) or may be an EXV (electronic expansion valve).

The first evaporator HEX 268 provides cooled air to the driving portion 129 of the cooled space 128. More specifically, the vapor refrigerant within the first evaporator HEX 268 transfers heat away (i.e., absorbs heat) from air passing through the first evaporator HEX 268. The cooled air flows from the first evaporator HEX 268 to the driving portion 129 of the vehicle 100 via first HVAC ducts 270. The first HVAC ducts 270 include at least one duct through which cooled air flows to a passenger side of the vehicle 100 and at least one duct through which cooled air flows to a driver side of the vehicle 100.

When the second evaporator control valve 248 is open, refrigerant may be expanded to vapor form by a second expansion valve 272 and provided to a second evaporator HEX 276. The second expansion valve 272 may include a TXV or may be an EXV. The second evaporator HEX 276 provides cooled air to the living portion 131 of the cooled space 128. More specifically, the vapor refrigerant within the second evaporator HEX 276 transfers heat away (i.e., absorbs heat) from air passing through the second evaporator HEX 276. The cooled air flows from the second evaporator HEX 276 to the living portion 131 of the vehicle 100 via second HVAC ducts 278. The second HVAC ducts 278 include at least one duct through which cooled air flows to a passenger side of the vehicle 100 and at least one duct through which cooled air flows to a driver side of the vehicle 100.

A first blower 280 draws air from the cooled space 128 and/or from outside of the vehicle 100. When on, the first blower 280 increases airflow over, around, and/or through the first evaporator HEX 268 to increase the rate of heat transfer away from (i.e., cooling of) the air flowing through the first evaporator HEX 268 and to the cooled space 128.

A second blower 282 draws air from the cooled space 128 and/or from outside of the vehicle 100. When on, the second blower 282 increases airflow over, around, and/or through the second evaporator HEX 276 to increase the rate of heat transfer away from (i.e., cooling of) the air flowing through the second evaporator HEX 276 and to the cooled space 128. Refrigerant from the first evaporator HEX 268 and the second evaporator HEX 276 flows back to the compressor 204 for a next cycle.

The control module 260 may control the speed of the first blower 280 and the speed of the second blower 282 as discussed further below. For example, the control module 260 may control application of power to electric motors of the first and second blowers 280 and 282 from the battery pack 120 based on respective speed commands. Based on the respective speed commands, the control module 260 may generate AC power (e.g., single-phase or three-phase) from the power output of the battery pack 120 and apply the AC power to the electric motor 216. The control module 260 may set one or more characteristics of the AC power based on the respective speed commands, such as frequency, voltage, and/or current. The control module 260 may, for example, may determine PWM duty cycles to apply to switches of the drive 256 to generate AC powers having the characteristics.

The control module 260 may set the speed commands to a plurality of different possible speeds for variable speed operation of the first and second blowers 280 and 282. While the example of the control module 260 applying power to the first and second blowers 280 and 282 is provided, another module or the drive 256 may apply power to the first and second blowers 280 and 282.

Regarding active cooling of the drive 256, a damper door 284 may be implemented to allow or block airflow from the second blower 282 to a housing that houses the drive 256. For example, when the damper door 284 is open, cool air from the second evaporator HEX 276 or cool air from the second HVAC ducts 278 may travel to the cooled space 128 and into the housing of the drive 256 to cool the drive 256. When the damper door 284 is closed, the damper door 284 may block airflow to the housing (and therefore the drive 256). While the example of the damper door 284 is provided, another suitable actuator may be used to allow/prevent airflow to the drive 256. Curved lines in FIG. 3 are illustrative of air flow.

The air conditioning system 124 may also include a compressor pressure regulator (CPR) valve that regulates pressure of refrigerant input to the compressor 204 via the suction line. For example, the CPR valve may be closed to limit pressure into the compressor 204 during startup of the compressor 204. The CPR valve may be an electronically controlled valve (e.g., a stepper motor or solenoid valve), a mechanical valve, or another suitable type of valve. In various implementations, the CPR valve may be omitted.

Figure 4:
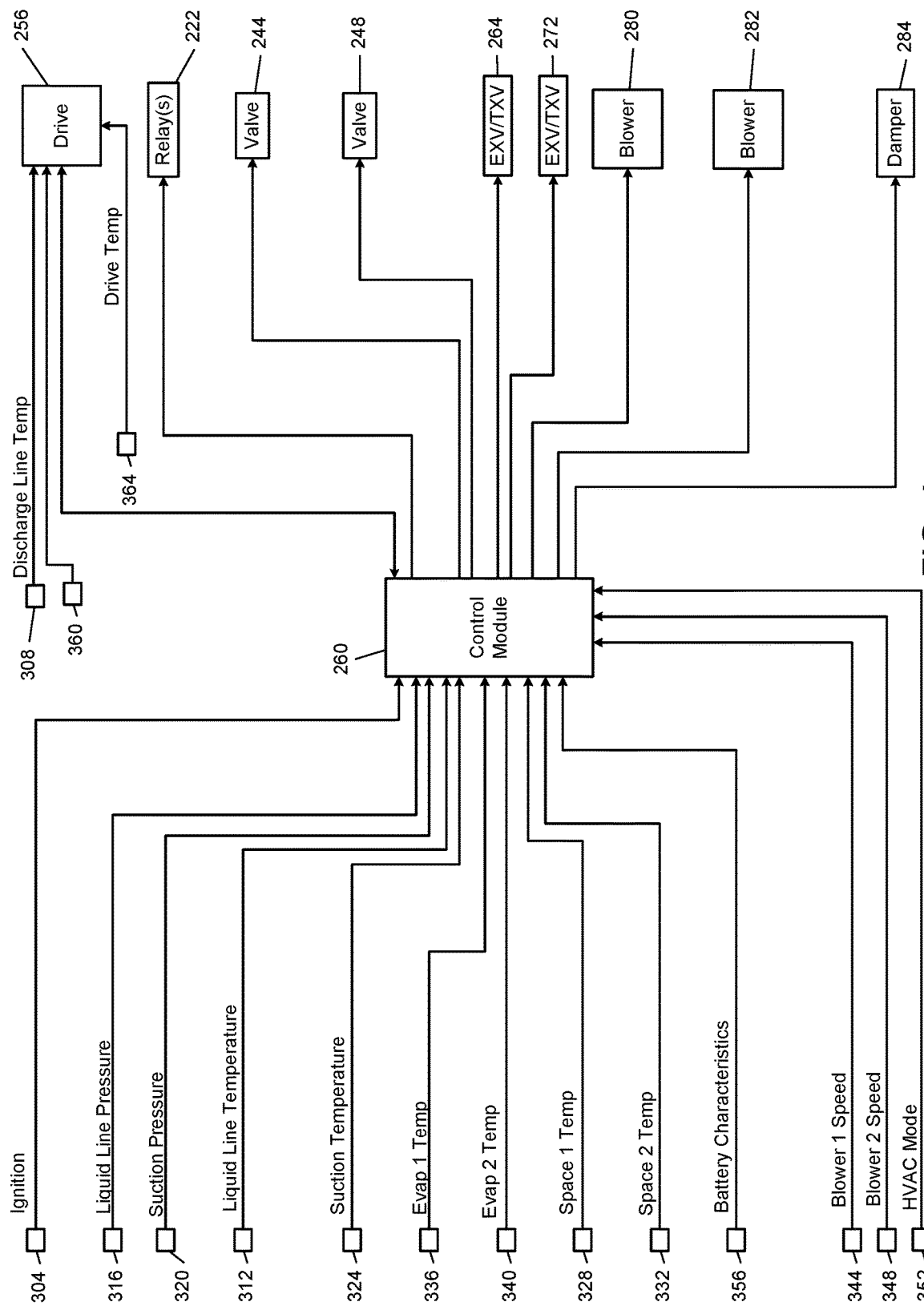
FIG. 4 includes a functional block diagram of an example system including a control module, various sensors of the vehicle, and various actuators of the vehicle.

FIG. 4 includes a functional block diagram of an example system including the control module 260, various sensors of the vehicle 100, and various actuators of the vehicle 100. The control module 260 receives various measured parameters and indications from sensors of the vehicle 100. The control module 260 controls actuators of the air conditioning system 124 of the vehicle 100. As an example, the control module 260 may be an iPRO series control module (e.g., 100 series, 200 series, 4 DIN series, 10 DIN series) by Dixell S.r.l., located in Pieve d'Alpago (BL) Italy. One example is an iPRO IPG115D control module, however, the control module 260 may be another suitable type of control module.

An ignition sensor 304 indicates whether an ignition system of the vehicle 100 is ON or OFF. A driver may turn the ignition system of the vehicle 100 ON and start the engine 104, for example, by actuating an ignition key, button, or switch. The ignition system being ON indicates that the engine 104 is ON and combusting air and fuel. A driver may turn the ignition system of the vehicle 100 OFF and shut down the engine 104, for example, by actuating the ignition key, button, or switch. The ignition system of being OFF indicates that the engine 104 is OFF and not combusting and air fuel.

A discharge line temperature (DLT) sensor 308 measures a temperature of refrigerant output by the compressor 204 (e.g., in the discharge line). The temperature of refrigerant output by the compressor 204 can be referred to as discharge line temperature or DLT. The discharge line temperature may be directly provided to the control module 260. Alternatively, the discharge line temperature may be provided to the drive 256 and the drive 256 may communicate the discharge line temperature to the control module 260.

A liquid line temperature sensor 312 measures a temperature of liquid refrigerant output from the condenser HEX 212 (e.g., in the liquid line). The temperature of refrigerant output by the condenser HEX 212 can be referred to as liquid line temperature. While one example location of the liquid line temperature sensor 312 is shown in FIG. 3, the liquid line temperature sensor 312 may be located at another location where liquid refrigerant is present in the refrigerant path from the condenser HEX 212 to the second evaporator HEX 276 and the first evaporator HEX 268.

A liquid line pressure sensor 316 measures a pressure of liquid refrigerant output from the condenser HEX 212 (e.g., in the liquid line). The pressure of refrigerant output by the condenser HEX 212 can be referred to as liquid line pressure. While one example location of the liquid line pressure sensor 316 is shown in FIG. 3, the liquid line pressure sensor 316 may be located at another location where liquid refrigerant is present in the refrigerant path from the condenser HEX 212 to the second evaporator HEX 276 and the first evaporator HEX 268.

A suction pressure sensor 320 measures a pressure of refrigerant input to the compressor 204 (e.g., in the suction line). The pressure of refrigerant input to the compressor 204 can be referred to as suction pressure.

A suction temperature sensor 324 measures a temperature of refrigerant input to the compressor 204 (e.g., in the suction line). The temperature of refrigerant input to the compressor 204 can be referred to as suction temperature.

A first air temperature sensor 328 measures a temperature of air in the driving portion 129 of the cooled space 128. For example, the first air temperature sensor 328 may measure a temperature of air input to the first evaporator HEX 268. The temperature of air in the driving portion 129 may be referred to as a driving portion temperature or a first space temperature (Space 1 temp).

A second air temperature sensor 332 measures a temperature of air in the living portion 131 of the cooled space 128. For example, the second air temperature sensor 332 may measure a temperature of air input to the second evaporator HEX 276. The temperature of air in the living portion 131 may be referred to as a living portion temperature or a second space temperature (Space 2 temp).

A first evaporator temperature sensor 336 measures a temperature of the first evaporator HEX 268. For example, the first evaporator temperature sensor 336 may measure the temperature of the first evaporator HEX 268 at or near a midpoint of refrigerant flow through the first evaporator HEX 268. The temperature of the first evaporator HEX 268 can be referred to as a first evaporator temperature.

A second evaporator temperature sensor 340 measures a temperature of the second evaporator HEX 276. For example, the second evaporator temperature sensor 340 may measure the temperature of the second evaporator HEX 276 at or near a midpoint of refrigerant flow through the second evaporator HEX 276. The temperature of the second evaporator HEX 276 can be referred to as a second evaporator temperature.

A first blower speed input 344 adjusts a first blower speed command of the first blower 280 based on user interaction (e.g., actuation, touching, etc.) with one or user input devices. For example, the first blower speed input 344 may increment and decrement the first blower speed command for the first blower 280 based on user input with the one or more user input devices. A second blower speed input 348 adjusts a second blower speed command of the second blower 282 based on user interaction (e.g., actuation, touching, etc.) with one or user input devices. For example, the second blower speed input 348 may increment and decrement the second blower speed command for the second blower 282 based on user input with the one or more user input devices. Examples of user input devices include one or more buttons, switches, and/or touchscreen displays.

A HVAC mode sensor 352 indicates a HVAC mode requested for the cooled space 128. The HVAC mode may be, for example, heat, A/C, maximum A/C, or OFF. The HVAC mode sensor 352 may indicate the HVAC mode based on user interaction (e.g., actuation, touching, etc.) with one or more input devices, such as one or more buttons, switches, and/or a touchscreen display. In various implementations, the HVAC mode may be provided by another control module of the vehicle 100.

A battery sensor 356 measures characteristics of a battery of the battery pack 120, such as voltage, current flow, temperature, and/or state of charge. In various implementations, a voltage sensor, a current sensor, and/or a temperature sensor may be provided with each battery of the battery pack 120. The battery sensor 356 may determine a state of charge (SOC) of the battery pack 120 based on one or more of the measured parameters.

One or more power sensors 360 measure power parameters of the drive 256. For example, a voltage sensor may measure a voltage input to the drive 256. A current sensor may measure a current flow to the drive 256. A power sensor may measure a power consumption of the drive 256. In various implementations, current and power sensors may be omitted, and the drive 256 may determine one or more currents and/or power consumption. In various implementations, the drive 256 may communicate the power consumption to the control module 260. The drive 256 or another module may determine the power consumption of the drive 256 based on one or more measured parameters (e.g., voltage input to the drive 256*current flow to the drive 256) and/or one or more other parameters (e.g., current flow to the drive 256 and a resistance of the drive 256).

A drive temperature sensor 364 measures a temperature at a location on the drive 256. A temperature of the drive 256 may be referred to as a drive temperature. In various implementations, the drive temperature sensor 364 may be implemented in the drive 256, and the drive 256 may communicate the drive temperature to the control module 260. In implementations, multiple drive temperature sensors may measure temperatures at different locations on the drive 256. In the example of the multiple drive temperature sensors, a highest (largest/hottest) one of the measured temperatures may be used as the drive temperature. Communication between the drive 256 and the control module 260 may be performed, for example, according to the MODBUS or CANBUS protocol.

Sensors described herein may be analog sensors or digital sensors. In the case of an analog sensor, the analog signal generated by the sensor may be sampled and digitized (e.g., by the control module 260, the drive 256, or another control module) to generate digital values, respectively, corresponding to the measurements of the sensor. In various implementations, the vehicle 100 may include a combination of analog sensors and digital sensors. For example, the ignition sensor 304 and the HVAC mode sensor 352 may be digital sensors. The liquid line pressure sensor 316, the suction pressure sensor 320, the liquid line temperature sensor 312, the suction temperature sensor 324, the first evaporator temperature sensor 336, the second evaporator temperature sensor 340, the first air temperature sensor 328, the second air temperature sensor 332, and the first and second blower speed inputs 344 and 348 may be analog sensors/devices.

As discussed further below, the control module 260 controls actuators of the air conditioning system 124 based on various measured parameters, indications, setpoints, and other parameters.

For example, the control module 260 may control a speed of the electric motor 216 of the compressor 204 via the drive 256. The control module 260 may also control the condenser fan(s) 220. For example, one or more relays (R) 222 may be connected between the battery pack 120 and the condenser fan(s). While the example of relays is provided, another suitable type of switching device may be used. The control module 260 may control switching of the relay(s) 222 to control the speed of the condenser fan(s) 220. For example, the control module 260 may control the speed of a condenser fan using pulse width modulation (PWM) or analog (e.g., 0-10 or 0-5 volts DC) control of a relay or an integrated fan control module. Increasing the on period of the PWM signal or the analog voltage applied to the integrated fan control module or relay increases the speed of the condenser fan. Conversely, decreasing the on period of the PWM signal or the analog voltage applied to the integrated fan control module or relay decreases the speed of the condenser fan.

One or more of the condenser fan(s) 220 may be variable speed and/or one or more of the condenser fan(s) 220 may be fixed speed. For example, the condenser fan(s) 220 may include one fixed speed fan and one variable speed fan. For a fixed speed condenser fan, when the fan is to be ON, the control module 260 closes the associated relay and maintains the relay closed. For a variable speed fan, the control module 260 may determine a speed command and apply a PWM signal or analog voltage to the associated relay or integrated fan control module based on the speed command. The control module 260 may determine the ON period of the PWM signal or the analog voltage to apply, for example, using one of a lookup table and an equation that relates speed commands to on periods of PWM signals or analog voltages.

The control module 260 may also control the first evaporator control valve 244. For example, the control module 260 may control the first evaporator control valve 244 to be open to enable refrigerant flow through the first evaporator HEX 268 or closed to disable refrigerant flow through the first evaporator HEX 268. In the example of the first expansion valve 264 being an EXV, the control module 260 may control opening of the first expansion valve 264.

The control module 260 may also control the second evaporator control valve 248. For example, the control module 260 may control the second evaporator control valve 248 to be open to enable refrigerant flow through the second evaporator HEX 276 or closed to disable refrigerant flow through the second evaporator HEX 276. In the example of the second expansion valve 272 being an EXV, the control module 260 may control opening of the second expansion valve 272.

The control module 260 may receive a signal that indicates whether the HPCO 262 has tripped (open circuited). The control module 260 may take one or more remedial actions when the HPCO 262 has tripped, such as closing one, more than one, or all of the above mentioned valves and/or turning OFF one, more than one, or all of the above mentioned fans. The control module 260 may generate an output signal indicating that the HPCO 262 has tripped when the discharge pressure of the compressor 204 is greater than a predetermined pressure. The control module 260 may enable operation of the air conditioning system 124 after the HPCO 262 closes in response to the discharge pressure falling below than the predetermined pressure. In various implementations, the control module 260 may also require that one or more operating conditions be satisfied before enabling operation of the air conditioning system 124 after the HPCO 262 closes.

The control module 260 may control the speeds of the first and second blowers 280 and 282. The first and second blowers 280 and 282 are variable speed blowers, and the control module 260 may determine first and second speed commands for the first and second blowers 280 and 282 and control the application of power to the first and second blowers 280 and 282 based on the first and second speed commands, respectively.

Figure 5:
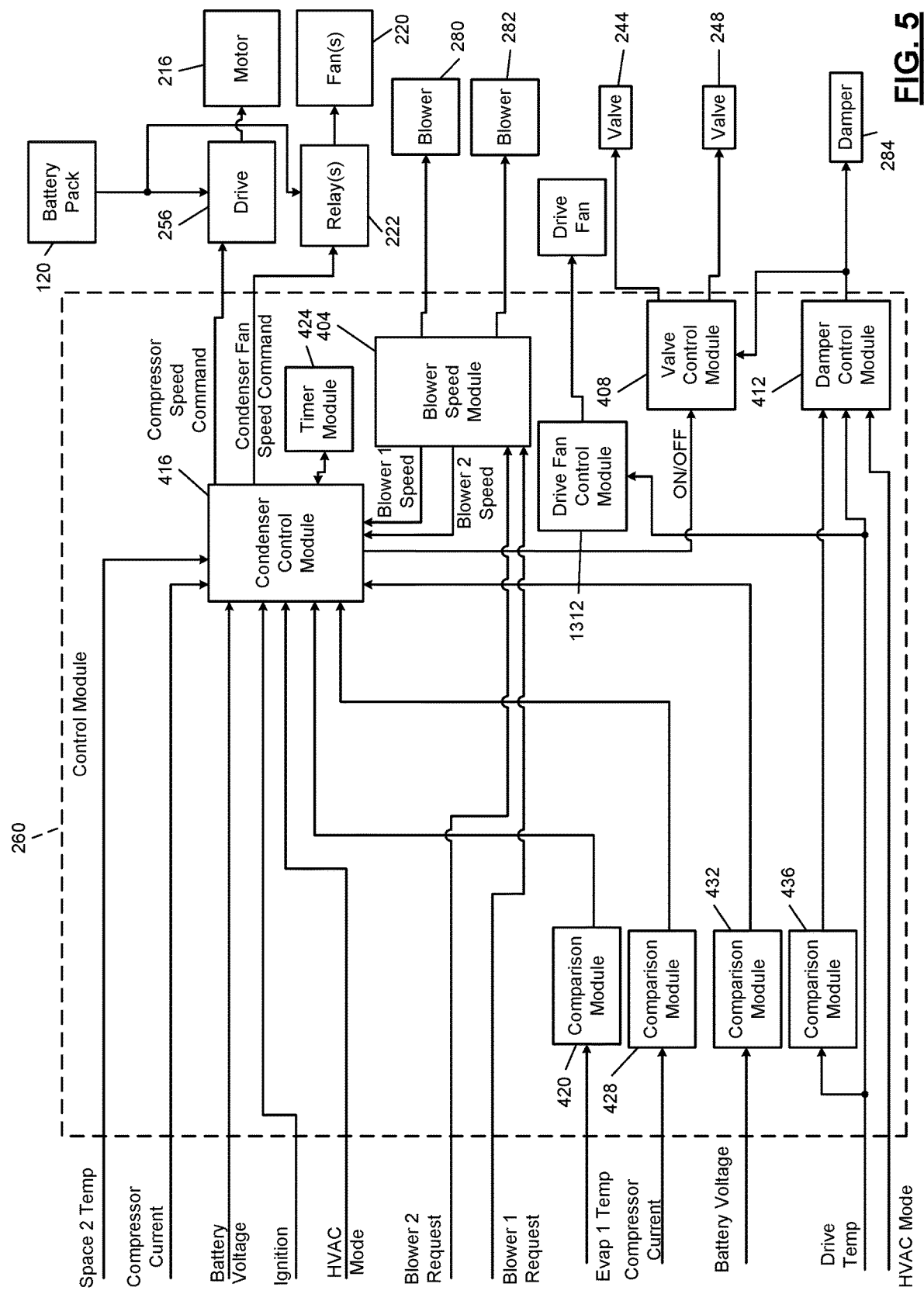
FIG. 5 includes a functional block diagram of an example implementation of the control module.

FIG. 5 is a functional block diagram of an example implementation of the control module 260. The control module 260 may include a blower speed module 404 that controls the speeds of the first and second blowers 280 and 282. Generally speaking, as the speed of a blower increases, cooling provided by the blower also increases and vice versa.

The blower speed module 404 controls the speeds of the first and second blowers 280 and 282 based on the first and second blower speed commands for the first and second blowers 280 and 282, respectively. For example, based on the first and second blower speed commands, the blower speed module 404 may generate respective power for the first and second blowers 280 and 282 from the power output of the battery pack 120 and apply the respective power to the first and second blowers 280 and 282.

A valve control module 408 controls actuation of the first and second evaporator control valves 244 and 248. More specifically, the valve control module 408 opens and closes the first evaporator control valve 244 and opens and closes the second evaporator control valve 248. The valve control module 408 determines whether to open or close the first evaporator control valve 244 and determines whether to open or close the second evaporator control valve 248 as discussed further below.

A damper control module 412 controls actuation of the damper door 284. More specifically, the damper control module 412 opens and closes the damper door 284. The damper control module 412 determines whether to open or close the damper door 284 as discussed further below.

A condenser control module 416 controls the speed of the electric motor 216 of the compressor 204 based on a compressor speed command. Generally speaking, output of the compressor 204 increases as the speed of the electric motor 216 increases, and vice versa. The condenser control module 416 sets the compressor speed command as discussed further below. Based on the compressor speed command, the drive 256 generates AC power from the power output of the battery pack 120 and applies the AC power to the electric motor 216 of the compressor 204. In various implementations, the compressor control module 416 may generate the AC power based on the compressor speed command and apply the AC power to the electric motor 216.

The condenser control module 416 controls the speed of electric motor(s) of the condenser fan(s) 220 based on a condenser fan speed command. Generally speaking, airflow through the condenser HEX 212 increases as the speed of the electric motor of the condenser fan(s) 220 increases, and vice versa. The condenser control module 416 sets the condenser fan speed command. The condenser control module 416 controls switching of the relay(s) 222 (and therefore the application of power) based on the condenser fan speed command. For example, for a fixed speed condenser fan, the condenser control module 416 may maintain an associated relay closed while the condenser fan speed command is greater than zero and open the associated relay when the condenser fan speed command is zero. For a variable speed condenser fan, the condenser control module 416 may switch an associated relay open and closed using a PWM signal having its on period (or an analog voltage) set based on the condenser fan speed command. The condenser control module 416 may increase the on period of a PWM signal or an analog voltage as the condenser fan speed command increases and vice versa.

The condenser control module 416 sets the compressor speed command based on a mathematical function of an initial compressor speed command and an adjustment value. For example, the condenser control module 416 may set the compressor speed command based on a mathematical product of the initial compressor speed command and the adjustment value (i.e., compressor speed command=initial compressor speed command*adjustment value). In this example, the adjustment value may be a value between 0.0 (corresponding to 0 percent) and 1.0 (corresponding to 100 percent). Values greater than 1.0, however, can also be used. While the example of multiplying the initial compressor speed command with the adjustment value will be discussed herein, another suitable mathematical function can be used, such as a sum of the initial compressor speed command and the adjustment value.

Figure 6:
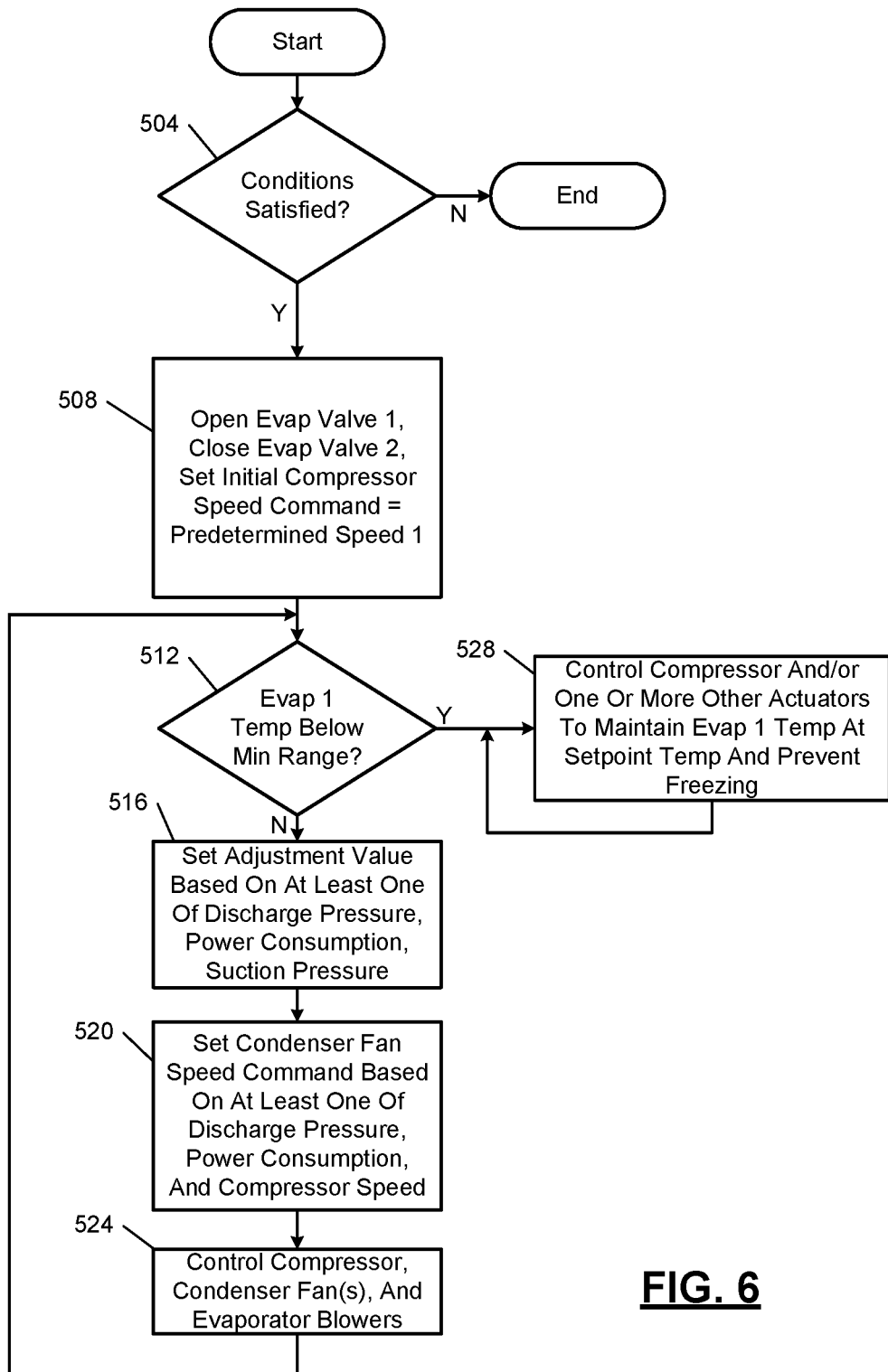
FIG. 6 includes a flowchart depicting an example method of controlling the speed of a compressor for pulldown.

FIG. 6 includes a flowchart depicting an example method of controlling the speed of the compressor 204 for pulldown while maximizing efficiency of the air conditioning system 124 and preventing freezing at the first evaporator HEX 268. Control begins with 504 where the condenser control module 416 determines whether the engine 104 is on (e.g., the ignition system is ON), the first blower 280 is on (e.g., the first blower speed command is greater than zero), the HVAC mode has transitioned to an A/C mode (e.g., A/C or maximum A/C), and the first evaporator temperature is greater than the maximum temperature of the predetermined temperature range. Under these circumstances, it is likely that cooling of the driving portion 129 will primarily be desired. Cooling of the living portion 131 may be secondary.

The predetermined temperature range is bounded by a minimum temperature and the maximum temperature. The minimum temperature may be a predetermined amount less than a predetermined setpoint temperature, and the maximum temperature may be the predetermined amount greater than the predetermined setpoint temperature.

The predetermined setpoint temperature may be calibratable and is set to greater than the freezing point temperature of water. For example, the predetermined setpoint temperature may be set to 36 degrees Fahrenheit or another suitable temperature that is greater than the freezing point temperature of water.

The predetermined amount may be calibratable and is set to less than a difference between the predetermined setpoint temperature and the freezing point temperature of water such that the minimum temperature is also greater than the freezing point temperature of water. For example only, the predetermined amount may be 2 degrees Fahrenheit or another suitable amount. In various implementations, the minimum and maximum temperatures may not be centered with respect to the predetermined setpoint temperature.

If 504 is false, control may end. While control is shown and discussed as ending, control may return to 504. If 504 is true, the condenser control module 416 sets the initial compressor speed command to a first predetermined maximum speed of the compressor 204 at 508. The first predetermined maximum speed may be calibratable and may be set to a maximum speed of the compressor 204 for use while the engine 104 is ON. For example only, the first predetermined maximum speed may be approximately 7000 revolutions per minute (RPM) or another suitable speed. Also at 508, the valve control module 408 opens the first evaporator control valve 244 and opens the second evaporator control valve 248. In various implementations, the valve control module 408 may open the first and second evaporator control valves 244 and 248 before the condenser control module 416 turns on the compressor 204. Operating the compressor 204 at the first predetermined maximum speed cools the first evaporator HEX 268 and the second evaporator HEX 276 (and therefore the driving and living portions 129 and 131) as quickly as possible. Because the engine 104 is ON, the battery pack 120 can be recharged as power is drawn from the battery pack 120 for operation of the air conditioning system 124. Control continues with 512.

At 512, the condenser control module 416 determines whether the first evaporator temperature is less than the minimum temperature of the predetermined temperature range.

If 512 is true, pulldown is complete, the valve control module 408 may close the second evaporator control valve 248, and control transfers to 528, which is discussed further below. In various implementations, the valve control module 408 may leave the second evaporator control valve 248 open. If 512 is false, control continues with 516. At 516, the condenser control module 416 determines the adjustment value based on at least one of the discharge pressure, the power consumption of the compressor 204, and the suction pressure. For example, the condenser control module 416 may determine the adjustment value using one of a lookup table and an equation that relates discharge pressures to adjustment values.

Figure 7:
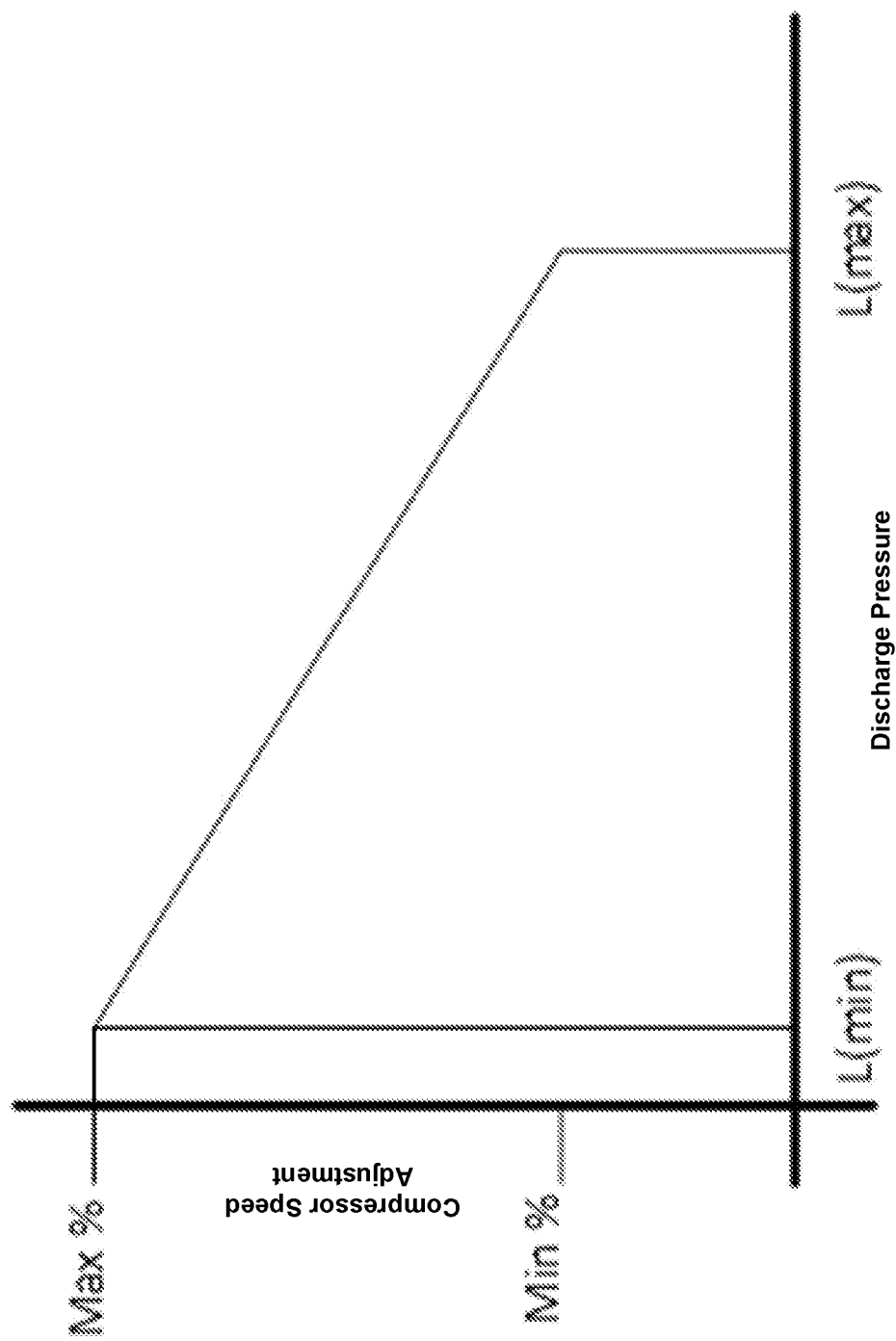
FIG. 7 includes an example graph of compressor speed command adjustment values as a function of discharge pressure.

FIG. 7 includes an example graph of adjustment values as a function of discharge pressure. Generally speaking, the condenser control module 416 may set the adjustment value to a predetermined maximum value when the discharge pressure is less than or equal to a predetermined minimum discharge pressure. The condenser control module 416 may set the adjustment value to a predetermined minimum value (e.g., 0.75) when the discharge pressure is greater than or equal to a predetermined maximum discharge pressure. The condenser control module 416 may decrease the adjustment value toward the predetermined minimum value as the discharge pressure increases between the predetermined minimum and maximum discharge pressures. The predetermined maximum value may be calibratable and may be set to 1.0 in the example of multiplication of the initial compressor speed command with the adjustment value.

Figure 8:
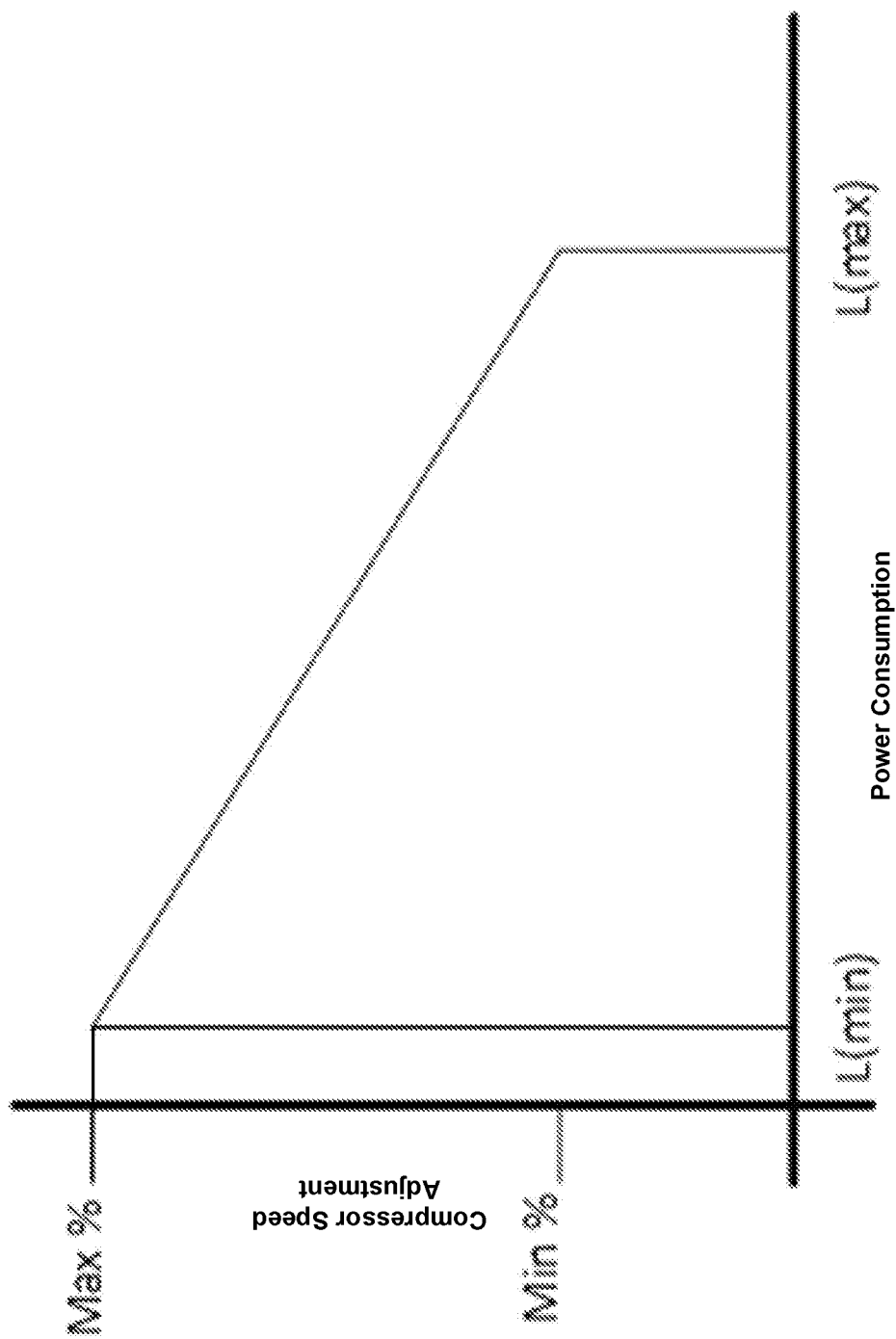
FIG. 8 includes an example graph of compressor speed command adjustment values as a function of power consumption.

Additionally or alternatively to the use of the discharge pressure, the condenser control module 416 may determine the adjustment value using one of a lookup table and an equation that relates power consumptions (e.g., in Watts (W) or kW) to adjustment values. FIG. 8 includes an example graph of adjustment values as a function of power consumption. Generally speaking, the condenser control module 416 may set the adjustment value to the predetermined maximum value when the power consumption is less than or equal to a predetermined minimum power consumption. The condenser control module 416 may set the adjustment value to a predetermined minimum value (e.g., 0.9) when the power consumption is greater than or equal to a predetermined maximum power consumption. The condenser control module 416 may decrease the adjustment value toward the predetermined minimum value as the power consumption increases between the predetermined minimum and maximum power consumptions. The predetermined minimum value in this example may be less than the predetermined minimum value associated with discharge pressure.

Additionally or alternatively to the use of the discharge pressure and/or the power consumption, the condenser control module 416 may determine the adjustment value using one of a lookup table and an equation that relates suction pressures to adjustment values. An example involving use of suction pressure is discussed further below.

In various implementations, the condenser control module 416 may determine the adjustment value based on two or all of the discharge pressure, the power consumption, and the suction pressure. For example, the condenser control module 416 may determine a first adjustment value based on the discharge pressure as discussed above. The condenser control module 416 may also determine a second adjustment value based on the power consumption as also discussed above. The condenser control module 416 may also determine a third adjustment value based on the suction pressure as also discussed above. The condenser control module 416 may determine the adjustment value based on the first, second, and third adjustment values. For example, the condenser control module 416 may set the adjustment value based on or equal to the lesser one of the first, second, and third adjustment values.

The condenser control module 416 determines the compressor speed command based on the initial compressor speed command and the adjustment value. For example, the condenser control module 416 may set the compressor speed command based on or equal to the initial compressor speed command multiplied by the adjustment value.

At 520, the condenser control module 416 may determine the condenser fan speed command. The condenser control module 416 may determine the condenser fan speed command, for example, using a lookup table or an equation that relates at least one of discharge pressures, power consumptions, and compressor speeds to condenser fan speed commands. In various implementations, 520 may be omitted and the condenser control module 416 may set the condenser fan speed command to a predetermined speed.

At 524, the condenser control module 416 controls the speed of the compressor 204 based on the compressor speed command and controls the speed of the condenser fan(s) 220 based on the condenser fan speed command. More specifically, the drive 256 may generate AC power for the electric motor 216 from the power output by the battery pack 120 and apply the AC power to the electric motor 216 of the compressor 204 to adjust the speed of the electric motor 216 toward or to the compressor speed command. The condenser control module 416 also determines the on period of a PWM signal or an analog voltage based on the condenser fan speed command and switches an associated relay or integrated fan control module of a variable speed condenser fan using the PWM signal or the analog voltage. If the condenser fan speed command is greater than zero, the condenser control module 416 may close the relay of an associated fixed speed condenser fan. Control returns to 512. The blower speed module 404 also controls the speeds of the first and second blowers 280 and 282 based on the first and second blower speed commands for the first and second blowers 280 and 282, respectively. For example, based on the first and second blower speed commands, the blower speed module 404 may generate respective power for the first and second blowers 280 and 282 from the power output of the battery pack 120 and apply the respective power to the first and second blowers 280 and 282.

At 528, the control module 260 controls one or more actuators of the air conditioning system 124 to maintain the first evaporator temperature at approximately the predetermined temperature setpoint. This prevents freezing at the first evaporator HEX 268. For example, as discussed further below, the condenser control module 416 may control the speed of the compressor 204 based on the first evaporator temperature and/or the suction pressure to maintain the first evaporator temperature at approximately the predetermined temperature setpoint. Additionally or alternatively, the condenser control module 416 may control the speed of the condenser fan(s) 220 to maintain the first evaporator temperature at approximately the predetermined temperature setpoint. Additionally or alternatively, the valve control module 408 may control opening/closing of the first and/or second evaporator control valves 244 and 248 to maintain the first evaporator temperature at approximately the predetermined temperature setpoint. When implemented, the valve control module 408 may additionally or alternatively control actuation of the first expansion valve 264 and/or the second expansion valve 272 to maintain the first evaporator temperature at approximately the predetermined temperature setpoint.

Figure 9A:
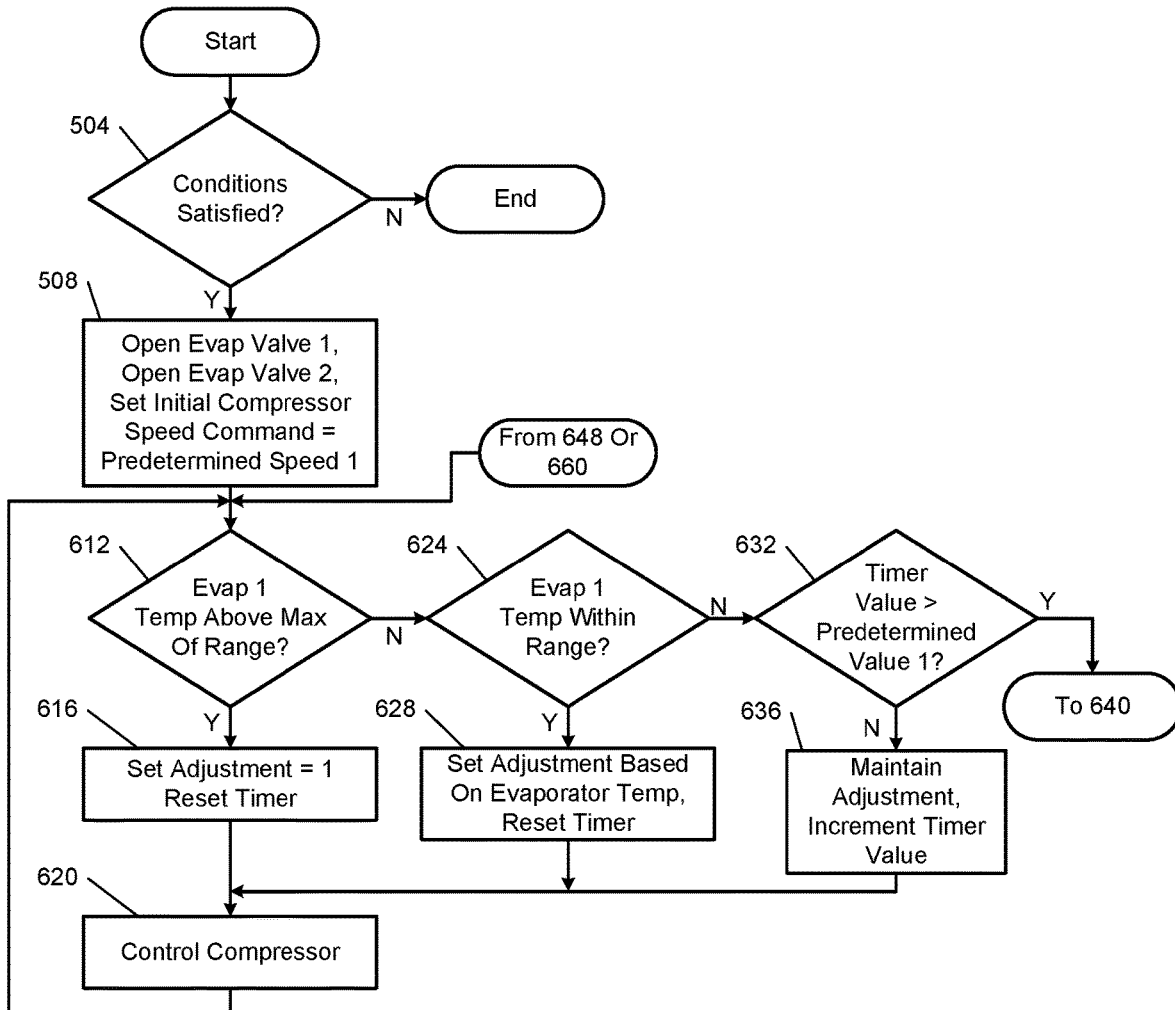
FIGS. 9A and 9B include a flowchart depicting an example method of controlling the speed of a compressor based on an evaporator temperature for pulldown and preventing freezing at the evaporator heat exchanger (HEX).
Figure 9B:
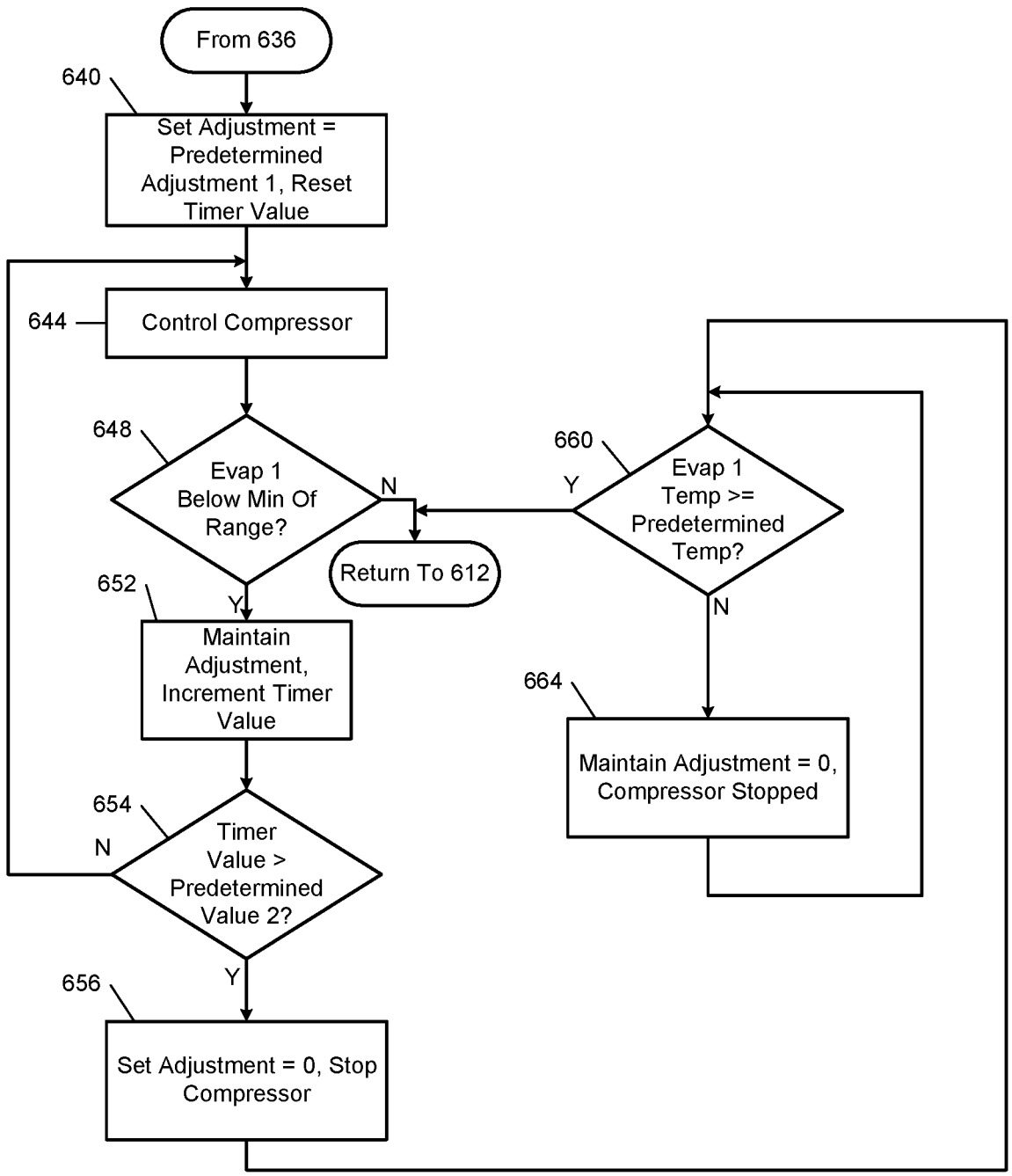

FIGS. 9A and 9B include a flowchart depicting an example method of controlling the speed of the compressor 204 based on the first evaporator temperature for pulldown and preventing freezing at the first evaporator HEX 268. Control begins with 504 and 508, as discussed above. Control continues with 612.

At 612, the condenser control module 416 determines whether the first evaporator temperature is greater than the maximum temperature of the predetermined temperature range. If 612 is false, control transfers to 624, which is discussed further below. If 612 is true, control continues with 616.

A first comparison module 420 may compare the first evaporator temperature with the minimum temperature of the predetermined temperature range and the maximum temperature of the predetermined temperature range. The first comparison module 420 may generate a signal indicative of whether the first evaporator temperature is greater than the maximum temperature, less than the minimum temperature, or between the minimum and maximum temperatures.

At 616, the condenser control module 416 sets the adjustment value to the predetermined maximum value. As discussed above, the condenser control module 416 sets the compressor speed command based on the initial compressor speed command and the adjustment value. The condenser control module 416 also resets a timer value tracked by a timer module 424. The condenser control module 416 may reset the timer value, for example, to zero.

At 620, the condenser control module 416 controls the speed of the compressor 204 based on the compressor speed command. More specifically, the drive 256 may generate AC power for the electric motor 216 from the power output by the battery pack 120 and apply the AC power to the electric motor 216 of the compressor 204 to adjust the speed of the electric motor 216 toward or to the compressor speed command. Control returns to 612.

At 624, the condenser control module 416 may determine whether the first evaporator temperature is between the minimum and maximum temperatures of the predetermined temperature range. If 624 is true, control continues with 628. If 624 is false, control may transfer to 632. At 628, the condenser control module 416 determines the adjustment value based on the suction pressure and resets the timer value. Control then continues with 620.

Figure 10:
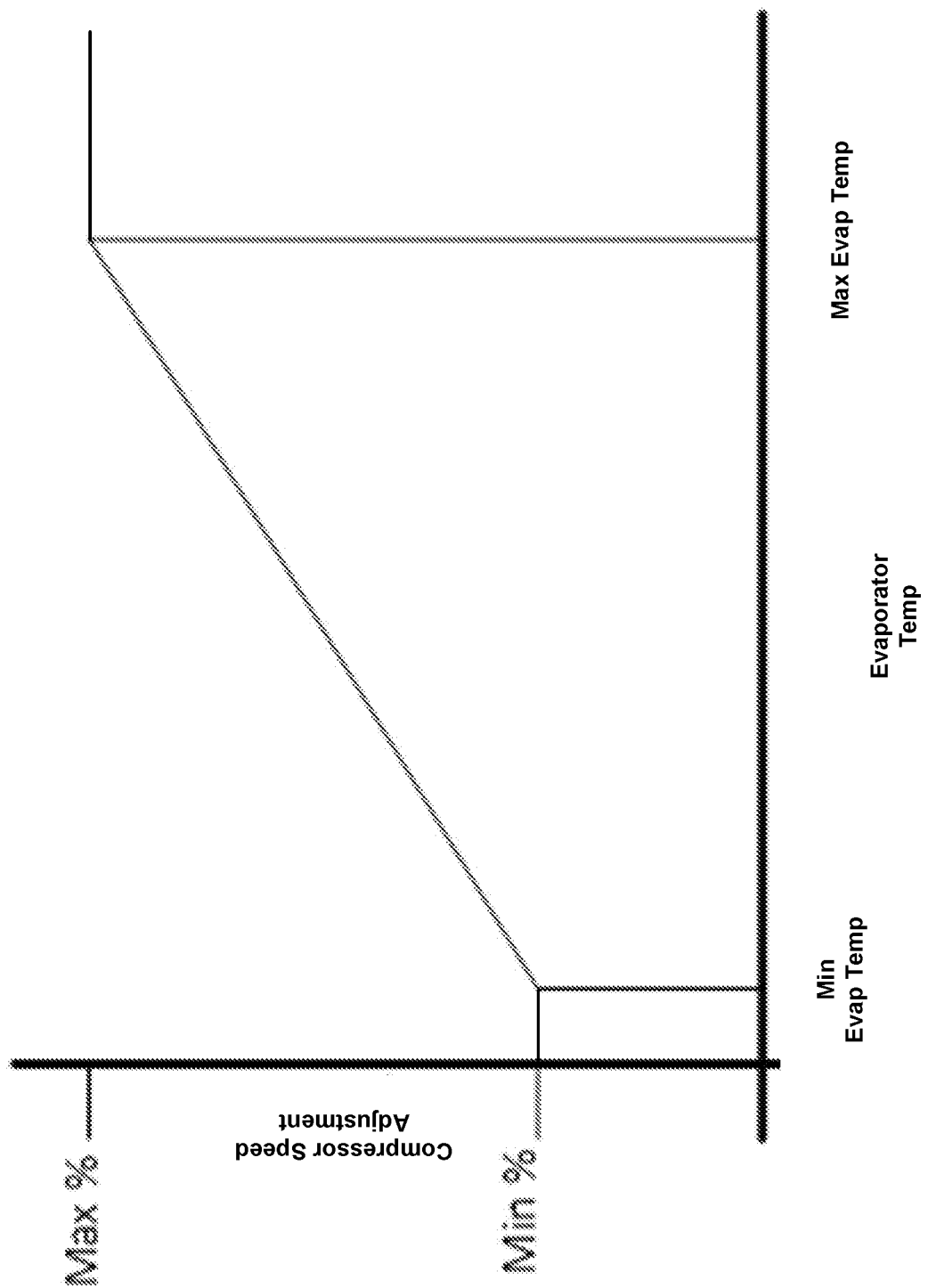
FIG. 10 includes an example graph of compressor speed command adjustment values as a function of evaporator temperature.

For example, the condenser control module 416 may determine the adjustment value using one of a lookup table and an equation that relates suction pressures to adjustment values. FIG. 10 includes an example graph of adjustment values as a function of evaporator temperature. Generally speaking, the condenser control module 416 may set the adjustment value to the predetermined maximum value when the first evaporator temperature is greater than or equal to the maximum temperature of the predetermined temperature range. The condenser control module 416 may set the adjustment value to a predetermined minimum value (e.g., 0.8) when the first evaporator temperature is less than or equal to the minimum temperature of the predetermined temperature range. The condenser control module 416 may increase the adjustment value toward the predetermined maximum value as the first evaporator temperature increases between the minimum and maximum temperatures.

Referring again to FIG. 9A, at 632 (when the first evaporator temperature is less than the minimum temperature of the predetermined temperature range) the condenser control module 416 may determine whether the timer value is greater than a first predetermined timer value. The first predetermined timer value corresponds to a predetermined period. The first predetermined timer value may be calibratable and may be set, for example, to correspond to approximately 30 seconds or another suitable value. If 632 is false, the condenser control module 416 maintains the adjustment value (i.e., leaves the adjustment value unchanged from its last value) at 636 and increments the timer by a predetermined increment value. Control then continues with 620. At this time, the timer value therefore corresponds to the period since the first evaporator temperature became less than the minimum temperature of the predetermined temperature range. If 632 is true, control transfers to 640 of FIG. 9B.

At 640, the condenser control module 416 sets the adjustment value to a first predetermined adjustment value that is less than the predetermined minimum value used when the suction pressure is less than or equal to the predetermined minimum suction pressure. For example, in the example of the predetermined minimum value being 0.8, the first predetermined adjustment value may be 0.75 or another suitable value that is less than the predetermined minimum value and greater than 0.0. The condenser control module 416 determines the compressor speed command based on the initial compressor speed command and the adjustment value, as discussed above. The condenser control module 416 also resets the timer value at 640.

At 644, the condenser control module 416 controls the speed of the compressor 204 based on the compressor speed command. More specifically, the drive 256 may generate AC power for the electric motor 216 from the power output by the battery pack 120 and apply the AC power to the electric motor 216 of the compressor 204 to adjust the speed of the electric motor 216 toward or to the compressor speed command.

At 648, the condenser control module 416 determines whether the first evaporator temperature is less than the minimum temperature of the predetermined temperature range. If 648 is false, the condenser control module 416 may reset the timer value and control may return to 612. If 648 is true, control may continue with 652.

The condenser control module 416 maintains the adjustment value (i.e., leaves the adjustment value unchanged from its last value) at 652 and increments the timer value by the predetermined increment value. Control then continues with 654. At this time, the timer value therefore corresponds to the period that the adjustment value has been set to the first predetermined adjustment value (due to the first evaporator temperature being less than the minimum temperature of the predetermine temperature range).

At 654, the condenser control module 416 may determine whether the timer value is greater than a second predetermined timer value. The second predetermined timer value corresponds to a second predetermined period. The second predetermined timer value may be calibratable and may be set, for example, to correspond to approximately 1 minute or another suitable value. If 654 is false control returns to 644 to continue controlling the compressor speed based on the first predetermined adjustment value. If 654 is true, control continues with 656.

At 656, the condenser control module 416 sets the adjustment value to a predetermined compressor stopping value. Based on the adjustment value being set to the predetermined compressor stopping value, the condenser control module 416 sets the compressor speed command to 0. When the compressor speed command is 0, the drive 256 does not apply power to the electric motor 216, thereby stopping rotation of the electric motor 216 and the compressor 204. The condenser control module 416 disables the compressor 204 at this time to prevent freezing at the first evaporator HEX 268. In the example of setting the compressor speed command to the initial compressor speed command multiplied by the adjustment value, the predetermined compressor stopping value is 0.0. Control may continue with 660.

At 660, the condenser control module 416 may determine whether the first evaporator temperature is greater than or equal to the predetermined setpoint temperature. If 660 is true, the condenser control module 416 maintains the adjustment value at the predetermined compressor stopping value at 664. This maintains the compressor 204 stopped. Control returns to 660. In this way, the condenser control module 416 disables the compressor 204 until the first evaporator temperature increases to prevent freezing at the first evaporator HEX 268. If 660 is true, the condenser control module 416 may reset the timer value and control may return to 612.

Figure 11A:
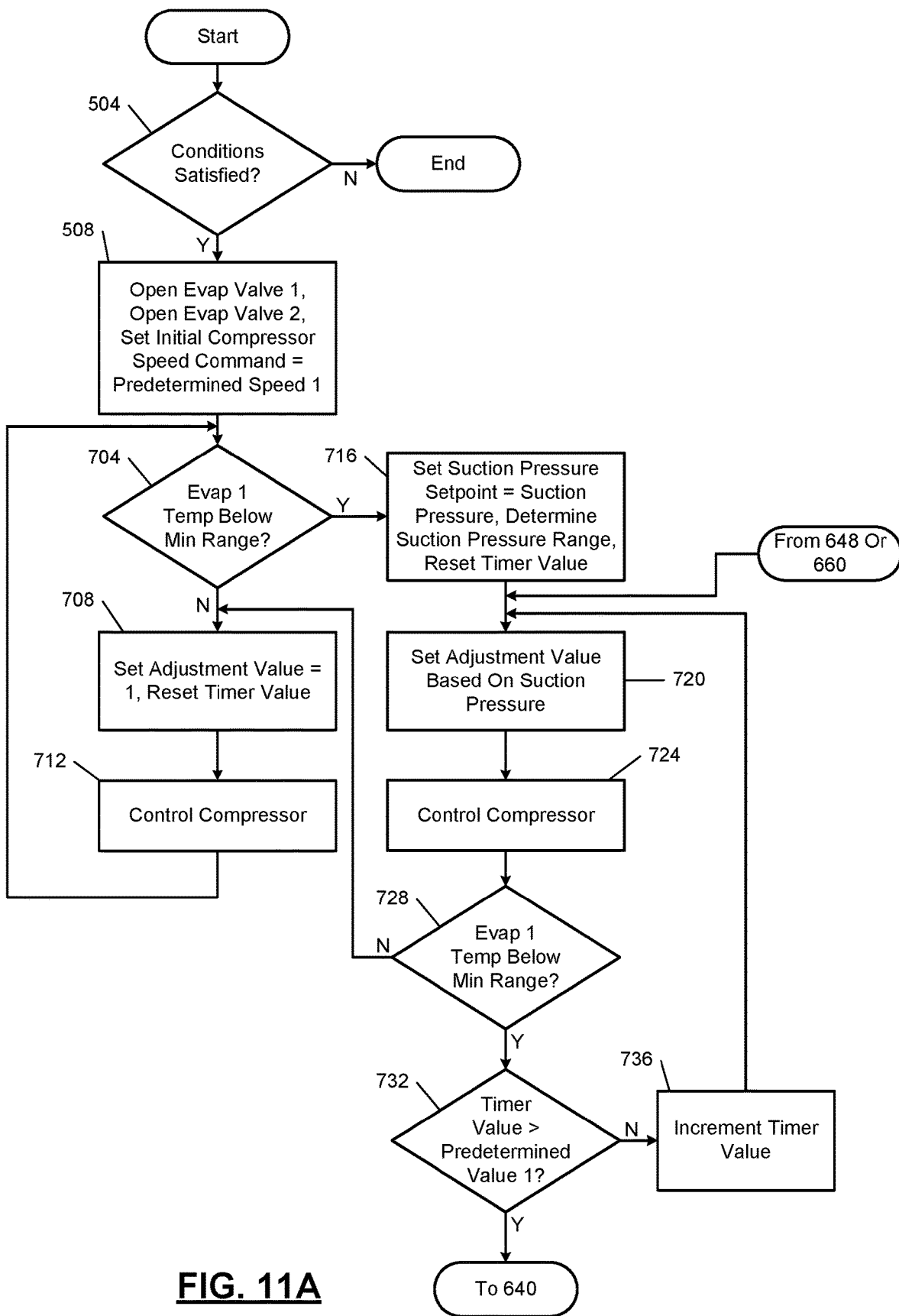
FIGS. 11A and 11B include a flowchart depicting an example method of controlling the speed of a compressor based on an evaporator temperature and a suction pressure for pulldown and preventing freezing at the evaporator HEX.
Figure 11B:
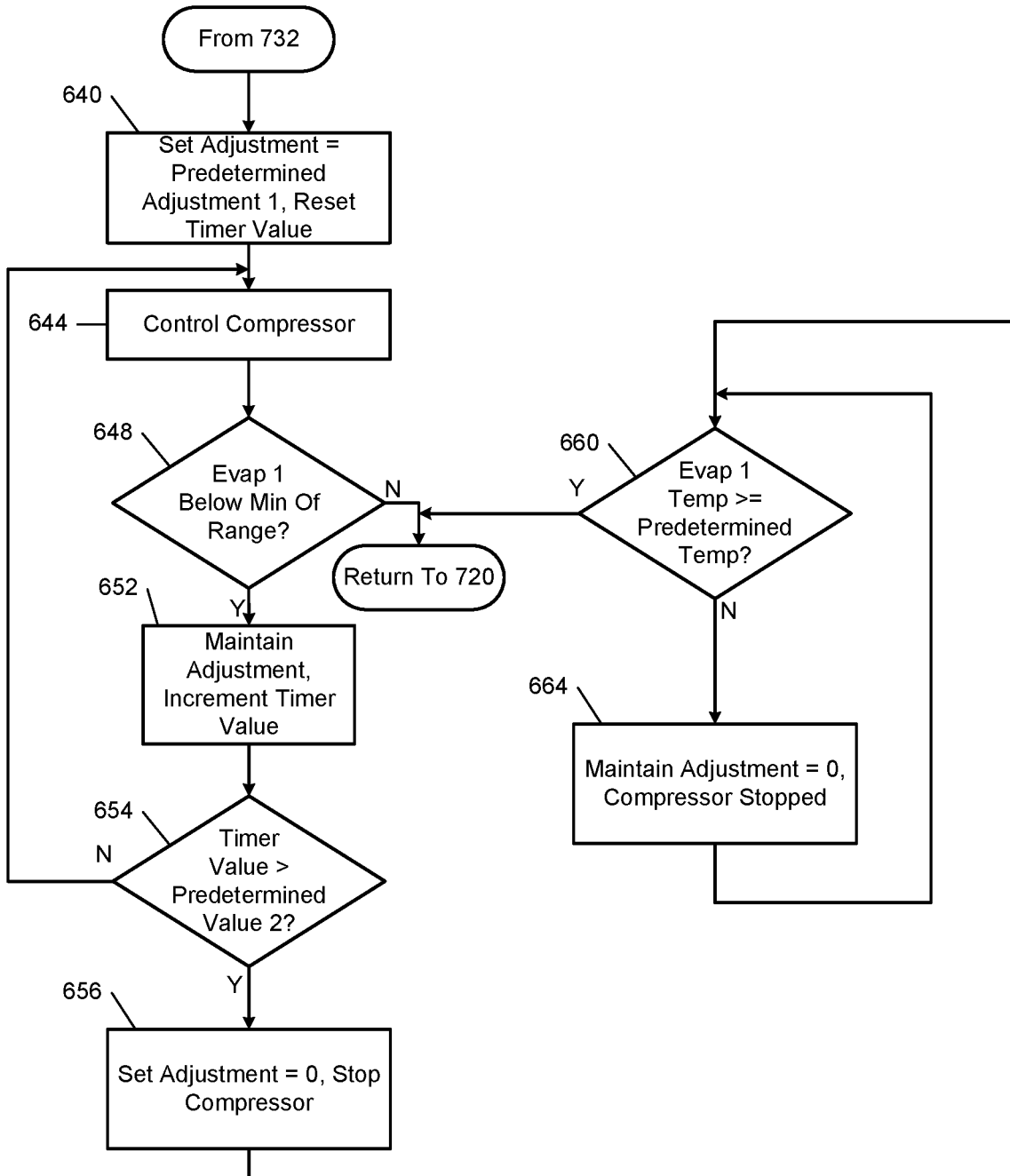

FIGS. 11A and 11B include a flowchart depicting an example method of controlling the speed of the compressor 204 based on the first evaporator temperature and the suction pressure for pulldown and preventing freezing at the first evaporator HEX 268. Control begins with 504 and 508, as discussed above. Control continues with 704.

At 704, the condenser control module 416 determines whether the first evaporator temperature is less than the minimum temperature of the predetermined temperature range. If 704 is true, control transfers to 716, which is discussed further below. If 704 is false, control continues with 708.

At 708, the condenser control module 416 sets the adjustment value to the predetermined maximum value (e.g., 1.0). The condenser control module 416 may also reset the timer value at 708. The condenser control module 416 determines the compressor speed command based on the adjustment value and the initial compressor speed command as described above. At 712, the condenser control module 416 controls the speed of the compressor 204 based on the compressor speed command. More specifically, the drive 256 may generate AC power for the electric motor 216 from the power output by the battery pack 120 and apply the AC power to the electric motor 216 of the compressor 204 to adjust the speed of the electric motor 216 toward or to the compressor speed command. Control returns to 704.

At 716, the condenser control module 416 obtains the (present value of the) suction pressure and sets a predetermined setpoint suction pressure based on or equal to the suction pressure. The condenser control module 416 also determines a predetermined minimum suction pressure and a predetermined maximum suction pressure at 716. For example, the condenser control module 416 may set the predetermined minimum suction pressure based on or equal to the predetermined setpoint suction pressure minus a second predetermined amount. The condenser control module 416 may set the predetermined maximum suction pressure based on or equal to the predetermined setpoint suction pressure plus the second predetermined amount. The condenser control module 416 also resets the timer value at 716.

At 720, the condenser control module 416 determines the adjustment value based on the suction pressure. For example, the condenser control module 416 may determine the adjustment value using one of a lookup table and an equation that relates suction pressures to adjustment values. The condenser control module 416 determines the compressor speed command based on the initial compressor speed command and the adjustment value.

Figure 12:
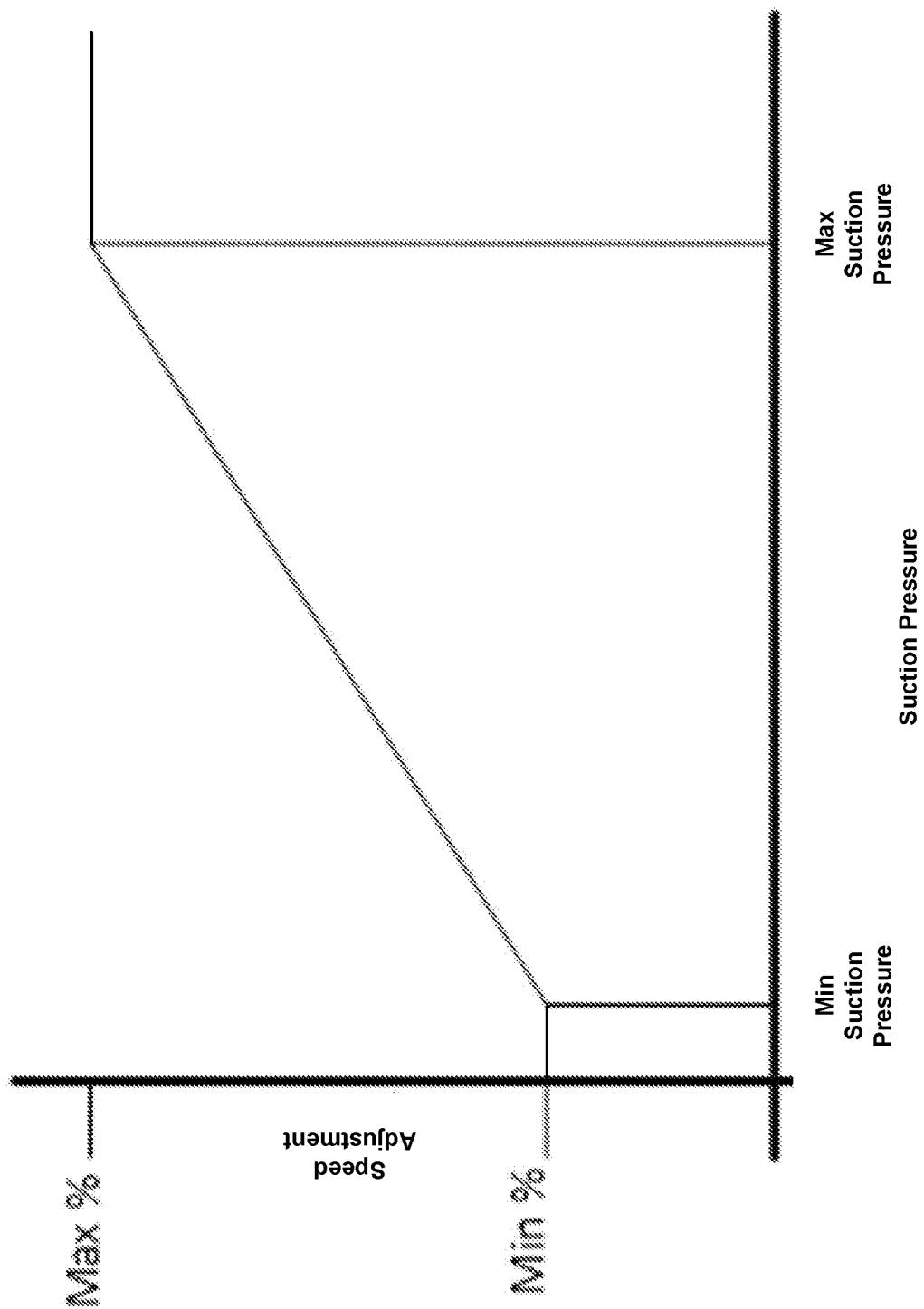
FIG. 12 includes an example graph of compressor speed command adjustment values as a function of suction pressure.

FIG. 12 includes an example graph of adjustment values as a function of suction pressure. Generally speaking, the condenser control module 416 may set the adjustment value to the predetermined maximum value when the suction pressure is greater than or equal to the predetermined maximum suction pressure. The condenser control module 416 may set the adjustment value to a predetermined minimum value (e.g., 0.8) when the suction pressure is less than or equal to the predetermined minimum suction pressure. The condenser control module 416 may increase the adjustment value toward the predetermined maximum value as the suction pressure increases between the predetermined minimum and maximum suction pressures.

The predetermined minimum and maximum suction pressures bound a predetermined suction pressure range. For example only, the second predetermined amount may be calibratable and may be, for example, approximately 1-5 psig or another suitable amount. In various implementations, the predetermined minimum and maximum suction pressures may not be centered with respect to the predetermined setpoint suction pressure.

Referring again to FIG. 11A, at 724, the condenser control module 416 controls the speed of the compressor 204 based on the compressor speed command. More specifically, the drive 256 may generate AC power for the electric motor 216 from the power output by the battery pack 120 and apply the AC power to the electric motor 216 of the compressor 204 to adjust the speed of the electric motor 216 toward or to the compressor speed command.

At 728, the condenser control module 416 determines whether the first evaporator temperature is less than the minimum temperature of the predetermined temperature range. If 728 is false, control may return to 708. If 728 is true, control may continue with 732.

At 732, the condenser control module 416 may determine whether the timer value is greater than the first predetermined timer value. The first predetermined timer value corresponds to a predetermined period. The first predetermined timer value may be calibratable and may be set, for example, to correspond to approximately 30 seconds or another suitable value. If 732 is false, the condenser control module 416 increments the timer value by the predetermined increment value at 736, and control returns to 720. At this time, the timer value therefore corresponds to the period that the first evaporator temperature has been less than minimum temperature of the predetermine temperature range during use of the suction pressure to determine the adjustment value. If 732 is true, control continues with 640-664, as discussed above in conjunction with the example of FIGS. 9A and 9B. In the example of FIGS. 11A and 11B, control returns to 720 from 648 and 660. The setting of the adjustment value to the first predetermined adjustment value (e.g., at 640) and the disabling of the compressor 204 (e.g., at 656) prevent freezing at the first evaporator HEX 268.

In various implementations, the vehicle may also include a humidity sensor that measures a humidity of air within the cooled space 128. The control module 260 may adjust one or more operating parameters based on the humidity. For example, in conjunction with the freezing prevention examples, the control module 260 may adjust the speed of the compressor 204 and/or a blower speed based on the humidity. Generally speaking, to help prevent freezing of an evaporator HEX, the control module 260 may decrease the speed of the compressor 204 as the humidity increases and vice versa. Additionally or alternatively, to help prevent freezing of an evaporator HEX, the control module 260 may increase the blower speed associated with that evaporator HEX as humidity increases, and vice versa.

Figure 13:
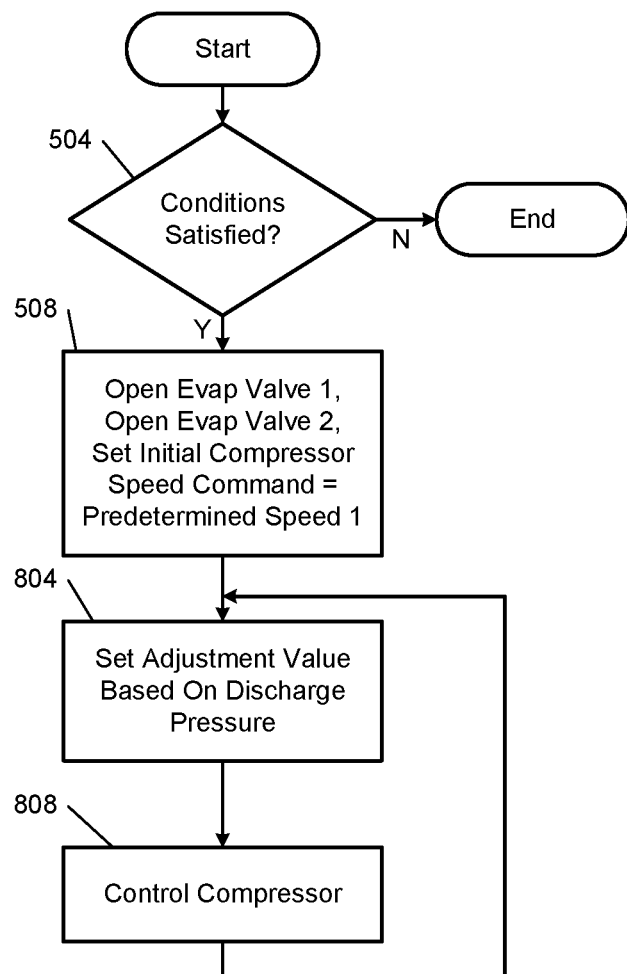
FIG. 13 includes a flowchart depicting an example method of controlling the speed of a compressor based on discharge pressure.

FIG. 13 includes a flowchart depicting an example method of controlling the speed of the compressor 204 based on discharge pressure to limit power consumption of the air conditioning system 124, maximize efficiency of the air conditioning system 124, and improve comfort in the driving portion 129. Control begins with 504-508, as discussed above.

At 804, the condenser control module 416 determines the adjustment value based on the discharge pressure. For example, the condenser control module 416 may determine the adjustment value using one of a lookup table and an equation that relates discharge pressures to adjustment values. The condenser control module 416 determines the compressor speed command based on the adjustment value and the initial compressor speed command as discussed above.

As discussed above, FIG. 7 includes an example graph of adjustment values as a function of discharge pressure. Generally speaking, the condenser control module 416 may set the adjustment value to the predetermined maximum value (e.g., 1.0) when the discharge pressure is less than or equal to the predetermined minimum discharge pressure. The condenser control module 416 may set the adjustment value to the predetermined minimum value (e.g., 0.75) when the discharge pressure is greater than or equal to the predetermined maximum discharge pressure. The condenser control module 416 may decrease the adjustment value toward the predetermined minimum value as the discharge pressure increases between the predetermined minimum and maximum discharge pressures.

At 808, the condenser control module 416 controls the speed of the compressor 204 based on the compressor speed command. More specifically, the drive 256 may generate AC power for the electric motor 216 from the power output by the battery pack 120 and apply the AC power to the electric motor 216 of the compressor 204 to adjust the speed of the electric motor 216 toward or to the compressor speed command. Control may then return to 804.

Controlling the speed of the compressor 204 based on the discharge pressure limits power consumption of the air conditioning system 124 by decreasing the speed of the compressor 204 as the discharge pressure increases. At a given speed, power consumption of the air conditioning system 124 increases as the discharge pressure increases. Decreasing power consumption increases efficiency of the air conditioning system 124 and may improve comfort in the driving portion 129 by preventing the compressor 204 from being cycled OFF and ON.

Figure 14:
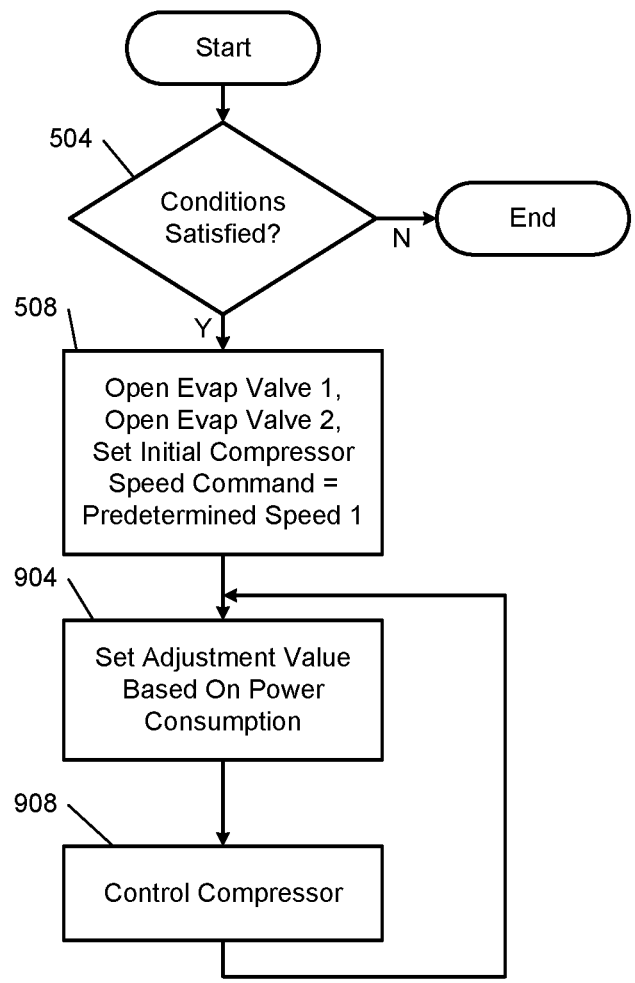
FIG. 14 includes a flowchart depicting an example method of controlling the speed of a compressor based on power consumption of the air conditioning system.

FIG. 14 includes a flowchart depicting an example method of controlling the speed of the compressor 204 based on power consumption of the air conditioning system 124 to maximize efficiency of the air conditioning system 124, limit power consumption of the air conditioning system 124, and improve comfort in the driving portion 129. Control begins with 504-508, as discussed above.

At 904, the condenser control module 416 determines the adjustment value based on the power consumption of the air conditioning system 124. For example, the condenser control module 416 may determine the adjustment value using one of a lookup table and an equation that relates power consumptions to adjustment values. The condenser control module 416 determines the compressor speed command based on the adjustment value and the initial compressor speed command as discussed above.

As discussed above, FIG. 8 includes an example graph of adjustment values as a function of power consumption. Generally speaking, the condenser control module 416 may set the adjustment value to the predetermined maximum value (e.g., 1.0) when the power consumption is less than or equal to the predetermined minimum power consumption. The condenser control module 416 may set the adjustment value to the predetermined minimum value (e.g., 0.9) when the power consumption is greater than or equal to the predetermined maximum power consumption. The condenser control module 416 may decrease the adjustment value toward the predetermined minimum value as the power consumption increases between the predetermined minimum and maximum power consumptions.

At 908, the condenser control module 416 controls the speed of the compressor 204 based on the compressor speed command. More specifically, the drive 256 may generate AC power for the electric motor 216 from the power output by the battery pack 120 and apply the AC power to the electric motor 216 of the compressor 204 to adjust the speed of the electric motor 216 toward or to the compressor speed command. Control may then return to 904.

Controlling the speed of the compressor 204 based on the power consumption of the air conditioning system 124 may improve efficiency by decreasing the speed of the compressor 204 as the power consumption increases. Decreasing power consumption may also improve comfort in the driving portion 129 by preventing the compressor 204 from being cycled OFF and ON.

Figure 15:
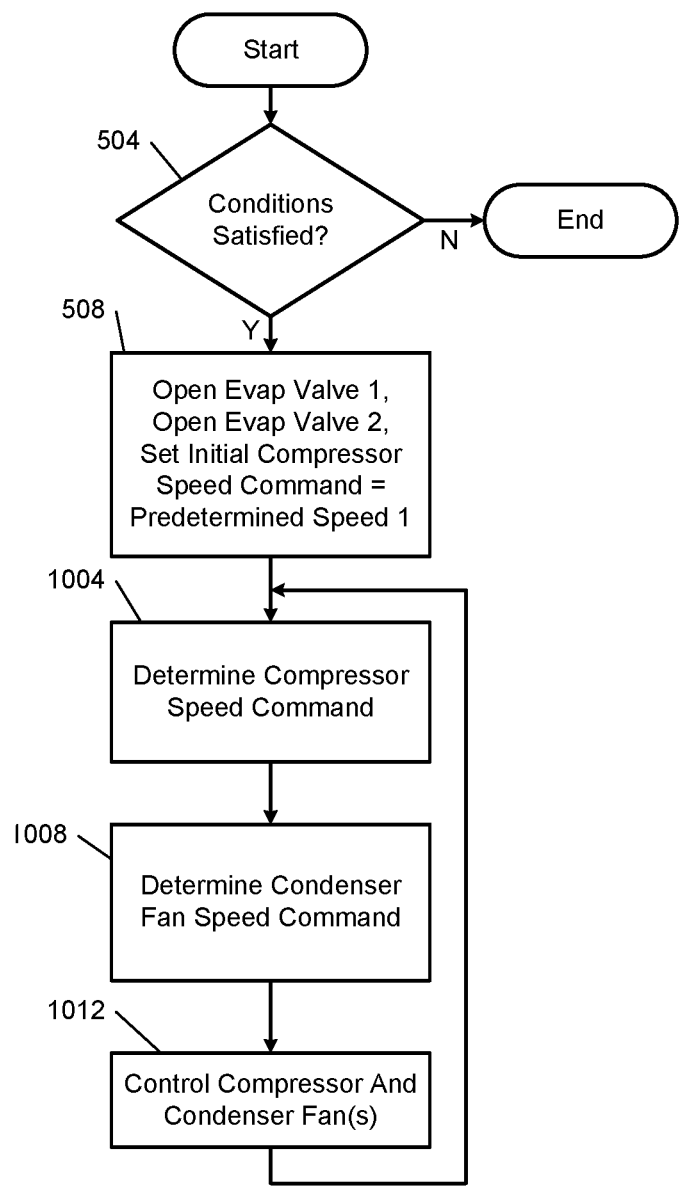
FIG. 15 includes a flowchart depicting an example method of controlling the speed of a compressor and the speed of a condenser fan.

FIG. 15 includes a flowchart depicting an example method of controlling the speed of the compressor 204 and the speed of the condenser fan(s) 220 to limit power consumption of the air conditioning system 124, maximize efficiency, and improve comfort in the driving portion 129. Control begins with 504-508, as discussed above.

At 1004, the condenser control module 416 determines the compressor speed command. The condenser control module 416 may determine the compressor speed command based on the first evaporator temperature (e.g., in the example of FIGS. 9A and 9B), based on the first evaporator temperature and the suction pressure (e.g., in the example of FIGS. 11A and 11B), based on the discharge pressure (e.g., in the example of FIG. 13), or based on the power consumption (e.g., in the example of FIG. 14).

At 1008, the condenser control module 416 determines the condenser fan speed command based on at least one of the power consumption, the discharge pressure, and the compressor speed (e.g., the compressor speed command). The condenser control module 416 may determine the condenser fan speed using at least one of a lookup table and an equation that relates at least one of power consumptions, discharge pressures, and compressor speeds to condenser fan speed commands.

Figure 16:
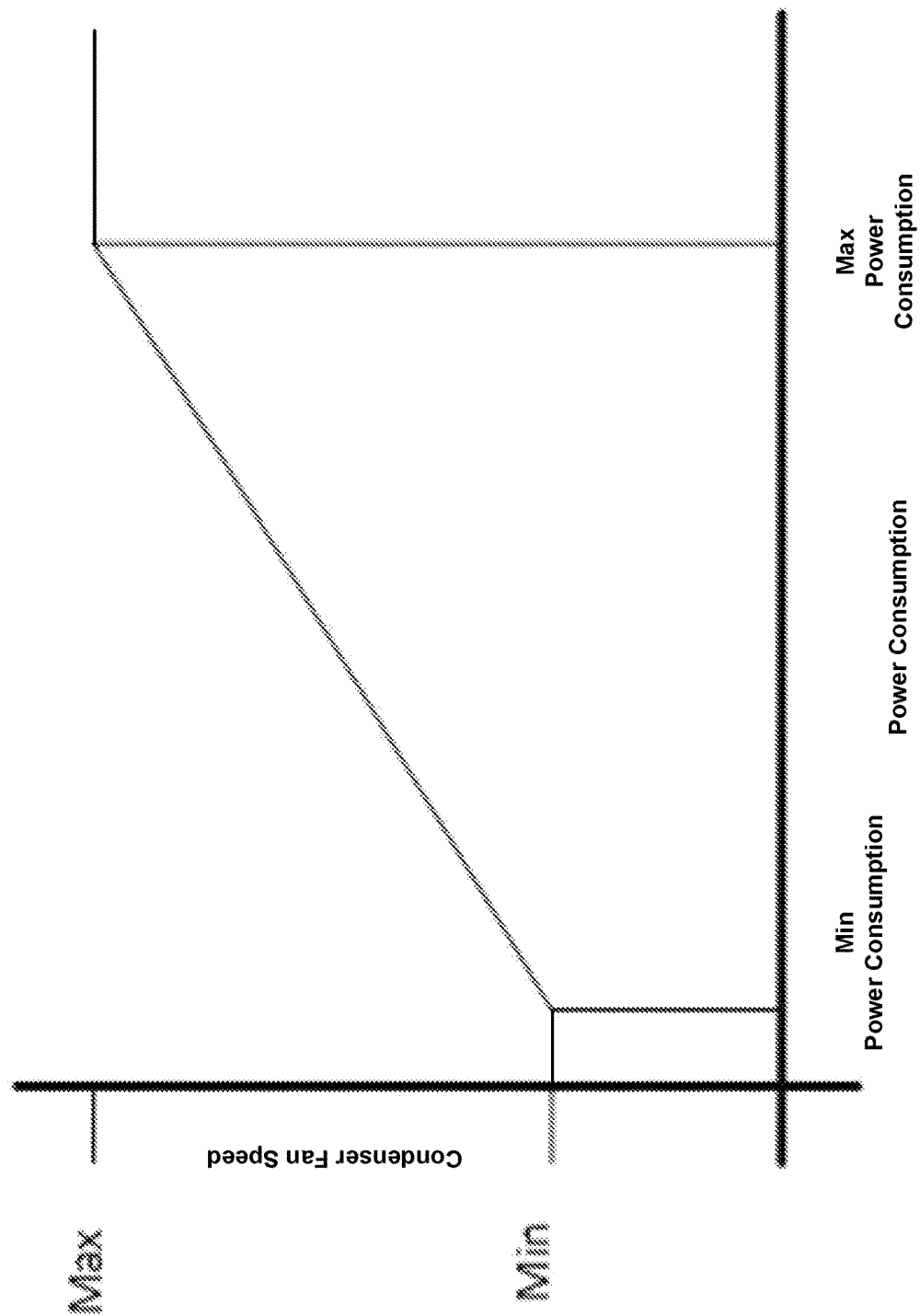

FIG. 16 includes an example graph of condenser fan speed commands as a function of power consumption for when the engine 104 is on. Generally speaking, when the engine 104 is on, the condenser control module 416 may set the condenser fan speed command toward or to a predetermined minimum speed when the power consumption is greater than or equal to a predetermined maximum power consumption. The condenser control module 416 may set the condenser fan speed command to a predetermined maximum speed when the power consumption is less than or equal to a predetermined minimum power consumption. The condenser control module 416 may decrease the condenser fan speed command as the power consumption increases between the predetermined minimum and maximum power consumptions.

Figure 17:
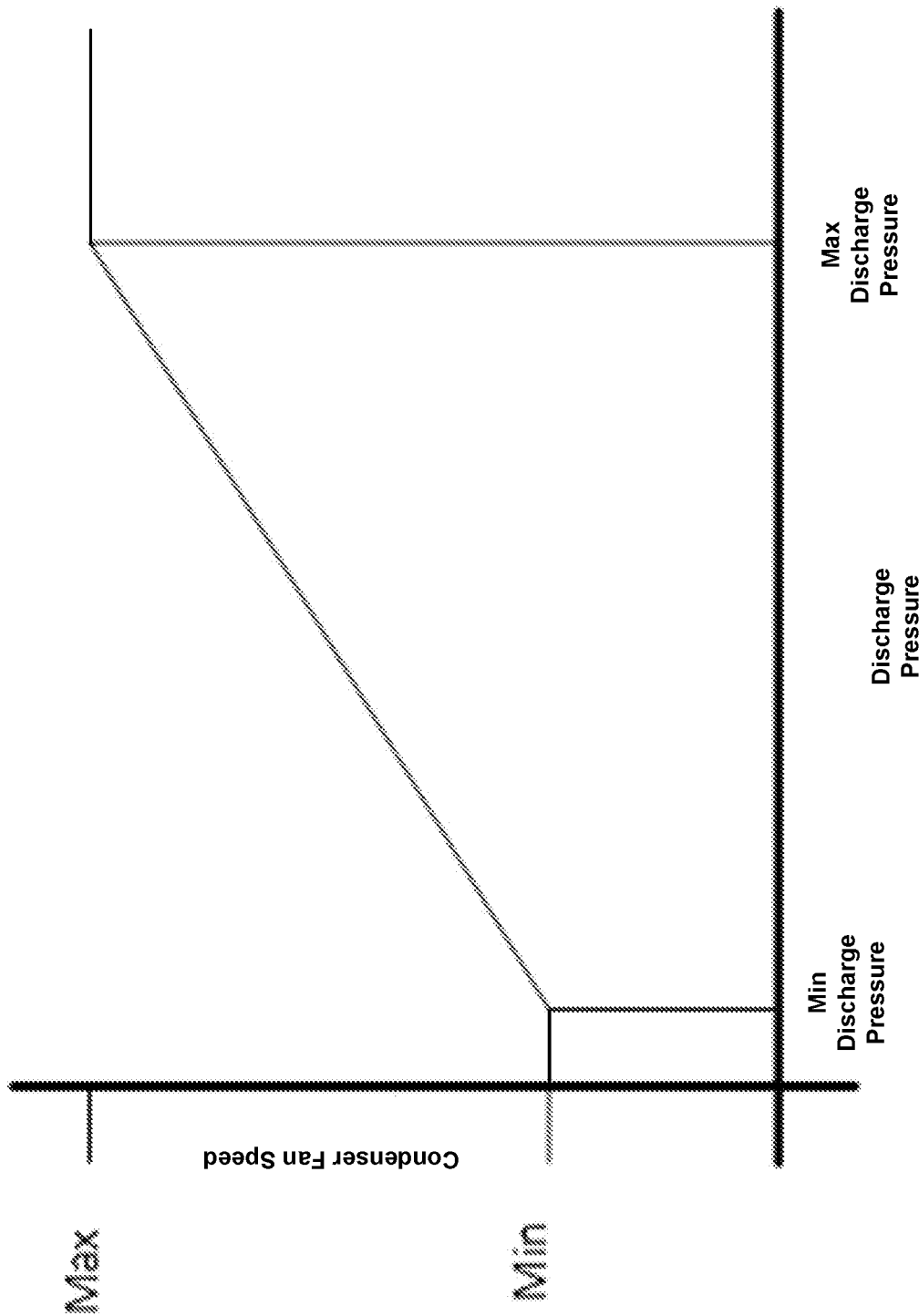

FIG. 17 includes an example graph of condenser fan speed commands as a function of discharge pressure for when the engine 104 is on. Generally speaking, when the engine 104 is on, the condenser control module 416 may set the condenser fan speed command toward or to the predetermined minimum speed when the discharge is greater than or equal to a predetermined maximum discharge pressure. The condenser control module 416 may set the condenser fan speed command toward or to the predetermined maximum speed when the discharge pressure is less than or equal to a predetermined minimum discharge pressure. The condenser control module 416 may decrease the condenser fan speed command as the discharge pressure increases between the predetermined minimum and maximum discharge pressures.

Figure 18:
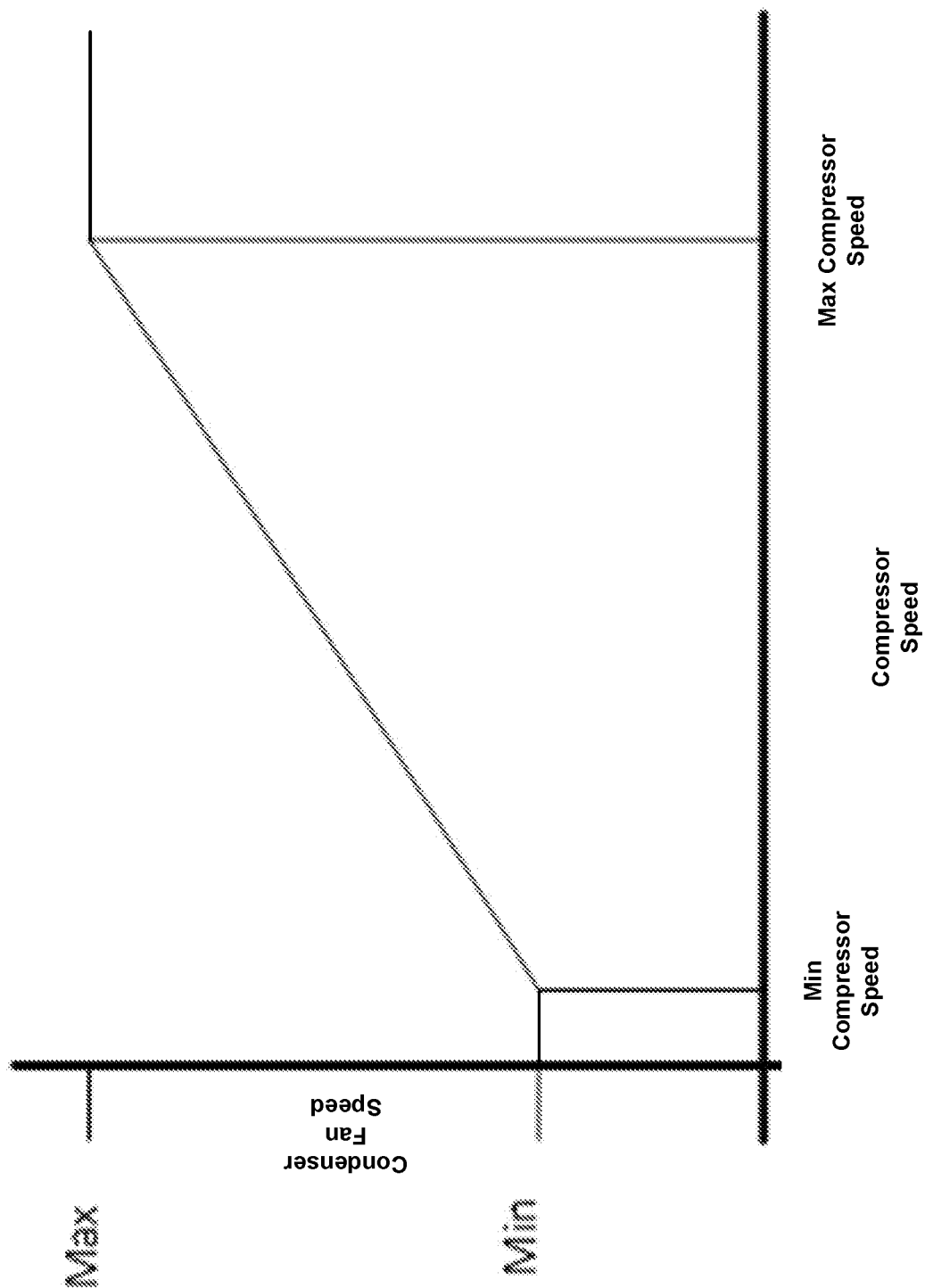

FIG. 18 includes an example graph of condenser fan speed commands as a function of compressor speed for when the engine 104 is on. Generally speaking, when the engine 104 is on, the condenser control module 416 may set the condenser fan speed command toward or to the predetermined maximum speed when the compressor speed is greater than or equal to a predetermined maximum compressor speed. The condenser control module 416 may set the condenser fan speed command toward or to the predetermined minimum speed when the compressor speed is less than or equal to the predetermined minimum compressor speed. The condenser control module 416 may increase the condenser fan speed command as the compressor speed increases between the predetermined minimum and maximum compressor speeds.

The condenser control module 416 may, for example, determine a first possible condenser fan speed command based on the power consumption, determine a second possible condenser fan speed command based on the discharge pressure, and determine a third possible condenser fan speed command based on the compressor speed. In this example, the condenser control module 416 may set the condenser fan speed command to the highest (greatest) one of the first, second, and third possible condenser fan speed commands. Selecting the highest one of the first, second, and third possible condenser fan speed commands may be protectionary. Alternatively, the condenser control module 416 may set the condenser fan speed command to the least (minimum) one of the first, second, and third possible condenser fan speed commands. Selecting the least one of the first, second, and third possible condenser fan speed commands may minimize power consumption of the condenser fan(s) 220.

In various implementations, the condenser control module 416 may additionally or alternatively determine the condenser fan speed command based on the suction pressure and/or the second blower speed. For example, while the engine 104 is on, the condenser control module 416 may decrease the condenser fan speed command as the suction pressure decreases and/or as the second blower speed decreases. The condenser control module 416 may increase the condenser fan speed command as the suction pressure increases and/or as the second blower speed increases.

At 1012, the condenser control module 416 controls the speed of the compressor 204 based on the compressor speed command and controls the speed of the condenser fan(s) 220 based on the condenser fan speed command. More specifically, the drive 256 may generate AC power for the electric motor 216 from the power output by the battery pack 120 and apply the AC power to the electric motor 216 of the compressor 204 to adjust the speed of the electric motor 216 toward or to the compressor speed command. The condenser control module 416 also controls switching of the relays 222 to control application of power to the condenser fan(s) 220 based on to the condenser fan speed command. Control returns to 1004.

The examples of FIGS. 6, 9A-9B, and 11A-11B, and 13-15 are shown and described based on the conditions of 504 remaining satisfied. If the engine 104 is turned off, the HVAC mode transitions to OFF or to heat, or the first blower 280 is shut down, the condenser control module 416 may shut down the compressor 204 and control may end.

Figure 19A:
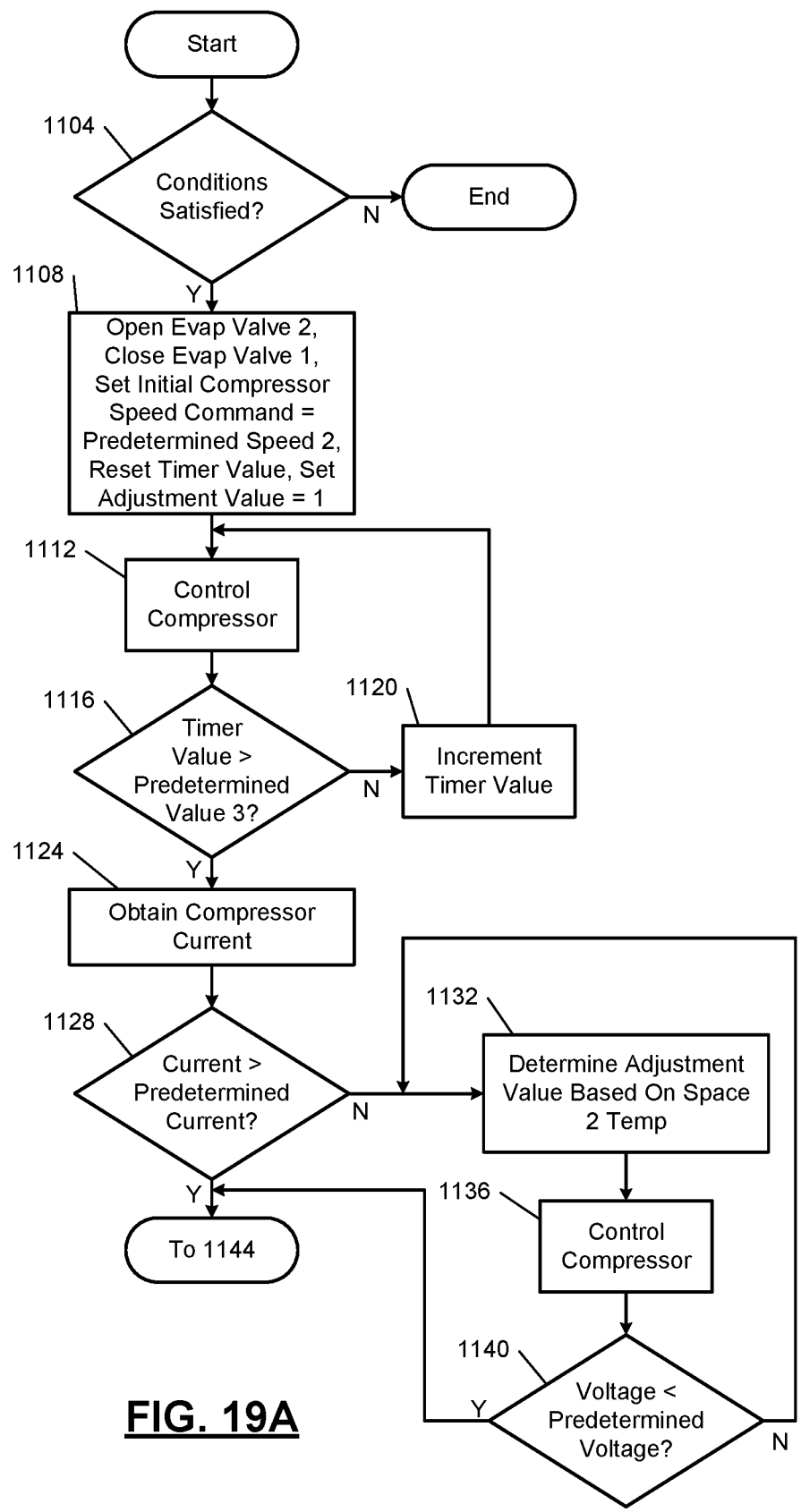
FIGS. 19A and 19B include a flowchart depicting an example method of controlling the speed of a compressor to manage charge of a battery pack while the engine is off.
Figure 19B:
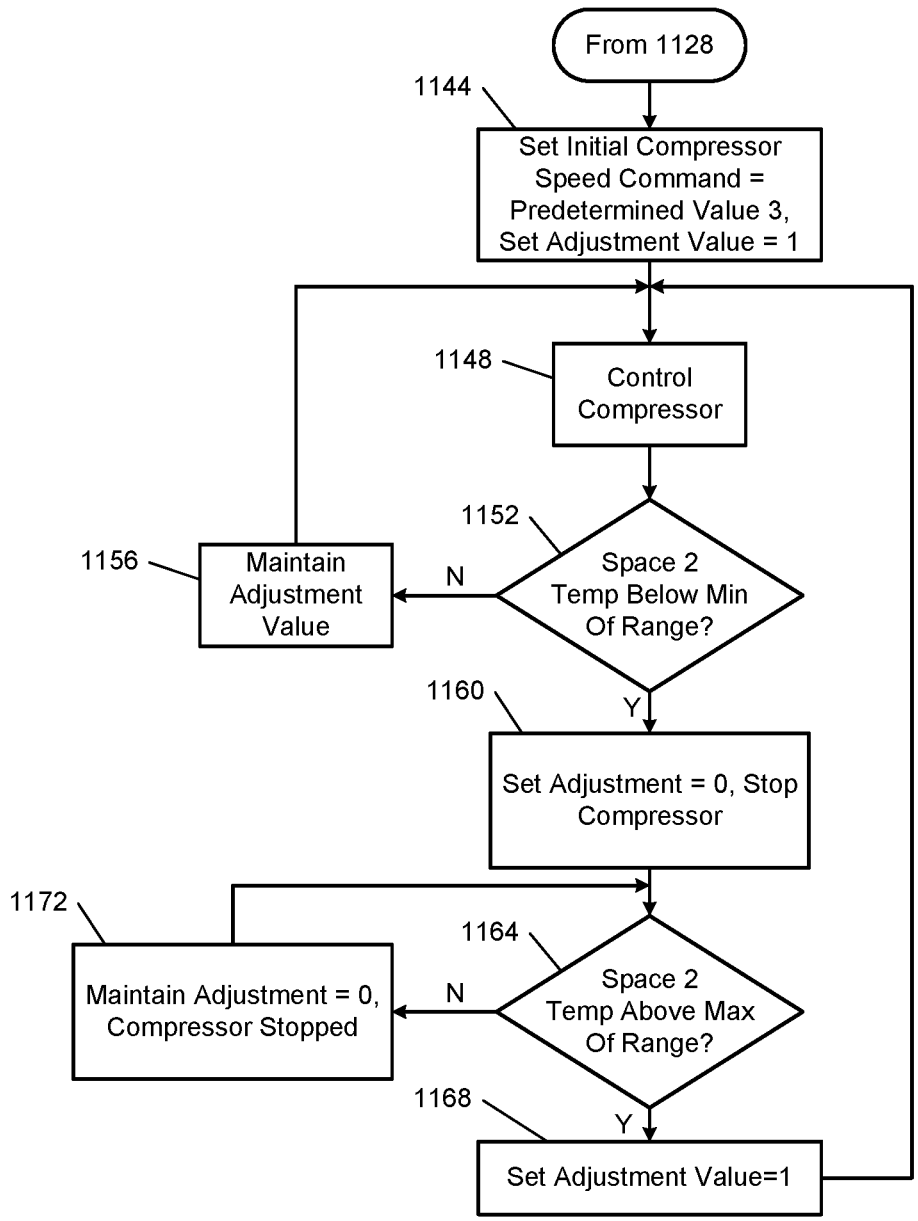

FIGS. 19A and 19B include a flowchart depicting an example method of controlling the speed of the compressor 204 to manage the charge of the battery pack 120 as long as possible while the engine 104 is off. When the engine 104 is off, the electrical source 112 cannot charge the battery pack 120. Operation of the air conditioning system 124 draws power from the battery pack 120.

Control begins with 1104 where the condenser control module 416 determines whether the engine 104 is OFF (e.g., the ignition system is OFF), the second blower 282 is on (e.g., the second blower speed command is greater than zero), and the HVAC mode has transitioned to an A/C mode (e.g., A/C or maximum A/C). Under these circumstances, it is likely that cooling of the living portion 131 will primarily be desired. If 1104 is true, control continues with 1108. If 1104 is false, control may end. While control is shown and discussed as ending, control may return to 1104.

At 1108, the condenser control module 416 sets the initial compressor speed command to a second predetermined maximum speed of the compressor 204. The second predetermined maximum speed may be calibratable, may be set to a maximum speed of the compressor 204 for use while the engine 104 is OFF, and is less than the first predetermined maximum speed discussed above and greater than 0. For example only, the second predetermined maximum speed may be approximately 2000 RPM, 1400 RPM, or another suitable speed. Also at 1108, the valve control module 408 closes the first evaporator control valve 244 and opens the second evaporator control valve 248. Operating the compressor 204 at the second predetermined maximum speed with the second evaporator control valve 248 open cools the second evaporator HEX 276 (and therefore the living portion 131). The condenser control module 416 also sets the adjustment value to the predetermined maximum value (e.g., 1.0) at 1108. The condenser control module 416 determines the compressor speed command based on the adjustment value and the initial compressor speed command as discussed above. The condenser control module 416 also resets the timer value at 1108. Control continues with 1112.

At 1112, the condenser control module 416 controls the speed of the compressor 204 based on the compressor speed command. More specifically, the drive 256 may generate AC power for the electric motor 216 from the power output by the battery pack 120 and apply the AC power to the electric motor 216 of the compressor 204 to adjust the speed of the electric motor 216 toward or to the compressor speed command.

At 1116, the condenser control module 416 determines whether the timer value is greater than a third predetermined value. The third predetermined timer value corresponds to a predetermined period. The third predetermined timer value may be calibratable and may be set, for example, to correspond to approximately 1 minute or another suitable value sufficient for current to reach steady-state. If 1116 is false, the condenser control module 416 increments the timer by the predetermined increment value at 1120, and control returns to 1112 to continue operating the compressor 204 based on the second predetermined maximum speed. If 1116 is true, control continues with 1124.

At 1124, the condenser control module 416 determines the (present value of the) compressor current. At 1128, the condenser control module 416 may determine whether the compressor current is greater than a predetermined current. If 1128 is true, an expected load of the air conditioning system 124 on the battery pack 120 may be relatively high under the current operating conditions, and control may continue with 1144 (FIG. 19B), which is discussed further below. If 1128 is false, the expected load of the air conditioning system 124 on the battery pack 120 may be relatively low under the current operating conditions, and control may transfer to 1132. The predetermined current may be calibratable and may be set based on the amp-hour rating of the battery pack 120.

A second comparison module 428 (FIG. 5) may compare the compressor current with the predetermined current. The second comparison module 428 may generate a signal indicative of whether the compressor current is greater than the predetermined current or not.

At 1132, the condenser control module 416 determines the adjustment value based on the second space temperature. The condenser control module 416 may determine the adjustment value, for example, using one of a lookup table and an equation that relates second space temperatures to adjustment values. As discussed above, the condenser control module 416 determines the compressor speed command based on the initial compressor speed command and the adjustment value.

Figure 20:
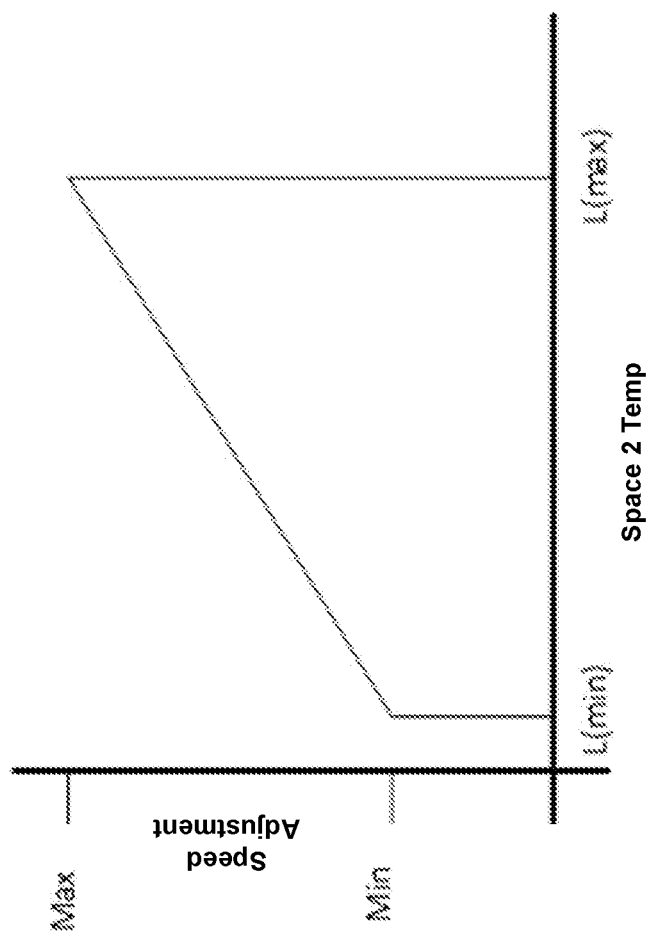
FIG. 20 includes an example graph of compressor speed command adjustment values as a function of blower speeds.

FIG. 20 includes an example graph of adjustment values as a function of second space temperatures. Generally speaking, when the engine 104 is off, the condenser control module 416 may set the adjustment value to the predetermined maximum value (e.g., 1.0) when the second space temperature is equal to a predetermined maximum second space temperature. The condenser control module 416 may set the adjustment value to a predetermined minimum value (e.g., 0.33) when the second space temperature is equal to a predetermined minimum second space temperature. The condenser control module 416 may increase the adjustment value toward the predetermined maximum value as the second space temperature increases between the predetermined minimum and maximum second space temperatures.

Referring back to FIG. 19A, the condenser control module 416 controls the speed of the compressor 204 based on the compressor speed command at 1136. More specifically, the drive 256 may generate AC power for the electric motor 216 from the power output by the battery pack 120 and apply the AC power to the electric motor 216 of the compressor 204 to adjust the speed of the electric motor 216 toward or to the compressor speed command.

At 1140, the condenser control module 416 determines whether the voltage of the battery pack 120 is less than a predetermined voltage. The predetermined voltage may be calibratable and is set to less than the rated voltage of the battery pack 120, such as approximately 46 V or another suitable voltage. If 1140 is true, control transfers to 1144 (FIG. 19B). If 1140 is false, control returns to 1132.

A third comparison module 432 (FIG. 5) may compare the voltage of the battery pack 120 with the predetermined voltage. The third comparison module 432 may generate a signal indicative of whether the voltage less than the predetermined voltage or not.

At 1144 (FIG. 19B), the condenser control module 416 sets the initial compressor speed command to a third predetermined maximum speed of the compressor 204. The third predetermined maximum speed may be calibratable and is less than the second predetermined maximum speed discussed above and greater than 0. For example only, the third predetermined maximum speed may be approximately 1400 RPM or another suitable speed. Also at 1144, the condenser control module 416 also sets the adjustment value to the predetermined maximum value (e.g., 1.0). The condenser control module 416 determines the compressor speed command based on the adjustment value and the initial compressor speed command as discussed above.

At 1148, the condenser control module 416 controls the speed of the compressor 204 based on the compressor speed command. More specifically, the drive 256 may generate AC power for the electric motor 216 from the power output by the battery pack 120 and apply the AC power to the electric motor 216 of the compressor 204 to adjust the speed of the electric motor 216 toward or to the compressor speed command.

At 1152, the condenser control module 416 determines whether the second space temperature is less than a minimum temperature of a second predetermined temperature range. If 1152 is false, the condenser control module 416 maintains the adjustment value at 1156, and control returns to 1148 to continue operating the compressor 204 at the third predetermined maximum speed. If 1152 is true, control continues to 1160. In this way, the condenser control module 416 cools the living portion 131 until the temperature within the living portion 131 (represented by the second space temperature) is less than the minimum temperature of the second predetermined temperature range.

The second predetermined temperature range is bounded by the minimum temperature and a maximum temperature. The minimum temperature may be a third predetermined amount less than a second predetermined setpoint temperature, and the maximum temperature may be the third predetermined amount greater than the second predetermined setpoint temperature.

The second predetermined setpoint temperature may be set, for example, based on user input regarding a desired temperature in the living portion 131. The user may adjust (increase and decrease) the desired temperature via interaction with one or more user input devices.

The third predetermined amount may be calibratable. For example only, the third predetermined amount may be 4 degrees Fahrenheit or another suitable amount. In various implementations, the minimum and maximum temperatures may not be centered with respect to the second predetermined setpoint temperature.

At 1160, the condenser control module 416 sets the adjustment value to the predetermined compressor stopping value (e.g., 0.0). Based on the adjustment value being set to the predetermined compressor stopping value, the condenser control module 416 sets the compressor speed command to 0. When the compressor speed command is 0, the drive 256 does not apply power to the electric motor 216, thereby stopping rotation of the electric motor 216 and the compressor 204. The condenser control module 416 disables the compressor 204 at this time to stop power consumption from the battery pack 120.

At 1164, the condenser control module 416 may determine whether the second space temperature is greater than or equal to the maximum temperature of the second predetermined temperature range. If 1164 is false, the condenser control module 416 maintains the adjustment value at the predetermined compressor stopping value at 1172. This maintains the compressor 204 stopped. Control returns to 1164. In this way, the condenser control module 416 disables the compressor 204 until the second space temperature increases to above the second predetermined temperature range to minimize power consumption from the battery pack 120. If 1164 is true, the condenser control module 416 may set the adjustment value to 1 to resume operation of the compressor 204 at the third predetermined maximum speed at 1168. Control returns to 1148 to again cool the second space temperature to less than the minimum temperature of the second predetermined temperature range.

Figure 21:
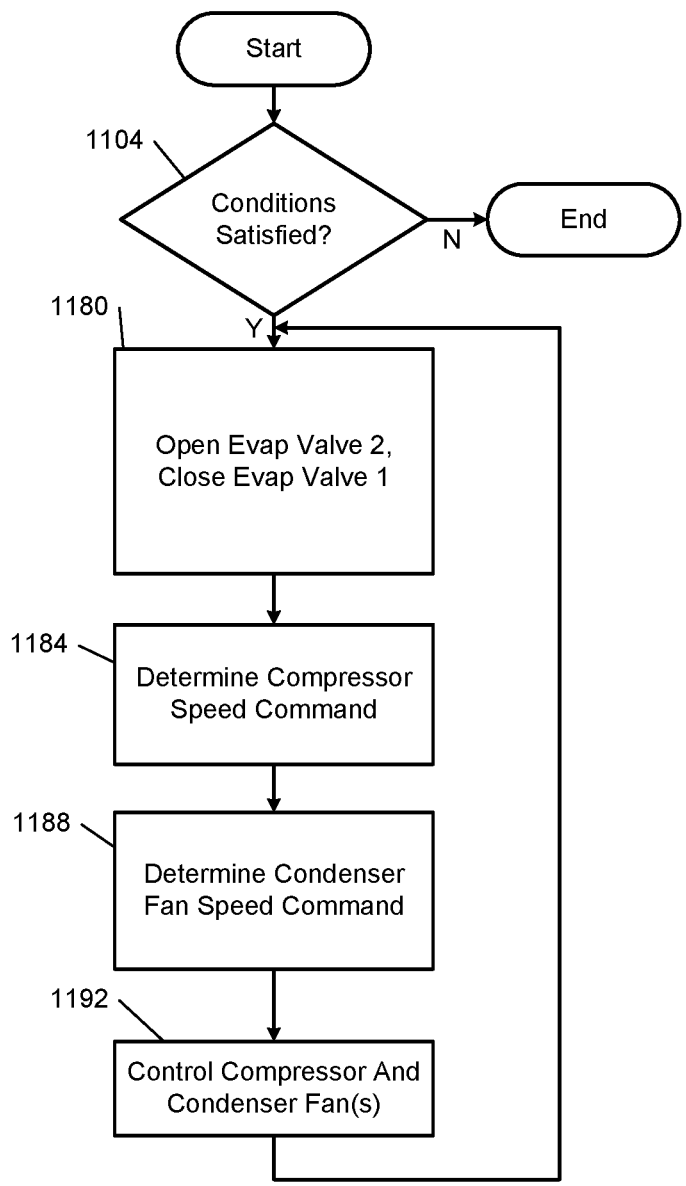
FIG. 21 includes a flowchart depicting an example method of controlling the speed of a compressor to manage the charge of a battery pack while the engine is off.

FIG. 21 includes a flowchart depicting an example method of controlling the speed of the compressor 204 to manage the charge of the battery pack 120 while the engine 104 is off. When the engine 104 is off, the electrical source 112 cannot charge the battery pack 120. Operation of the air conditioning system 124 draws power from the battery pack 120.

Control begins with 1104 where the condenser control module 416 determines whether the engine 104 is OFF (e.g., the ignition system is OFF), the second blower 282 is on (e.g., the second blower speed command is greater than zero), and the HVAC mode has transitioned to an A/C mode (e.g., A/C or maximum A/C). Under these circumstances, it is likely that cooling of the living portion 131 will primarily be desired. If 1104 is true, control continues with 1180. If 1104 is false, control may end. While control is shown and discussed as ending, control may return to 1104.

At 1180, the valve control module 408 closes the first evaporator control valve 244 and opens the second evaporator control valve 248. Control continues with 1184. The condenser control module 416 determines the compressor speed command at 1184. The condenser control module 416 may determine the compressor speed command, for example, as described above in conjunction with the examples of FIGS. 19A-19B. At 1188, the condenser control module 416 determines the condenser fan speed command.

The condenser control module 416 determines the condenser fan speed command based on at least one of the power consumption, the discharge pressure, and the compressor speed (e.g., the compressor speed command). The condenser control module 416 may determine the condenser fan speed using at least one of a lookup table and an equation that relates at least one of power consumptions, discharge pressures, and compressor speeds to condenser fan speed commands.

Figure 22:
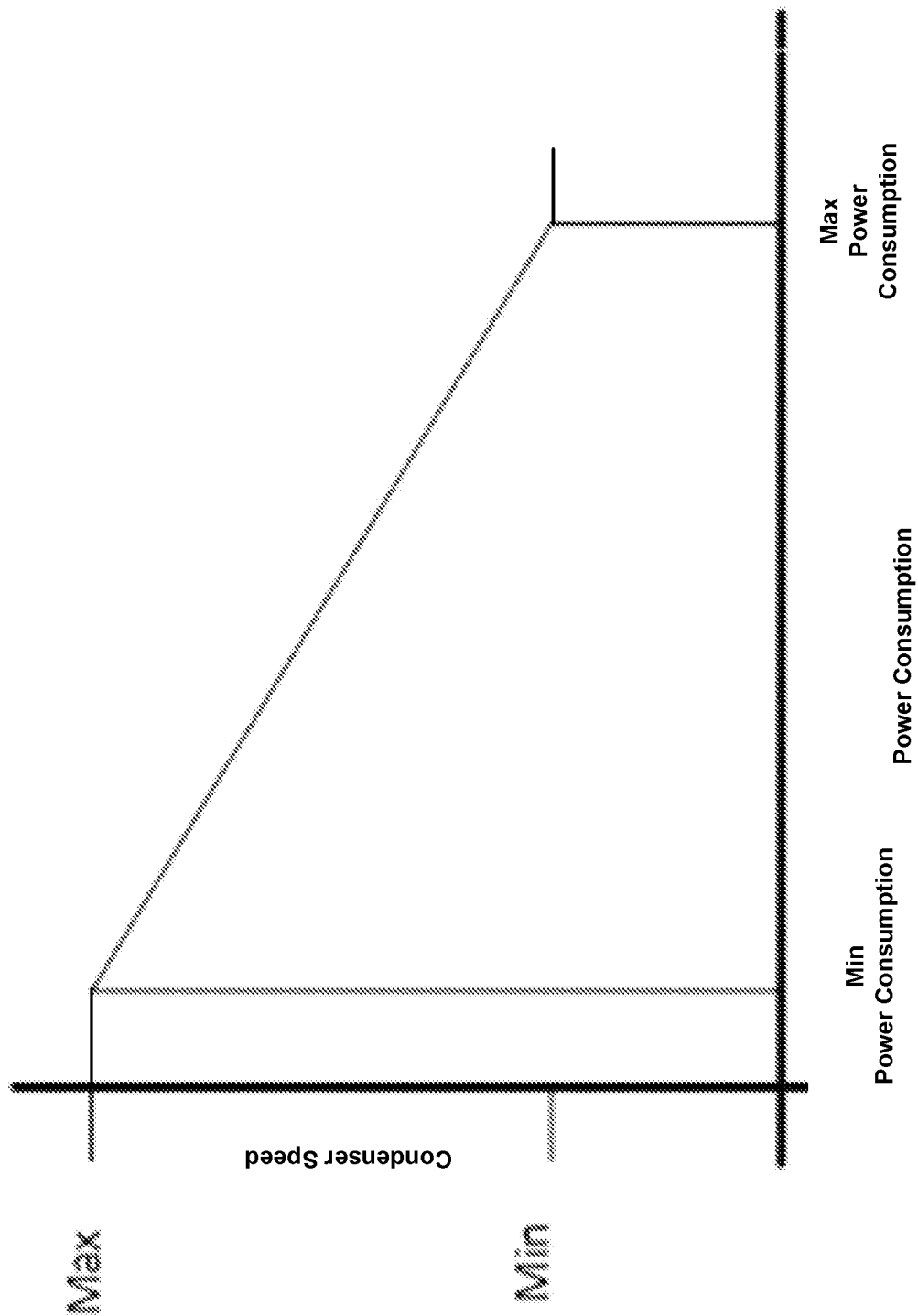
FIGS. 22, 23, and 24 include example graphs of condenser fan speed commands as functions of power consumption, discharge pressure, and compressor speed, respectively, for when the engine is off.

FIG. 22 includes an example graph of condenser fan speed commands as a function of power consumption for when the engine 104 is off. Generally speaking, when the engine 104 is off, the condenser control module 416 may set the condenser fan speed command toward or to a predetermined maximum speed when the power consumption is less than or equal to a predetermined minimum power consumption. The condenser control module 416 may set the condenser fan speed command to a predetermined minimum speed when the power consumption is greater than or equal to a predetermined maximum power consumption. The condenser control module 416 may decrease the condenser fan speed command as the power consumption increases between the predetermined minimum and maximum power consumptions.

Figure 23:
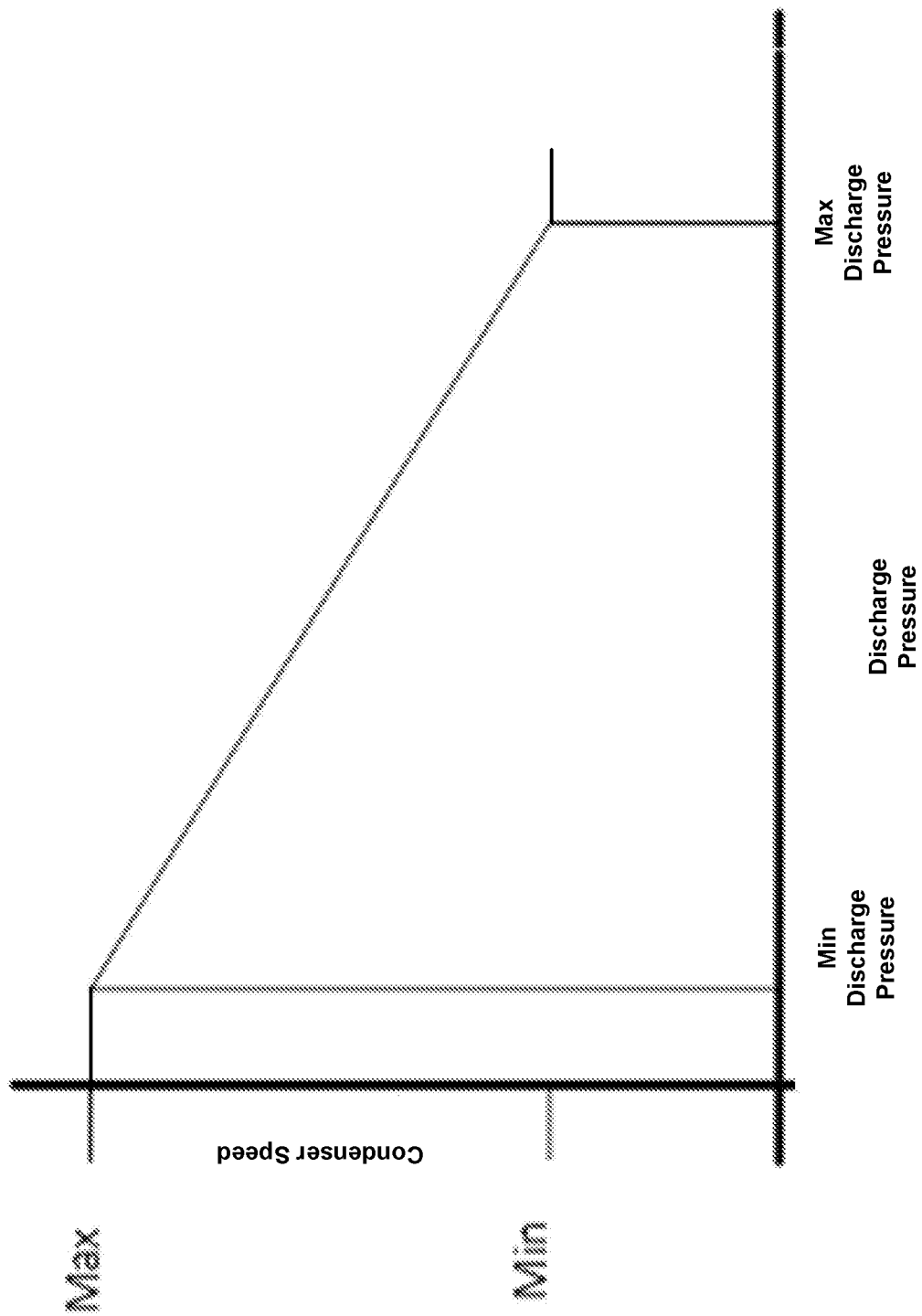

FIG. 23 includes an example graph of condenser fan speed commands as a function of discharge pressure for when the engine 104 is off. Generally speaking, when the engine 104 is off, the condenser control module 416 may set the condenser fan speed command toward or to the predetermined maximum speed when the discharge is less than or equal to a predetermined minimum discharge pressure. The condenser control module 416 may set the condenser fan speed command toward or to the predetermined minimum speed when the discharge pressure is greater than or equal to the predetermined maximum discharge pressure. The condenser control module 416 may decrease the condenser fan speed command as the discharge pressure increases between the predetermined minimum and maximum discharge pressures.

Figure 24:
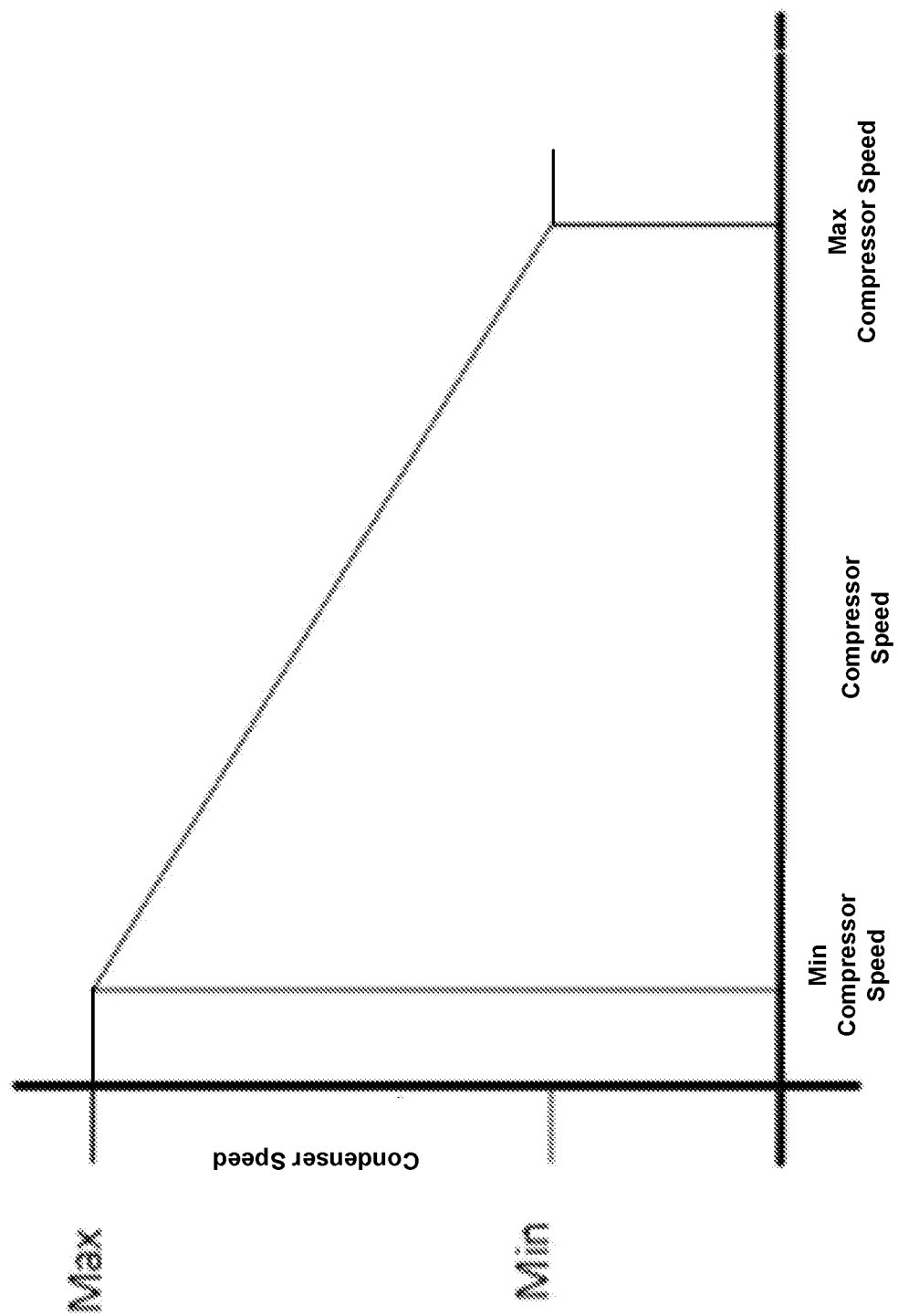

FIG. 24 includes an example graph of condenser fan speed commands as a function of compressor speed for when the engine 104 is off. Generally speaking, when the engine 104 is off, the condenser control module 416 may set the condenser fan speed command toward or to the predetermined maximum speed when the compressor speed is less than or equal to a predetermined minimum compressor speed. The condenser control module 416 may set the condenser fan speed command toward or to the predetermined minimum speed when the compressor speed is greater than or equal to the predetermined maximum compressor speed. The condenser control module 416 may decrease the condenser fan speed command when the compressor speed increases.

The condenser control module 416 may, for example, determine a first possible condenser fan speed command based on the power consumption, determine a second possible condenser fan speed command based on the discharge pressure, and determine a third possible condenser fan speed command based on the compressor speed. In this example, the condenser control module 416 may set the condenser fan speed command to the highest (greatest) one of the first, second, and third possible condenser fan speed commands. Selecting the highest one of the first, second, and third possible condenser fan speed commands may be protectionary. Alternatively, the condenser control module 416 may set the condenser fan speed command to the least (minimum) one of the first, second, and third possible condenser fan speed commands. Selecting the least one of the first, second, and third possible condenser fan speed commands may minimize power consumption of the condenser fan(s) 220.

In various implementations, the condenser control module 416 may additionally or alternatively determine the condenser fan speed command based on the suction pressure and/or the second blower speed. For example, while the engine 104 is off, the condenser control module 416 may decrease the condenser fan speed command as the suction pressure increases and/or as the second blower speed decreases. The condenser control module 416 may increase the condenser fan speed command as the suction pressure decreases and/or as the second blower speed increases. In various implementations, determination of the condenser fan speed command based on the discharge pressure while the engine 104 is off may be omitted.

At 1192, the condenser control module 416 controls the speed of the compressor 204 based on the compressor speed command and controls the speed of the condenser fan(s) 220 based on the condenser fan speed command. More specifically, the drive 256 may generate AC power for the electric motor 216 from the power output by the battery pack 120 and apply the AC power to the electric motor 216 of the compressor 204 to adjust the speed of the electric motor 216 toward or to the compressor speed command. The condenser control module 416 also controls switching of the relay(s) 222 based on the condenser fan speed command. Control returns to 1180.

The examples of FIGS. 19A-19B and FIG. 21 are shown and described based on the conditions of 1104 remaining satisfied. If the engine 104 is turned on, the HVAC mode transitions to OFF or to heat or the second blower 282 is shut down, the condenser control module 416 may shut down the compressor 204 and control may end.

Figure 25:
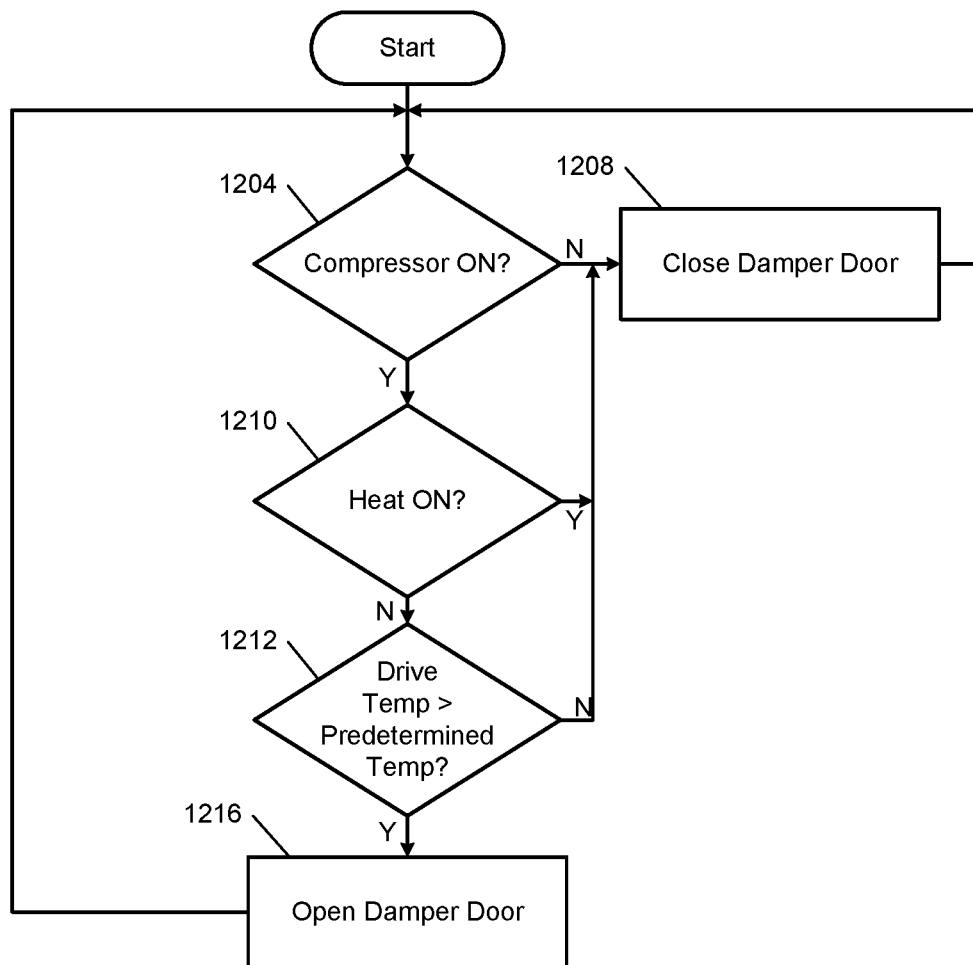
FIG. 25 includes a flowchart depicting an example method of controlling a damper door to regulate temperature of a drive.

FIG. 25 includes a flowchart depicting an example method of controlling the damper door 284 for cooling of the drive 256. FIG. 26A includes a diagram including an example implementation of the damper door 284, the second HVAC ducts 278, and airflow that can be used to cool the drive 256.

Control may begin with 1204 where the damper control module 412 determines whether the compressor 204 is ON. For example, the damper control module 412 may determine whether the compressor speed command is greater than zero. The damper control module 412 may also determine whether the second blower 282 is on at 1204. As discussed above, the valve control module 408 opens the second evaporator control valve 248 before the compressor 204 is turned on when the second blower 282 is on. If 1204 is false (i.e., one or more of the above are false), the damper control module 412 may close the damper door 284 at 1208, and control may return to 1204. In various implementations, the damper door 284 may be normally closed (e.g., via a spring, etc.). If 1204 is true, control continues with 1210.

At 1210, the damper control module 412 may determine whether the HVAC mode is not set to the heating mode at 1204. If 1210 is true, the damper control module 412 may close the damper door 284 at 1208, and control may return to 1204. If 1210 is false, control continues with 1212.

At 1212, the damper control module 412 determines whether the drive temperature is greater than a predetermined drive temperature. If 1212 is false, control transfers to 1208 and the damper control module 412 may close the damper door 284 if the damper door 284 is not already closed. If 1212 is true, control continues with 1216. The predetermined temperature may be calibratable and may be a fixed value. A fourth comparison module 436 (FIG. 5) may compare the drive temperature with the predetermined drive temperature. The fourth comparison module 436 may generate a signal indicative of whether the drive temperature is greater than the predetermined drive temperature or not.

At 1216, when the drive temperature is greater than the predetermined drive temperature, the damper control module 412 opens the damper door 284. Opening the damper door 284, for example, to a fixed or proportional percentage allows cool air to flow from the second HVAC ducts 278 to the drive 256 and cool the drive 256. Generally speaking, efficiency of the drive 256 increases when the drive temperature is cooler. Cooler drive temperatures also increase reliability and life of the drive 256 and the components of the drive 256. Opening the damper door 284 when the drive temperature is greater than the predetermined temperature may also enable the use of less costly components for the drive 256 (namely components having lower operating temperature ratings). This may decrease an overall cost of the drive 256. Control may return to 1204 after 1216.

Figure 26B:
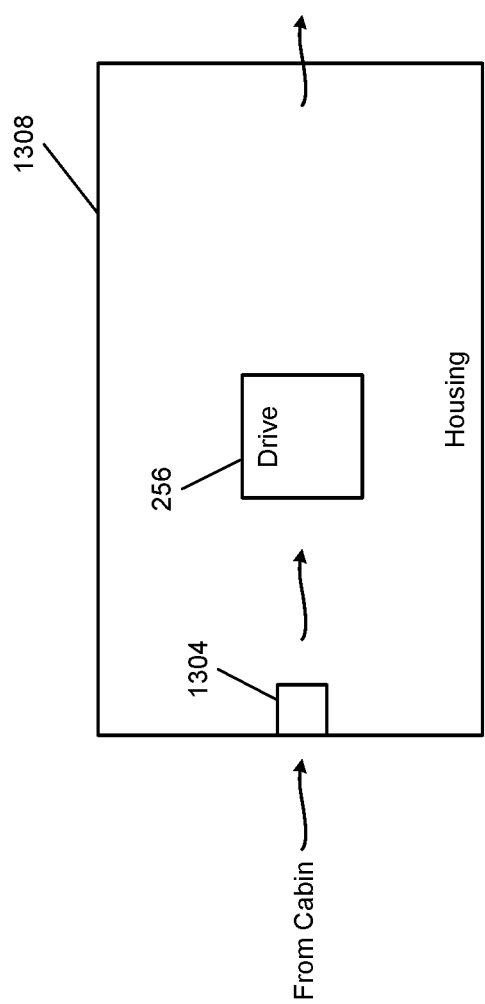

FIG. 26B includes a diagram including an example implementation of a drive fan 1304 implemented to draw air from the passenger cabin (e.g., 131 and/or 129) and to push the air across the drive 256 to cool the drive 256. For example, the drive fan 1304 may be mounted to a housing 1308 of the drive 256. The housing 1308 may include apertures (e.g., baffles or vents) that allow airflow out of the housing 1308. As shown in the example of FIG. 26B, the damper door 284 and the associated connecting ducts may be omitted.

A drive fan control module 1312 (FIG. 5) may control whether the drive fan 1304 is on or off, as discussed further below.

Figure 26D:
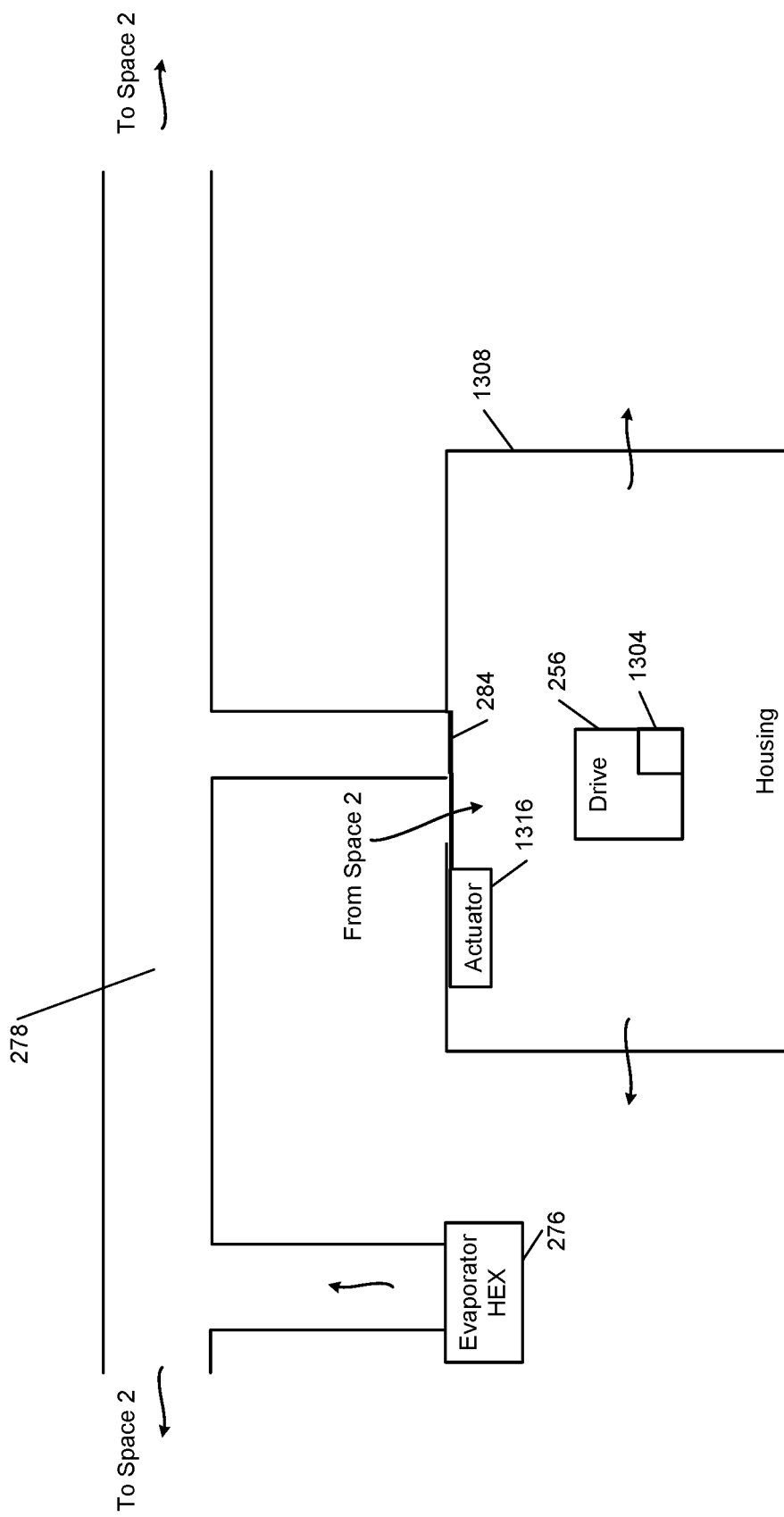
Figure 26E:
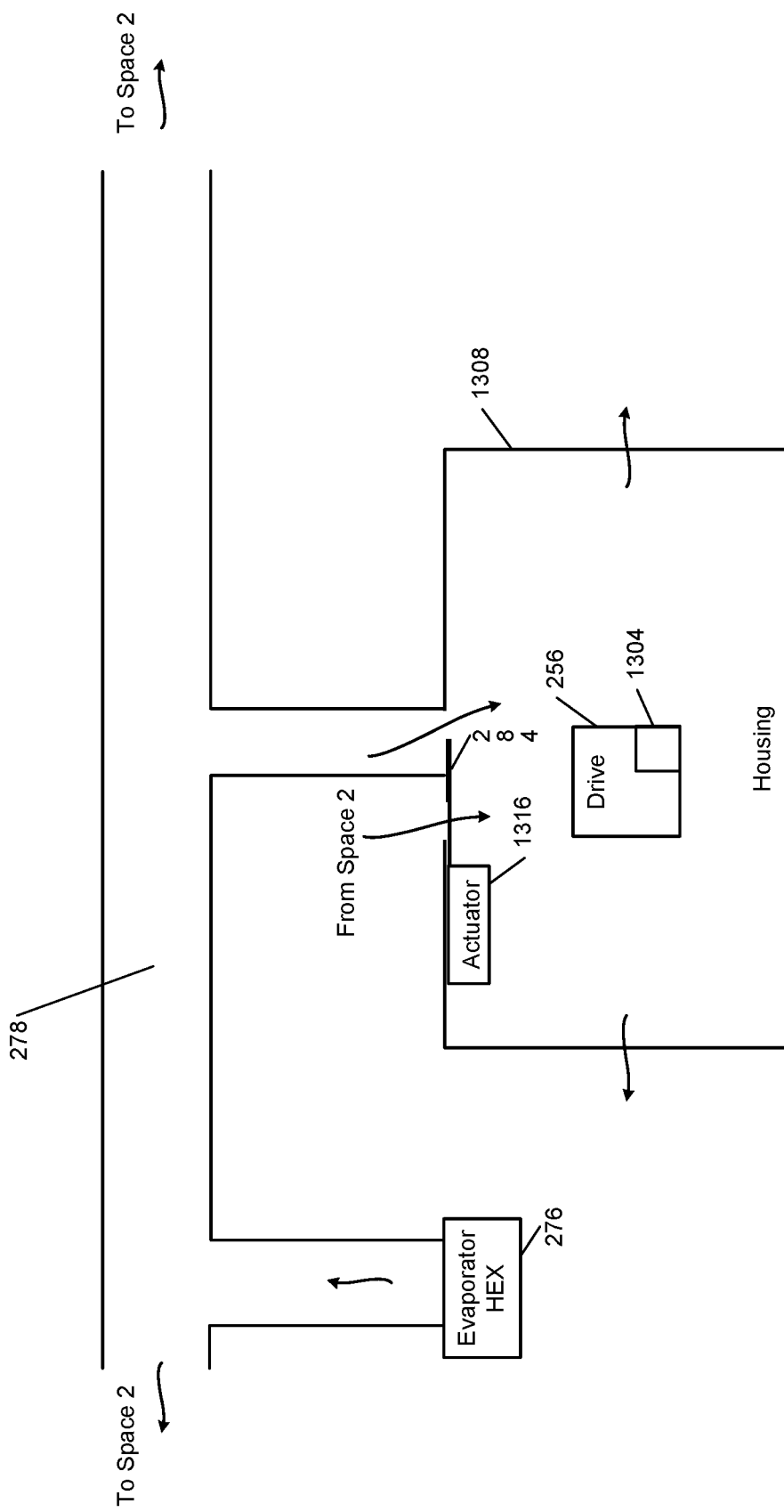

FIGS. 26C, 26D, and 26E include a diagram including an example implementation including an actuator 1316 and the damper door 284. The actuator 1316 actuates (e.g., linearly) the damper door 284 to allow the drive fan 1304 to draw air from (a) only an evaporator HEX (e.g., the second evaporator hex 276), as depicted in FIG. 26C, (b) only the passenger cabin (e.g., 131 and/or 129) as depicted in FIG. 2D, or a combination of the passenger cabin (e.g., 131 and/or 129) and the evaporator HEX as depicted in FIG. 26E. In the examples of FIGS. 26C, 26D, and 26E, the drive fan 1304 may be, for example, mounted to the housing 1308.

Figure 27:
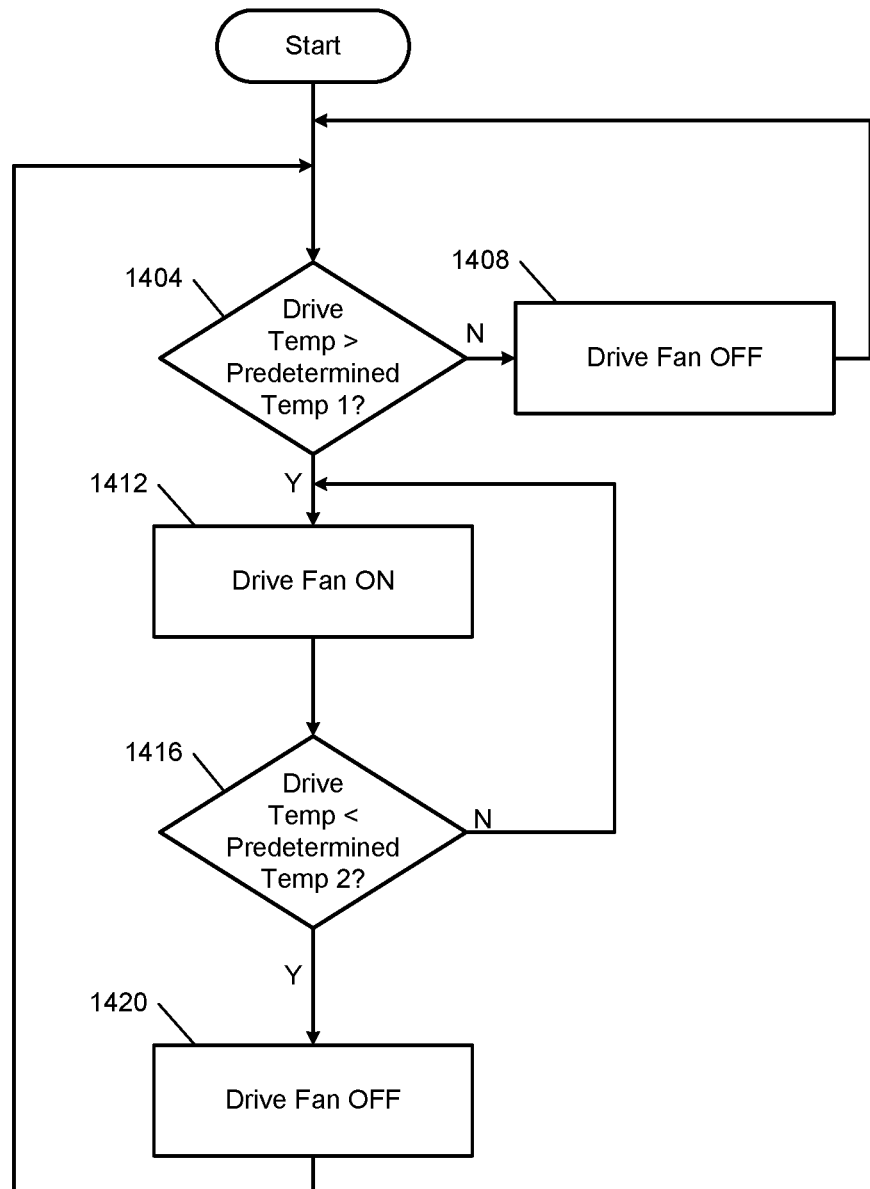
FIG. 27 includes a flowchart depicting an example method of controlling operation of one or more drive fans to minimize noise while the engine is off.

FIG. 27 includes a flowchart depicting an example method of controlling the drive fan 1304 to minimize noise. While the example of controlling only the drive fan 1304 will be discussed for purposes of simplicity, FIG. 27 is applicable to controlling only the second drive fan 1316 and to controlling both the drive fan 1304 and the second drive fan 1316.

Control begins when the drive fan 1304 is off and the engine 104 is off. If the engine 104 turns on, the example of FIG. 27 may end. At 1404, the drive fan control module 1312 determines whether the drive temperature is greater than a predetermined maximum drive temperature of a predetermined drive temperature range. If 1404 is false, the drive fan control module 1312 maintains the drive fan 1304 off at 1408, and control returns to 1404. If 1404 is true, control continues with 1412.

The predetermined drive temperature range is bounded by the predetermined maximum drive temperature and a predetermined minimum drive temperature. The predetermined minimum drive temperature may be a predetermined amount less than a predetermined drive setpoint temperature, and the predetermined maximum drive temperature may be the predetermined amount greater than the predetermined drive setpoint temperature.

The predetermined setpoint temperature may be calibratable and may be set to less than a lowest temperature rating of the components of the drive 256. The predetermined amount may be calibratable and is set to less than a difference between the predetermined setpoint temperature and the lowest temperature rating such that the predetermined maximum drive temperature is also less than the lowest temperature rating. For example only, the predetermined amount may be 5 degrees Fahrenheit or another suitable amount. In various implementations, the predetermined minimum and maximum drive temperatures may not be centered with respect to the predetermined drive setpoint temperature.

At 1412, the drive fan control module 1312 turns on the drive fan 1304. The drive fan control module 1312 may operate the drive fan 1304 at a first predetermined speed. Alternatively, the drive fan control module 1312 may operate the drive fan 1304 based on a drive fan speed command. The drive fan control module 1312 may determine the drive fan speed command, for example, based on a rate of increase of the drive temperature. The drive fan control module 1312 may determine the drive fan speed command, for example, using one of a function and a lookup table that relates rates of increase of drive temperature to drive fan speed command. Generally speaking, the drive fan speed command may increase as the rate of increase increases and vice versa. The drive fan 1304 cools the drive 1304 when the drive fan 103 is on. Control continues with 1416.

At 1416, the drive fan control module 1312 determines whether the drive temperature is less than the predetermined minimum drive temperature of the predetermined drive temperature range. If 1416 is false, the drive fan control module 1312 returns to 1412 and maintains the drive fan 1304 on. If 1416 is true, the drive fan control module 1312 turns the drive fan 1304 off at 1420, and control returns to 1404. The drive fan control module 1312 may alternatively reduce the speed of the drive fan 1304 to a second predetermined speed that is less than the first predetermined speed at 1420. Controlling the drive fan 1304 as described above minimizes noise while the engine 104 is off.

While the example of control beginning when the drive fan 1304 is off is provided, the present application is also applicable to control beginning when the drive fan 1304 is turned on or is already on. When the drive fan 1304 is on, control begins with 1416.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An air conditioning system of a vehicle having an internal combustion engine, comprising:
    an electric compressor;
    a condenser that is configured to receive refrigerant output by the electric compressor and that transfers heat from the refrigerant within the condenser to air passing the condenser;
    a first control valve;
    a first evaporator that is configured to receive refrigerant from the condenser when the first control valve is open and that transfers heat from air passing the first evaporator to the refrigerant within the first evaporator;
    a first blower that is configured to blow air across the first evaporator to a first section of a cabin of the vehicle;
    a second control valve;
    a second evaporator that is configured to receive refrigerant from the condenser when the second control valve is open and that transfers heat from air passing the second evaporator to the refrigerant within the second evaporator;
    a second blower that is configured to blow air across the second evaporator to a second section of the cabin of the vehicle; and
    a control module that is configured to, when the internal combustion engine of the vehicle is on and the first blower is blowing air across the first evaporator, control a speed of the electric compressor based on a temperature of the first evaporator, and to:
        decrease the speed of the electric compressor as the temperature of the first evaporator decreases toward a minimum temperature defining a lower limit of a predetermined temperature range; and
        increase the speed of the electric compressor as the temperature of the first evaporator increases toward a maximum temperature defining an upper limit of the predetermined temperature range.

2. The air conditioning system of claim 1 wherein the minimum temperature is greater than the freezing point temperature of water.

3. The air conditioning system of claim 1 wherein the control module is configured to:
operate the electric compressor at a first predetermined speed when the temperature of the first evaporator is equal to the minimum temperature of the predetermined temperature range; and
operate the electric compressor at a second predetermined speed that is greater than the first predetermined speed when the temperature of the first evaporator is equal to the maximum temperature of the predetermined temperature range.

4. The air conditioning system of claim 3 wherein the control module is configured to operate the electric compressor at a third predetermined speed that is less than first predetermined speed when the temperature of the first evaporator is less than the minimum temperature.

5. The air conditioning system of claim 4 wherein the control module is configured to shut down the electric compressor when the temperature of the first evaporator remains less than the minimum temperature continuously for a predetermined period while the electric compressor is operating at the third predetermined speed.

6. An air conditioning system of a vehicle having an internal combustion engine, comprising:
an electric compressor;
a condenser that is configured to receive refrigerant output by the electric compressor and that transfers heat from the refrigerant within the condenser to air passing the condenser;
a first control valve;
a first evaporator that is configured to receive refrigerant from the condenser when the first control valve is open and that transfers heat from air passing the first evaporator to the refrigerant within the first evaporator;
a first blower that is configured to blow air across the first evaporator to a first section of a cabin of the vehicle;
a second control valve;
a second evaporator that is configured to receive refrigerant from the condenser when the second control valve is open and that transfers heat from air passing the second evaporator to the refrigerant within the second evaporator;
a second blower that is configured to blow air across the second evaporator to a second section of the cabin of the vehicle; and
a control module that is configured to, when the internal combustion engine of the vehicle is on and the first blower is blowing air across the first evaporator, control a speed of the electric compressor based on a temperature of the first evaporator,
wherein the control module is configured to control the speed of the electric compressor further based on a compressor suction pressure, wherein the control module is configured to:
decrease the speed of the electric compressor as the compressor suction pressure decreases toward a minimum pressure defining a lower limit of a predetermined pressure range; and
increase the speed of the electric compressor as the compressor suction pressure increases toward a maximum pressure defining an upper limit of the predetermined pressure range.

7. The air conditioning system of claim 6 wherein the control module is configured to:
operate the electric compressor at a first predetermined speed when the compressor suction pressure is equal to the minimum pressure of the predetermined pressure range; and
operate the electric compressor at a second predetermined speed that is greater than the first predetermined speed when the compressor suction pressure is equal to the maximum pressure of the predetermined pressure range.

8. The air conditioning system of claim 7 wherein the control module is configured to operate the electric compressor at a third predetermined speed that is less than first predetermined speed when the compressor suction pressure is less than the minimum pressure.

9. The air conditioning system of claim 8 wherein the control module is configured to shut down the electric compressor when the compressor suction pressure remains less than the minimum pressure continuously for a predetermined period while the electric compressor is operating at the third predetermined speed.

10. The air conditioning system of claim 6 wherein the control module is configured to determine the minimum and maximum pressures of the predetermined pressure range based on the compressor suction pressure when the temperature of the first evaporator decreases to a predetermined temperature.

11. An air conditioning control method for a vehicle having an internal combustion engine, comprising:
determining whether the internal combustion engine of the vehicle is on;
determining whether a first blower of the vehicle is blowing air across a first evaporator,
wherein the first evaporator is configured to receive refrigerant from a condenser when a first control valve is open and to transfer heat from air passing the first evaporator to the refrigerant within the first evaporator,
wherein the first blower is configured to blow air across the first evaporator to a first section of a cabin of the vehicle, and
wherein the condenser is configured to receive refrigerant output by an electric compressor and to transfer heat from the refrigerant within the condenser to air passing the condenser; and
when the internal combustion engine of the vehicle is on and the first blower is blowing air across the first evaporator, controlling a speed of an electric compressor based on a temperature of the first evaporator,
wherein a second evaporator is configured to receive refrigerant from the condenser when a second control valve is open and to transfer heat from air passing the second evaporator to the refrigerant within the second evaporator, and
wherein a second blower is configured to blow air across the second evaporator to a second section of the cabin of the vehicle,
wherein controlling the speed of the electric compressor based on the temperature of the first evaporator includes:
decreasing the speed of the electric compressor as the temperature of the first evaporator decreases toward a minimum temperature defining a lower limit of a predetermined temperature range; and
increasing the speed of the electric compressor as the temperature of the first evaporator increases toward a maximum temperature defining an upper limit of the predetermined temperature range.

12. The air conditioning control method of claim 11 wherein the minimum temperature is greater than the freezing point temperature of water.

13. The air conditioning control method of claim 11 wherein controlling the speed of the electric compressor based on the temperature of the first evaporator includes:
operating the electric compressor at a first predetermined speed when the temperature of the first evaporator is equal to the minimum temperature of the predetermined temperature range; and
operating the electric compressor at a second predetermined speed that is greater than the first predetermined speed when the temperature of the first evaporator is equal to the maximum temperature of the predetermined temperature range.

14. The air conditioning control method of claim 13 wherein controlling the speed of the electric compressor based on the temperature of the first evaporator includes operating the electric compressor at a third predetermined speed that is less than first predetermined speed when the temperature of the first evaporator is less than the minimum temperature.

15. The air conditioning control method of claim 14 wherein controlling the speed of the electric compressor based on the temperature of the first evaporator includes shutting down the electric compressor when the temperature of the first evaporator remains less than the minimum temperature continuously for a predetermined period while the electric compressor is operating at the third predetermined speed.

16. An air conditioning control method for a vehicle having an internal combustion engine, comprising:
determining whether the internal combustion engine of the vehicle is on;
determining whether a first blower of the vehicle is blowing air across a first evaporator,
wherein the first evaporator is configured to receive refrigerant from a condenser when a first control valve is open and to transfer heat from air passing the first evaporator to the refrigerant within the first evaporator,
wherein the first blower is configured to blow air across the first evaporator to a first section of a cabin of the vehicle, and
wherein the condenser is configured to receive refrigerant output by an electric compressor and to transfer heat from the refrigerant within the condenser to air passing the condenser; and
when the internal combustion engine of the vehicle is on and the first blower is blowing air across the first evaporator, controlling a speed of an electric compressor based on a temperature of the first evaporator,
wherein a second evaporator is configured to receive refrigerant from the condenser when a second control valve is open and to transfer heat from air passing the second evaporator to the refrigerant within the second evaporator,
wherein a second blower is configured to blow air across the second evaporator to a second section of the cabin of the vehicle,
wherein controlling the speed of the electric compressor based on the temperature of the first evaporator includes controlling the speed of the electric compressor based on the temperature of the first evaporator and a compressor suction pressure, and
wherein controlling the speed of the electric compressor based on the temperature of the first evaporator and the compressor suction pressure includes:
decreasing the speed of the electric compressor as the compressor suction pressure decreases toward a minimum pressure defining a lower limit of a predetermined pressure range; and
increasing the speed of the electric compressor as the compressor suction pressure increases toward a maximum pressure defining an upper limit of the predetermined pressure range.

17. The air conditioning control method of claim 16 controlling the speed of the electric compressor based on the temperature of the first evaporator and the compressor suction pressure includes:
operating the electric compressor at a first predetermined speed when the compressor suction pressure is equal to the minimum pressure of the predetermined pressure range; and
operating the electric compressor at a second predetermined speed that is greater than the first predetermined speed when the compressor suction pressure is equal to the maximum pressure of the predetermined pressure range.

18. The air conditioning control method of claim 17 wherein controlling the speed of the electric compressor based on the temperature of the first evaporator and the compressor suction pressure includes operating the electric compressor at a third predetermined speed that is less than first predetermined speed when the compressor suction pressure is less than the minimum pressure.

19. The air conditioning control method of claim 18 wherein controlling the speed of the electric compressor based on the temperature of the first evaporator and the compressor suction pressure includes shutting down the electric compressor when the compressor suction pressure remains less than the minimum pressure continuously for a predetermined period while the electric compressor is operating at the third predetermined speed.

20. The air conditioning control method of claim 16 further comprising determining the minimum and maximum pressures of the predetermined pressure range based on the compressor suction pressure when the temperature of the first evaporator decreases to a predetermined temperature.

\* \* \* \* \*